United States Patent
Park et al.

(10) Patent No.: US 10,965,470 B2
(45) Date of Patent: *Mar. 30, 2021

(54) TECHNIQUE FOR MANAGING PROFILE IN COMMUNICATION SYSTEM

(71) Applicant: Samsung Electronics Co., Ltd., Suwon-si (KR)

(72) Inventors: Jong-Han Park, Bucheon-si (KR); Duc-key Lee, Seoul (KR); Sang-Soo Lee, Yongin-si (KR); Tae-Sun Yeoum, Seoul (KR); Hye-Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,752

(22) Filed: Oct. 7, 2019

(65) Prior Publication Data

US 2020/0052907 A1 Feb. 13, 2020

Related U.S. Application Data

(63) Continuation of application No. 15/566,561, filed as application No. PCT/KR2016/003858 on Apr. 12, 2016, now Pat. No. 10,439,823.

(Continued)

(51) Int. Cl.
*H04L 9/32* (2006.01)
*H04L 29/06* (2006.01)
(Continued)

(52) U.S. Cl.
CPC .............. *H04L 9/3263* (2013.01); *H04L 9/14* (2013.01); *H04L 9/3066* (2013.01);
(Continued)

(58) Field of Classification Search
CPC ....... H04L 9/3263; H04L 9/3271; H04L 9/14; H04L 9/3066; H04L 9/3226;
(Continued)

(56) References Cited

U.S. PATENT DOCUMENTS

2012/0108207 A1 5/2012 Schell et al.
2012/0260090 A1 10/2012 Hauck et al.
(Continued)

FOREIGN PATENT DOCUMENTS

CN 1886747 A 12/2006
CN 103329578 A 9/2013
(Continued)

OTHER PUBLICATIONS

Australian Search Report dated Feb. 4, 2020; Australian Application No. 2016247689.
(Continued)

Primary Examiner — Nelson S. Giddins
(74) Attorney, Agent, or Firm — Jefferson IP Law, LLP

(57) ABSTRACT

Disclosed are: a communication technique and a system therefor for fusing, with IoT technology, a 5G communication system for supporting a data transmission rate higher than that of a 4G system. Provided is a method for installing a profile of a terminal having an embed universal integrated circuit card (eUICC) in a mobile communication system, the method comprising: requesting for an eUICC authentication certificate to an eUICC and receiving the eUICC authentication certificate; and transferring a profile package to the eUICC so as to install a profile, wherein the received eUICC authentication certificate further comprises an eUICC manufacturer (EUM) authentication certificate.

18 Claims, 12 Drawing Sheets

Related U.S. Application Data

(60) Provisional application No. 62/146,622, filed on Apr. 13, 2015, provisional application No. 62/149,732, filed on Apr. 20, 2015, provisional application No. 62/158,067, filed on May 7, 2015, provisional application No. 62/212,387, filed on Aug. 31, 2015.

(51) Int. Cl.
| | | |
|---|---|---|
| *H04W 8/20* | (2009.01) | |
| *H04W 12/04* | (2021.01) | |
| *H04W 12/06* | (2021.01) | |
| *H04W 12/00* | (2021.01) | |
| *H04L 9/14* | (2006.01) | |
| *H04L 9/30* | (2006.01) | |

(52) U.S. Cl.
CPC .......... *H04L 9/3228* (2013.01); *H04L 9/3247* (2013.01); *H04L 9/3271* (2013.01); *H04L 63/067* (2013.01); *H04L 63/0823* (2013.01); *H04L 63/0869* (2013.01); *H04L 63/12* (2013.01); *H04W 8/205* (2013.01); *H04W 12/0023* (2019.01); *H04W 12/04* (2013.01); *H04W 12/06* (2013.01); *H04L 2209/80* (2013.01)

(58) Field of Classification Search
CPC ....... H04L 9/3234; H04L 9/3228; H04L 9/32; H04L 9/47; H04L 63/067; H04L 63/0823; H04L 63/0869; H04L 63/12; H04L 2209/80; H04W 12/06; H04W 12/0023; H04W 12/08; H04W 12/04; H04W 8/205; H04W 8/20

See application file for complete search history.

(56) References Cited

U.S. PATENT DOCUMENTS

| | | | | |
|---|---|---|---|---|
| 2013/0227646 | A1* | 8/2013 | Haggerty | H04L 63/06 726/3 |
| 2014/0082358 | A1 | 3/2014 | Nakhjiri et al. | |
| 2014/0228071 | A1 | 8/2014 | Villarrubia Grande et al. | |
| 2014/0235210 | A1 | 8/2014 | Park et al. | |
| 2014/0287725 | A1 | 9/2014 | Lee | |
| 2014/0329502 | A1 | 11/2014 | Lee et al. | |
| 2015/0143125 | A1 | 5/2015 | Nix | |
| 2015/0163056 | A1* | 6/2015 | Nix | H04L 63/06 380/46 |
| 2015/0341791 | A1 | 11/2015 | Yang et al. | |
| 2015/0347786 | A1 | 12/2015 | Yang et al. | |
| 2016/0006729 | A1 | 1/2016 | Yang et al. | |
| 2016/0127132 | A1 | 5/2016 | Lee et al. | |
| 2016/0269386 | A1 | 9/2016 | Nix | |
| 2016/0277930 | A1 | 9/2016 | Li et al. | |
| 2016/0352698 | A1 | 12/2016 | Long | |
| 2017/0134948 | A1 | 5/2017 | Gao et al. | |
| 2018/0249333 | A1 | 8/2018 | Li et al. | |

FOREIGN PATENT DOCUMENTS

| | | |
|---|---|---|
| EP | 2 461 613 A1 | 6/2012 |
| EP | 2747466 A1 | 6/2014 |
| WO | 2013/036010 A1 | 3/2013 |
| WO | 2013/123233 A1 | 8/2013 |
| WO | 2014/069871 A1 | 5/2014 |
| WO | 2014/193181 A1 | 12/2014 |

OTHER PUBLICATIONS

3GPP TS 31.111, v. 12.7.0; 3rd Generation Partnership Project; Technical Specification Group Core Network and Terminals; Universal Subscriber Identity Module (USIM) Application Toolkit (USAT), Mar. 27, 2015.

European Search Report dated Aug. 6, 2019, issued in European Patent Application No. 19181026.6.

Chinese Office Action with English translation dated Jun. 1, 2020; Chinese Appln. No. 201680029919.0.

Australian Notice of Acceptance dated Jun. 18, 2020; Australian Application No. 2016247689.

Indian Office Action dated Jul. 25, 2020; Indian Appln. No. 201717039508.

\* cited by examiner

TECHNIQUE FOR MANAGING PROFILE IN COMMUNICATION SYSTEM

CROSS-REFERENCE TO RELATED APPLICATION(S)

This application is a continuation application of prior application Ser. No. 15/566,561, filed Oct. 13, 2017, which is a National Stage application under 35 U.S.C. § 371 of an International application PCT/KR2016/003858, filed on Apr. 12, 2016, which was based and claimed priority of a U.S. Provisional application No. 62/146,622, filed on Apr. 13, 2015, U.S. Provisional application No. 62/149,732, filed on Apr. 20, 2015, U.S. Provisional application No. 62/158,067, filed on May 7, 2015, and U.S. Provisional application No. 62/212,387, filed on Aug. 31, 2015 in the U.S. Patent and Trademark Office, the disclosures of each which are incorporated by reference herein in their entireties.

TECHNICAL FIELD

The present disclosure relates to a method and apparatus for downloading and installing a communication service to a terminal so as to establish a communication connection in a communication system, and to a method and apparatus for downloading and installing a profile in real time in a communication system.

BACKGROUND ART

To meet the demand for wireless data traffic that has increased since commercialization of the 4G communication system, efforts have been made to develop an advanced 5G or an advanced pre-5G communication system. For this reason, the 5G communication system or the pre-5G communication system is also called a beyond-4G network communication system or a post-LTE system. To achieve a high data rate, implementation in an mmWave band (e.g., 60 GHz band) is being considered for the 5G communication system. In the 5G communication system, beamforming, massive MIMO, full dimensional MIMO (FD-MIMO), array antenna, analog beam-forming, and large scale antenna techniques are under discussion to reduce the propagation path loss and increase the propagation distance in the mmWave band. Also, in the 5G communication system, techniques such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation have been developed to improve the system network. In the 5G system, hybrid FSK and QAM modulation (FQAM) and sliding window superposition coding (SWSC) as advanced coding modulation (ACM) schemes, and filter bank multi carrier (FBMC), non-orthogonal multiple access (NOMA), and sparse code multiple access (SCMA) as advanced access technologies have also been developed.

The Internet has evolved from the human-centered connectivity network where humans generate and consume information to the Internet of things (IoT) network where information is exchanged and processed between distributed components such as things. The Internet of everything (IoE) technology which is a combination of the IoT technology and the big data processing technology through a connection with a cloud server has emerged. Technology elements such as sensing technology, wired/wireless communication and network infrastructure, service interface technology, and security technology are required for implementation of the IoT, and thus research has recently been focused on connection technologies between things, such as a sensor network, machine to machine (M2M) communication, and machine type communication (MTC). In the IoT environment, intelligent Internet technology (IT) services may be provided, which create a new value for human life by collecting and analyzing data generated between connected things. The IoT may be applied to a variety of fields such as smart homes, smart buildings, smart cities, smart cars or connected cars, smart grids, healthcare, smart appliances, or high-tech medical services through convergences and combinations between the conventional information technology (IT) and various industrial applications.

Accordingly, various attempts have been made to apply the 5G communication system to the IoT network. For example, the sensor network, machine-to-machine (M2M), and machine type communication (MTC) technologies may be implemented by the beamforming, MIMO, and array antenna techniques of the 5G communication technology. The application of a cloud radio access network (cloud RAN) as the above-described big data processing technology may also be considered an example of convergence between the 5G technology and the IoT technology.

A universal integrated circuit card (UICC) refers to a smart card that is inserted and used in a mobile communication terminal or the like, and is also called "UICC card". The UICC may include an access control module for access to a mobile network operator (MNO)'s network. Examples of the access control module include a universal subscriber identity module (USIM), a subscriber identity module (SIM), and an IP multimedia service identity module (ISIM). The UICC including a USIM is usually called USIM card. Likewise, the UICC including a SIM is also called SIM card.

In the following description of the present disclosure, the meaning of the term "UICC card" as generally used herein may cover the SIM card, the USIM card, the UICC including an ISIM, and the like. That is, the technical description of the UICC card may be generally applied for the USIM card, the ISIM card, or the SIM card in the same way.

The UICC card stores personal information of a mobile communication subscriber, and performs subscriber authentication and traffic security key generation during access to a mobile communication network, thereby achieving safe use of mobile communication networks. Considering at the time of proposing the present disclosure, the UICC card is typically manufactured as a dedicated card for a specific mobile network operator (i.e., MNO) at the request of the corresponding MNO, and may be released in a state where authentication information for access to the corresponding MNO's network, for example, universal subscriber identity module (USIM) application and international mobile subscriber identity (IMSI), a K value, an OPc value, or the like, is previously contained in the card.

Therefore, the manufactured UICC card is delivered to the corresponding MNO, and then the corresponding MNO provides the same to a subscriber. Thereafter, if necessary, the corresponding MNO may perform management of applications in the UICC, including installation, modification, and deletion of the applications, by using the over the air (OTA) technology. The subscriber can use the corresponding MNO's network and application services by inserting the UICC card into his/her own mobile communication terminal, and when replacing the terminal with a new one, can use the authentication information, the mobile communication phone number, the personal phonebook, stored in the UICC card, as they are in the new terminal by taking out the UICC card from the old terminal and inserting the same into the new terminal.

However, the UICC card causes inconvenience to a mobile communication terminal user when he/she is provided with services from other mobile network operators. The mobile communication terminal user is inconvenienced because he/she needs to physically obtain a UICC card provided by a mobile network operator in order to receive services from a corresponding mobile network operator. For example, when a user travels abroad, he/she has to purchase a local UICC card in order to receive local mobile communication services, which causes inconvenience to the user. A roaming service may somewhat reduce the inconvenience, but there is a problem in that the user needs to pay a high rate for the roaming service and cannot receive the service when a contract is not established between mobile communication providers.

This inconvenience may be mostly solved by remotely downloading and installing a SIM module to the UICC card. That is, the SIM module for a mobile communication service to be used may be downloaded to the UICC card at the time desired by a user. It is also possible to download and install a plurality of SIM modules to the UICC card and to selectively use only one of the SIM modules.

The UICC card may be fixed or may not be fixed in a terminal. In particular, the UICC fixed in a terminal is called embedded UICC (eUICC). The eUICC generally means a UICC card that is fixed in a terminal and is capable of remotely downloading a SIM module from a server and selecting the same.

In order to use such an eUICC, a profile must be downloaded and installed in the eUICC. Therefore, there is a need to provide a profile management technique for the eUICC.

DISCLOSURE OF INVENTION

Technical Problem

An aspect of the present disclosure is to provide a method and apparatus for downloading a profile for establishing a communication connection in real time by a terminal in a communication system.

A further aspect of the present disclosure is to provide an apparatus and method for providing a profile to a terminal in a communication system.

Solution to Problem

In accordance with an aspect of the present disclosure, there is provided a method for installing a profile by a terminal having an embedded universal integrated circuit card (eUICC) in a mobile communication system. The method includes the steps of: requesting for an eUICC certificate to the eUICC and receiving the eUICC certificate; requesting for eUICC information to the eUICC and receiving the eUICC information; transmitting a download initialization message including the eUICC information to a profile providing server; receiving a response message including a certificate of the profile providing server and a signature value of the profile providing server, in response to the download initialization message; delivering the certificate of the profile providing server and the signature value of the profile providing server included in the response message to the eUICC; receiving an one-time public key of the eUICC and a signature value of the eUICC from the eUICC; transmitting a profile package request message including the one-time public key of the eUICC and the signature value of the eUICC to the profile providing server; and delivering a profile package, received in response to the profile package request message, to the eUICC so as to install the profile package, wherein the received eUICC certificate further includes an eUICC manufacturer (EUM) certificate.

In accordance with another aspect of the present disclosure, there is provided a terminal apparatus having an embedded universal integrated circuit card (eUICC) in a mobile communication system. The terminal apparatus includes: a control unit for performing control such that the terminal apparatus requests for an eUICC certificate to the eUICC and receives the eUICC certificate, requests for eUICC information to the eUICC and receives the eUICC information, transmits a download initialization message including the eUICC information to a profile providing server, receives a response message including a certificate of the profile providing server and a signature value of the profile providing server, in response to the download initialization message, delivers the certificate of the profile providing server and the signature value of the profile providing server included in the response message to the eUICC, receives an one-time public key of the eUICC and a signature value of the eUICC from the eUICC, transmits a profile package request message including the one-time public key of the eUICC and the signature value of the eUICC to the profile providing server, and delivers a profile package, received in response to the profile package request message, to the eUICC so as to install the profile package; and a transceiver unit for performing a reception or transmission operation under the control of the control unit, wherein the received eUICC certificate further includes an eUICC manufacturer (EUM) certificate.

Advantageous Effects

According to the present disclosure, there are provided an apparatus for downloading and installing a profile so as to establish a communication connection in a communication system and a method therefor. Also, there are provided an apparatus for transmitting a profile so as to allow the above apparatus to download the profile, an apparatus for delivering profile information, and operation methods therefor.

According to the present disclosure, in a wireless communication system, a profile for allowing a user of a mobile communication terminal to use a communication service can be installed in the mobile communication terminal.

MODE FOR THE INVENTION

Figure 1:
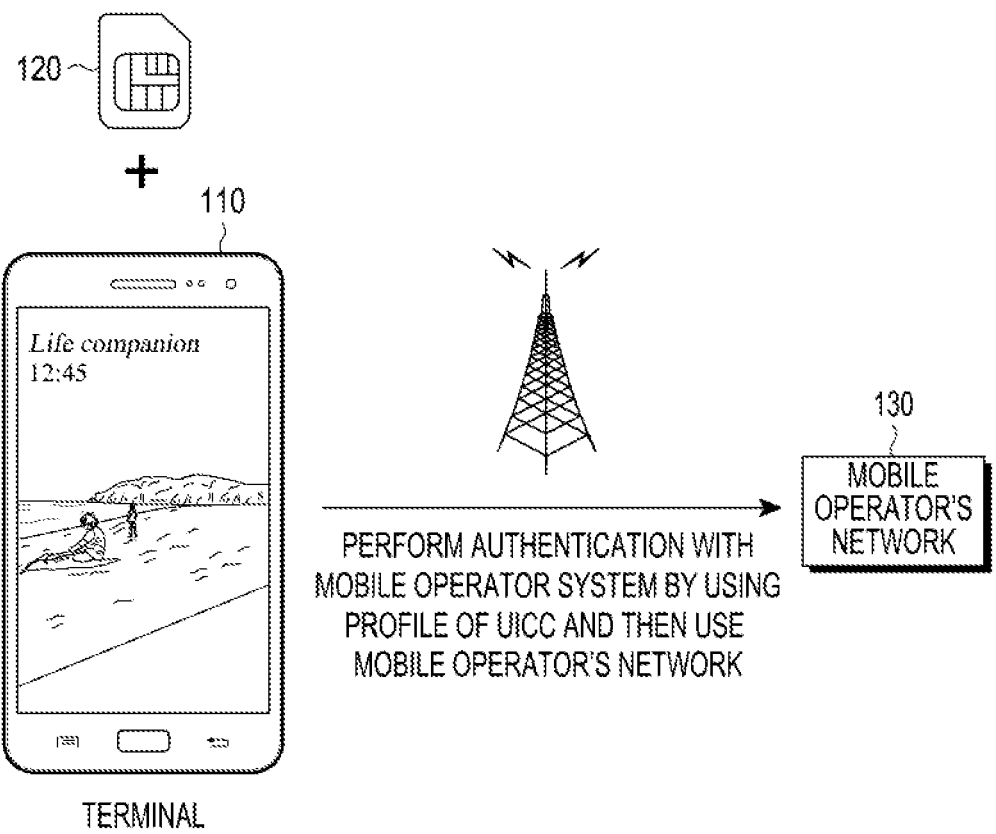
FIG. 1 is a diagram illustrating a method for establishing, by a terminal, a connection to a mobile communication network by using a UICC included in the terminal and containing a fixed profile.

Hereinafter, embodiments of the present disclosure will be described in detail with reference to the accompanying drawings. In the following description of the present disclosure, a detailed description of known configurations or functions incorporated herein will be omitted when it is determined that the detailed description may unnecessarily make the subject matter of the present disclosure unclear. The terms as described below are defined in consideration of the functions in the embodiments, and the meaning of the terms may vary according to the intention of a user or operator, convention, or the like. Accordingly, the definitions thereof should be made on the basis of the overall context of the disclosure.

Before the detailed description of the present disclosure, examples of construable meanings of some terms used herein are given. However, it should be noted that the terms are not limited to the examples of the construable meanings given below.

In the present disclosure, an eUICC is a general term for UICC cards capable of remotely downloading a SIM module and selecting the same. That is, among UICC cards capable of downloading a SIM module and selecting the same, either a UICC card fixed in a terminal or a UICC card not fixed in a terminal is generally called the eUICC. Also, eUICC profile is a general term for SIM module information downloaded to the eUICC.

In the present disclosure, a universal integrated circuit card (UICC) is a smart card that is inserted and used in a mobile communication terminal, and refers to a chip that stores personal information such as network access authentication information, a phonebook, and short message service (SMS) of a mobile communication subscriber so as to perform subscriber authentication and traffic security key generation during access to a mobile communication network such as global system for mobile communications (GSM), wideband code division multiple access (WCDMA), or long term evolution (LTE), thereby enabling the subscriber to safely use mobile communication. The UICC may contain a communication application such as a subscriber identification module (SIM), a universal SIM (USIM), or an IP multimedia SIM (ISIM) according to the type of a mobile communication network accessed by a subscriber, and may provide a higher-level security function for loading various applications such as an electronic wallet, ticketing, and an electronic passport.

In the present disclosure, an embedded UICC (eUICC) may be a security module that is in the form of a chip embedded in a terminal, rather than a detachable security module that can be inserted into and detached from a terminal. The eUICC may download and install a profile by using the over the air (OTA) technology. The eUICC may refer to a UICC capable of downloading and installing a profile.

In the present disclosure, a method for downloading and installing a profile to an eUICC by using the OTA technology may also be applied to a detachable UICC that can be inserted into and detached from a terminal. That is, embodiments of the present disclosure may be applied to a UICC capable of downloading and installing a profile by using the OTA technology.

The term "UICC" as used herein may be used interchangeably with the term "SIM", and the term "eUICC" may be used interchangeably with the term "eSIM".

In the present disclosure, a profile may mean a software package of an application, a file system, an authentication key value, and the like that are stored in a UICC.

In the present disclosure, a USIM profile may have the same meaning as a profile, or may mean a software package of information contained in a USIM application within the profile.

In the present disclosure, a provisioning profile refers to an profile for downloading a different profile such as a USIM profile, and may be previously contained in an eUICC in the manufacturing stage.

In the present disclosure, a profile providing server may be represented by subscription manager data preparation (SM-DP), subscription manager data preparation plus (SM-DP+), an off-card entity of profile domain, a profile encryption server, a profile generation server, a profile provisioner (PP), a profile provider, or a profile provisioning credentials holder (PPC holder).

In the present disclosure, a profile information delivery server may be represented by a discovery and push function (DPF) or a subscription manager discovery service (SM-DS).

In the present disclosure, a profile management server may be represented by subscription manager secure routing (SM-SR), subscription manager secure routing plus (SM-SR+), an off-card entity of eUICC profile manager, a profile management credentials holder (PMC holder), or an eUICC manager (EM).

In the present disclosure, a combined function of the profile providing server and the profile management server may be referred to generally as the profile providing server (or SM-DP+). That is, it should be noted that an operation of the profile providing server as described below may also be performed by the profile management server. Likewise, an operation as described for the profile management server (or SM-SR+) may also be performed by the profile providing server.

The term "terminal" as used herein may be interchangeably referred to as the term "mobile station (MS)", "user equipment (UE)", "user terminal (UT)", "wireless terminal", "access terminal (AT)", "terminal", "subscriber unit", "subscriber station (SS)", "wireless device", "wireless communication device", "wireless transmission/reception unit (WTRU)", "mobile node", "mobile", or any other term. Examples of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a home appliance for music storage and playback having a wireless communication function, an Internet home appliance capable of wireless Internet access and browsing, and a portable unit or terminal in which combinations of the functions are incorporated. Further, the terminal may include, but is not limited to, a machine-to-machine (M2M) terminal and a machine type communication (MTC) terminal/device. In the present disclosure, the terminal may be interchangeably referred to as an electronic device.

In the present disclosure, a UICC capable of downloading and installing a profile may be embedded in the electronic device. When the UICC is not embedded in the electronic device, a UICC physically separated from the electronic device may be connected to the electronic device by being inserted into the electronic device. For example, the UICC may be in the form of a card so as to be inserted into the electronic device. The electronic device may include the terminal, wherein the terminal may be a terminal including the UICC capable of downloading and installing a profile. The UICC may be embedded in the terminal, and may also be inserted into the terminal so as to be connected to the terminal when the UICC is separated from the terminal. The UICC capable of downloading and installing a profile may be, for example, referred to as an eUICC.

In the present disclosure, a profile identifier may be interchangeably referred to as a profile ID, an integrated circuit card ID (ICCID), an issuer security domain profile (ISD-P), or a factor matching a profile domain (PD). The profile ID may indicate a unique identifier of each profile.

In the present disclosure, an eUICC identifier (eUICC ID) may be a unique identifier of the eUICC embedded in the terminal, and may be referred to as an EID. Further, when a provisioning profile is previously contained in the eUICC, the eUICC identifier (eUICC ID) may be a profile ID of the provisioning profile. Further, when, as in an embodiment of the present disclosure, the terminal and the eUICC chip are not separated from each other, the eUICC ID may be a terminal ID. Further, the eUICC ID may also refer to a specific security domain of the eUICC chip.

In the present disclosure, a profile container may be interchangeably referred to as a profile domain. The profile container may be a security domain.

In the present disclosure, an application protocol data unit (APDU) may be a message for interworking between the terminal and the eUICC. Further, the APDU may be a message for interworking between the profile providing server or the profile management server and the eUICC.

In the present disclosure, profile provisioning credentials (PPC) may be a means used for mutual authentication, profile encryption, and signing between the profile providing server and the eUICC. The PPC may include at least one of a symmetric key, a Rivest Shamir Adleman (RSA) certificate and a private key, an elliptic curved cryptography (ECC) certificate and a private key, and a root certification authority (root CA) and a certificate chain. Further, when there are a plurality of profile providing servers, the eUICC may store or use different PPCs for the plurality of profile providing servers.

In the present disclosure, profile management credentials (PMC) may be a means used for mutual authentication, transmission data encryption, and signing between the profile management server and the eUICC. The PMC may include at least one of a symmetric key, a RSA certificate and a private key, an ECC certificate and a private key, and a root CA and a certificate chain. Further, when there are a plurality of profile management servers, the eUICC may store or use different PMCs for the plurality of profile management servers.

In the present disclosure, an AID may be an application identifier, and may be used to distinguish between different applications in the eUICC.

In the present disclosure, a profile package TLV may be interchangeably referred to as a profile TLV. The profile package TLV may be a data set that represents information constituting a profile in a tag-length-value (TLV) format.

In the present disclosure, AKA stands for authentication and key agreement, and may refer to an authentication algorithm for accessing $3^{rd}$ generation partnership project (3GPP) and 3GPP2 networks.

In the present disclosure, K indicates an encryption key value for use in the AKA authentication algorithm, and is stored in the eUICC.

In the present disclosure, OPc indicates a parameter value for use in the AKA authentication algorithm, and may be stored in the eUICC.

In the present disclosure, NAA stands for network access application, and may be an application program for network access, such as USIM or ISIM, stored in the UICC. The NAA may be a network access module.

FIG. 1 is a diagram illustrating a method for establishing, by a terminal, a connection to a mobile communication network by using a UICC included in the terminal and containing a fixed profile.

Referring to FIG. 1, a UICC 120 may be inserted into a terminal 110. Here, the UICC 120 may be a detachable type UICC or may be a UICC previously embedded in the terminal 110. The UICC may contain a fixed profile, and the fixed profile means that "access information" used for access to a specific mobile operator's network is fixed. The access information may, for example, include a K or Ki value required for network authentication, along with an international mobile subscriber identity (IMSI) as a subscriber identifier.

Then, the terminal may perform authentication with an authentication processing system (e.g., home location register (HLR) or authentication center (AuC)) of a mobile operator by using the UICC. The authentication procedure may be an AKA procedure. If the authentication is successful, the terminal is allowed to use mobile communication services such as mobile telephony and mobile data services by using a mobile communication network 130 of the mobile communication system.

Figure 2:
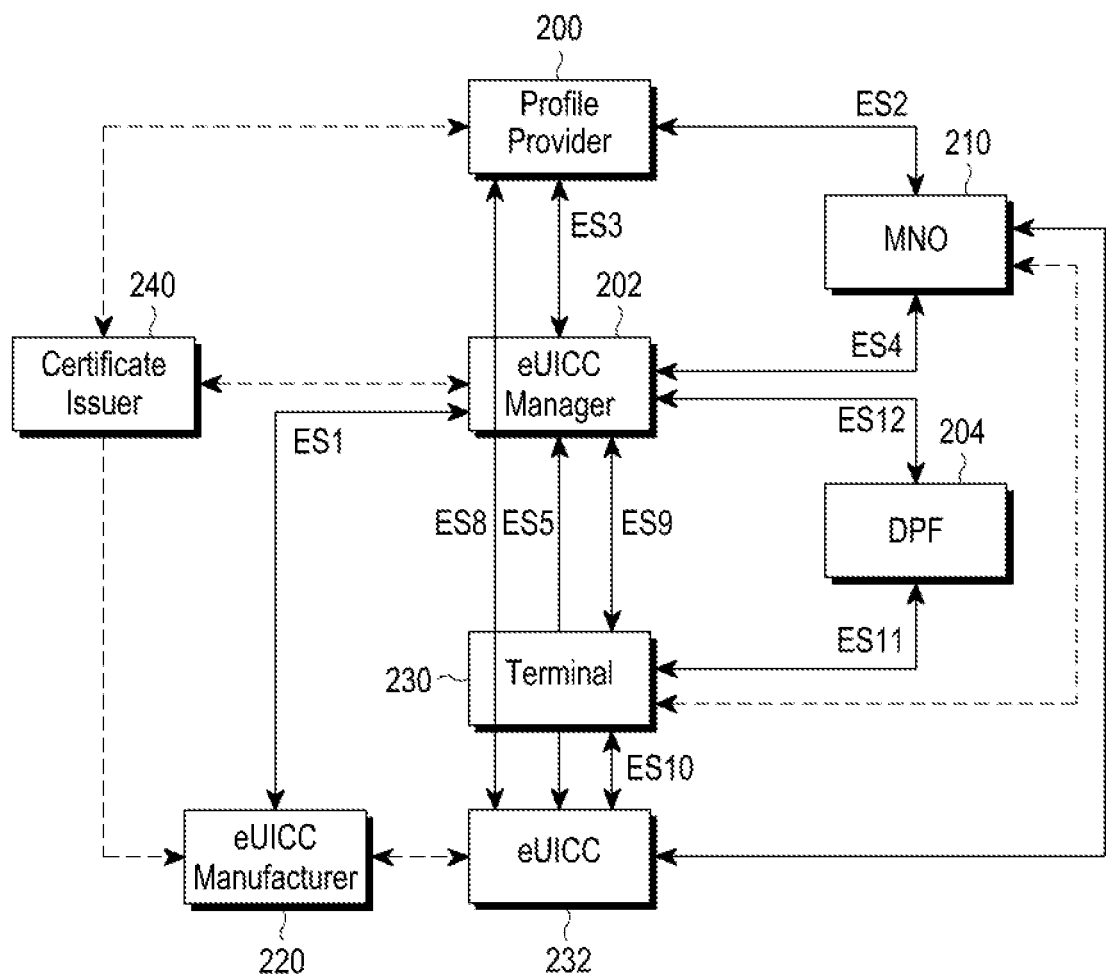
FIG. 2 is a diagram illustrating the overall structure of a system for remote profile installation and management for an eUICC.

FIG. 2 is a diagram illustrating the overall structure of a system for remote profile installation and management for an eUICC.

An eUICC 232 may be an UICC card or chip embedded in a terminal 230 or a detachable type UICC card or chip. The eUICC 232 may have dimensions of form factor 2FF, 3FF, 4FF, MFF1, or MFF2, and may also have other various physical sizes. The eUICC may be implemented as a separate device from the terminal, which is attached to the terminal, but may also be integrated into a communication chip (e.g., communication processor (CP) or baseband modem) of the terminal.

A profile provider (PP) 200 may perform a function of generating a profile or encrypting a generated profile. The PP 200 may be referred to as SM-DP+.

An eUICC manager (EM) 202 may relay a profile, received from the SM-DP+, to a local profile assistant (LPA) of the terminal 230, and may manage the profile. The PM 202 may be referred to as SM-SR+. The SM-SR+ 202 may control profile download and profile management operations between the SM-DP+ 200 and the terminal (i.e., LPA) 230.

The SM-DP+ 200 and the SM-SR+ 202 may be implemented as a single server, and such a single server may be referred to as SM-DP+ or SM+.

A profile information delivery server (i.e., DPF) 204 may relay an SM-SR+ server address and an event identifier, received from the SM-SR+, to the LPA 230.

In addition, the system may further include a mobile network operator (MNO) 210, an eUICC manufacturer 220, and a certificate issuer (CI) 240.

The MNO 210 may participate in profile download and management processes, and may provide mobile communication services at the request of the eUICC containing a profile installed therein.

The eUICC manufacturer 220 may issue an eUICC certificate by signing a certificate content with a private key.

The CI 240 may issue an EUM certificate, an EM certificate, or a PP certificate by signing a certificate content with a private key.

FIG. 2 also illustrates interfaces between the servers (e.g., ES3), interfaces between the terminal and the servers (e.g., ES9), an interface between the terminal and the eUICC (e.g., ES10), and the like. The interfaces and functions provided by the interfaces will be described in detail below.

Figure 3:
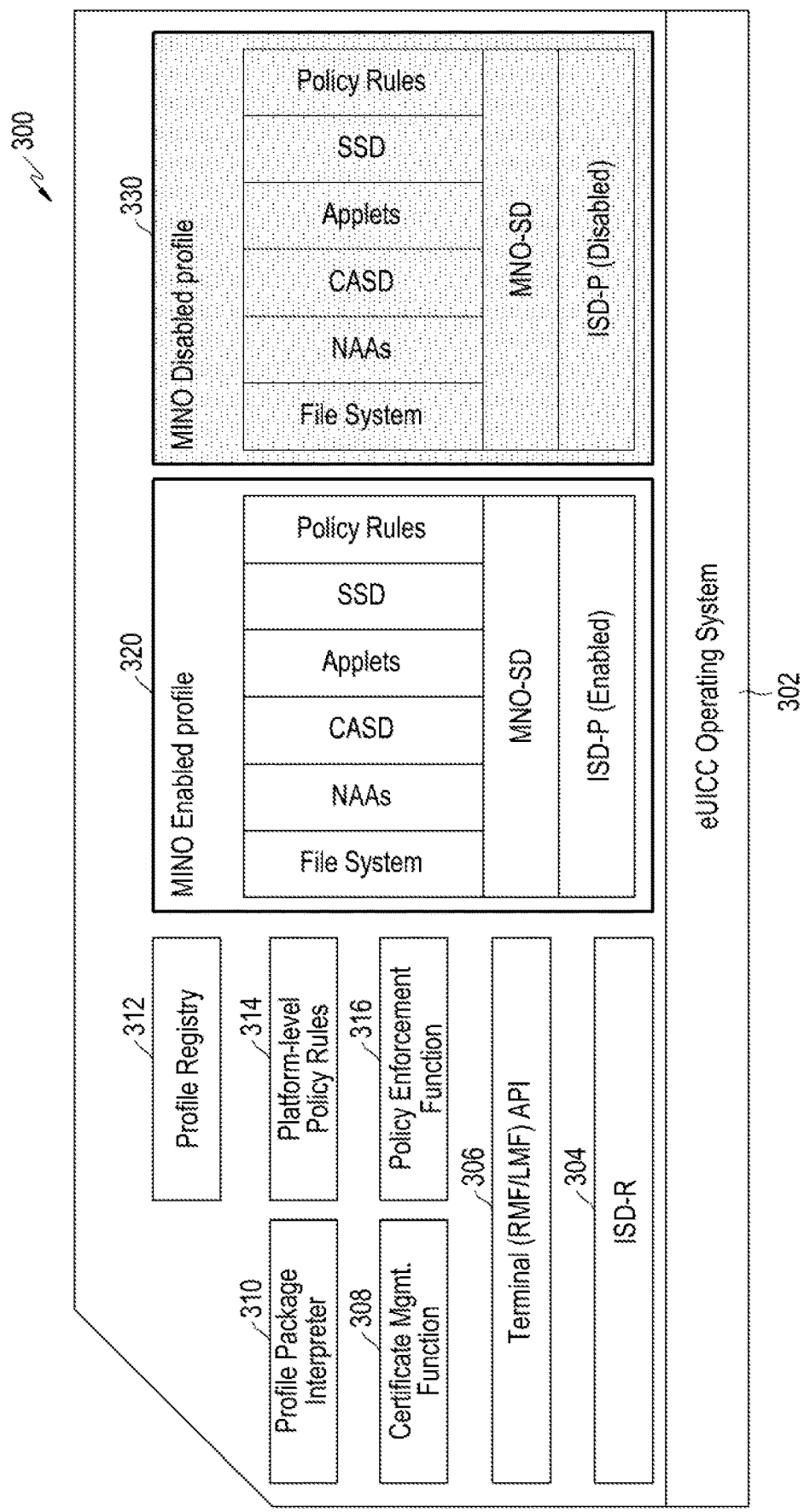
FIG. 3 is a diagram for explaining the internal structure of an eUICC.

FIG. 3 is a diagram for explaining the internal structure of an eUICC.

An eUICC 300 may be basically in the form of a card or chip, but at least one profile 320, 330 may be installed therein in a software form. Accordingly, the eUICC may operate on an eUICC operating system (OS) 302. FIG. 3 shows that the eUICC 300 contains two profiles 320, 330, and at present on profile 320 is enabled and the other profile 330 is disabled.

The terminal API function (TAF) 306 refers to a function of receiving a remote management function (RMF) and a local management function (LMF) defined in a terminal (i.e., LPA), and personally processing the same or allowing another function (e.g., CMF (308) or PEF (316)) in the eUICC 300 to process the same. The TAF 306 may be identical to or different from the issuer security domain root (ISD-R) of the eUICC.

The ISD-R 304 refers to a domain located at the base of the eUICC 300.

The certificate management function (CMF) 308 may store the following data (or information) within the eUICC 300.

At least one eUICC certificate and private key associated therewith

Certificate of eUICC manufacturer (EUM) by which eUICC certificate is signed

At least one certificate issuer (CI) certificate

By the internal request from the eUICC 300, the CMF 308 may perform at least one of the following operations of:

Providing eUICC certificate or EUM certificate

Verifying EM certificate by using public key of CI certificate

Verifying signature value signed with EM private key by using public key of EM certificate Verifying PP certificate by using public key of CI certificate Verifying signature value signed with PP private key by using public key of EM certificate The policy enforcement function (PEF) 316 serves to enforce a policy rule 314 configured for the eUICC 300. The policy rule 314 includes a profile policy rule (PPR) and an eUICC policy rule (EPR).

The PPR may be stored inside the profile, and may be controlled by the OTA key of a MNO or controlled by the signature value of a specific SM-DP+.

The EPR may be stored outside the profile, and may be controlled by the signature value of a specific SM-DP+ or the signature value of a specific SM-SR+.

The EPR may consist of an owner ID for the policy rule and a rule to be configured. The owner ID may be the ID of a server that possesses a valid certificate and a private key of the SM-DP+ or SM-SR+.

The profile package interpreter (PPI) 310 refers to a function of interpreting decoded profile information and installing the same by the installable unit. The PPI may be referred to as the profile interpreter function (PIF).

The profile registry 312 may include profile-specific information for managing individual profiles installed in the eUICC 300, that is, a profile record. The eUICC 300 may build a profile record as a part of the profile registry by using information delivered by the SM-DP+ or SM-SR+ when a profile is installed, and may subsequently use the profile record to manage the profile.

An example of configuring information of the profile registry 312 (i.e., ProfileRegistry) is shown in Table 1 below.

TABLE 1

```
ProfileRegistry ::= SET OF ProfileRecord
ProfileRecord ::= SEQUENCE {
    profileRecordPart1            ProfileRecordPart1,
    profileRecordPart2            ProfileRecordPart2
}
ProfileRecordPart1 ::= SEQUENCE {
    profileID                     ProfileID,
    plmnID                        PLMNID,           -- MCC+MNC value of the IMSI
    profileDescription            ProfileDescription -- Text describing the Profile (MSISDN is
recommended)
}
ProfileRecordPart2 ::= SEQUENCE {
    profileType                   ProfileType,
    profileRequestType ProfileRequestType   OPTIONAL,     /*   conditional    if
ProfileRecordPart1.profileID = NULL */
    profileState                  ProfileState,
    ownerMNO                      MNOID             OPTIONAL,    /*    MNO      to
receive a request/notification message from the SM-SR+ */
    defaultSR                     DefaultSR,        /*    SM-SR+   ·to   receive   a
request/notification message from the LPA */
    authorizedSR                  SET OF SRID, -- SM-SR+s that can manage this Profile
& ProfileRecord
    profilePolicyRule             SET OF ProfilePolicyRule   OPTIONAL -- Policy rules
for this Profile set by MNO
}
```

TABLE 1-continued

```
ProfileID ::= VisibleString ( SIZE(20) )       -- ICCID represented as alphanumeric characters
ProfileDescription ::= UTF8String ( SIZE(0..256) )   /* Texts describing the profile/subscription information to
                                                the user. (e.g., +82-10-2618-5031) */
ProfileType ::= ENUMERATED { provisioning (0), operational (1) }
ProfileRequestType ::= INTEGER          /* When the MNO sends the ProfileDownloadRequest including
this TLV instead of ProfileID, the SM-DP+ selects a proper Profile to download corresponding to this information.
The value of this TLV is proprietary between each MNO and SM-DP+ */
ProfileState ::= ENUMERATED { disabled (0), enabled (1) }
DefaultSR ::= SEQUENCE {
    primarySR                   SRID,
    secondarySR         SRID    OPTIONAL        /* to be used by the LPA when the primary
SM-SR+ is not reachable (e.g. due to the primary SM-SR+ server failure) */
}
MCC ::= NumericString ( SIZE(3) )       -- Mobile Country Code
MNC ::= NumericString ( SIZE(2..3) )    -- Mobile Network Code
PLMNID ::= MCC |     MNC ( SIZE(5..6) ) -- '|' means concatenation of the 2 strings
MNOID ::= VisibleString                 -- FQDN of the server hosting the MNO function
SRID ::= VisibleString                  -- FQDN of the server hosting the SM-SR+ function
```

Referring to Table 1, ProfileRecord may include at least one of the following information: The ProfileRecord may be referred to as ProfileMetadata.

Profile ID or ICCID

PLMNID of profile providing MNO

Profile description (e.g., phone number)

Profile type

Server ID (SM-DP+ address or SM-SR+ address) as notification destination

Server ID (MNO server address) as notification destination

Server ID (SM-DP+ address or SM-SR+ address) that can modify ProfileRecord

Figure 4:
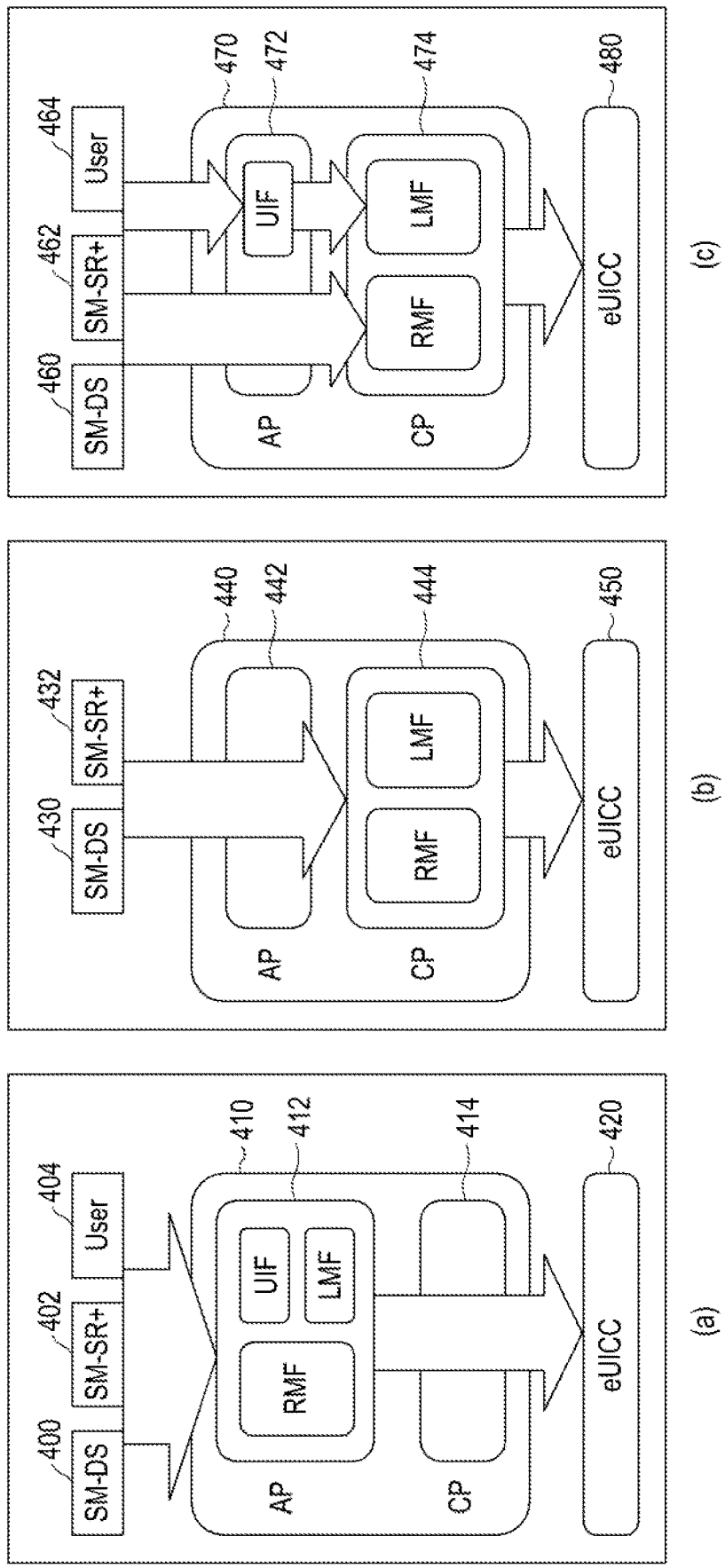
FIG. 4 is a diagram illustrating a configuration of a terminal according to the implementation type of a LPA function.

FIG. 4 is a diagram illustrating a configuration of a terminal according to the implementation type of a LPA function.

In order to assist a terminal in profile download, installation, and management operations for an eUICC, the terminal may include a local profile assistant (LPA) for performing communication with a server. The LPA may be implemented by an application processor (AP) and a communication processor (CP).

The LPA function of the terminal may include at least one of a remote management function (RMF), a local management function (LMF), and a user interface function (UIF).

The RMF may interwork directly or indirectly with at least one of the SM-SR+, the SM-DP+, the SM-DS, the LMF, and the eUICC so as to perform a remote control event for the eUICC. For example, the RMF may assist in performing network-initiated profile download/enablement/disablement/deletion and policy rule download operations.

The LMF may interwork directly or indirectly with at least one of the UIF, the RMF, and the eUICC so as to perform a local control event for the eUICC. For example, the LMF may assist in performing a terminal-initiated profile enablement/disablement/deletion or eUICC reset operation. The LMF may be interfaced with the SM-SR+ for the sake of result notification.

The UIF may assist in exchanging data between the RMF/LMF and a user. The UIF may include a UI for delivering, to the LMF, an input from the user.

FIG. 4A illustrates a case where the LPA is implemented as an AP centric function. The LPA 410 includes the AP 412 and the CP 414, but the RMF, the LMF, and the UIF are all implemented by the AP 412 in the LPA 410. The AP 412 may be interfaced with the SM-DS 400, the SM-SR+ 402, and the user 404 so as to perform a control event.

FIG. 4B illustrates a case where the LPA is implemented as a CP centric function. The LPA 440 includes the AP 442 and the CP 444, but both the RMF and the LMF are implemented by the CP 444 in the LPA 440. The CP 444 may be interfaced with the SM-DS 430 and the SM-SR+ 432 so as to perform a control event.

FIG. 4C illustrates a case where the LPA is implemented as a hybrid type function. The RMF and the LMF are implemented by the CP 474 in the LPA 470, but the UIF is implemented by the AP 472 in the LPA 470. The UIF may be interfaced with the user 464 and the LMF in the CP 474 so as to perform a control event for the eUICC 480, and the RMF in the CP 474 may be interfaced with the SM-DS 460 and the SM-SR+ 462 so as to perform a control event for the eUICC 480.

Figure 5A:
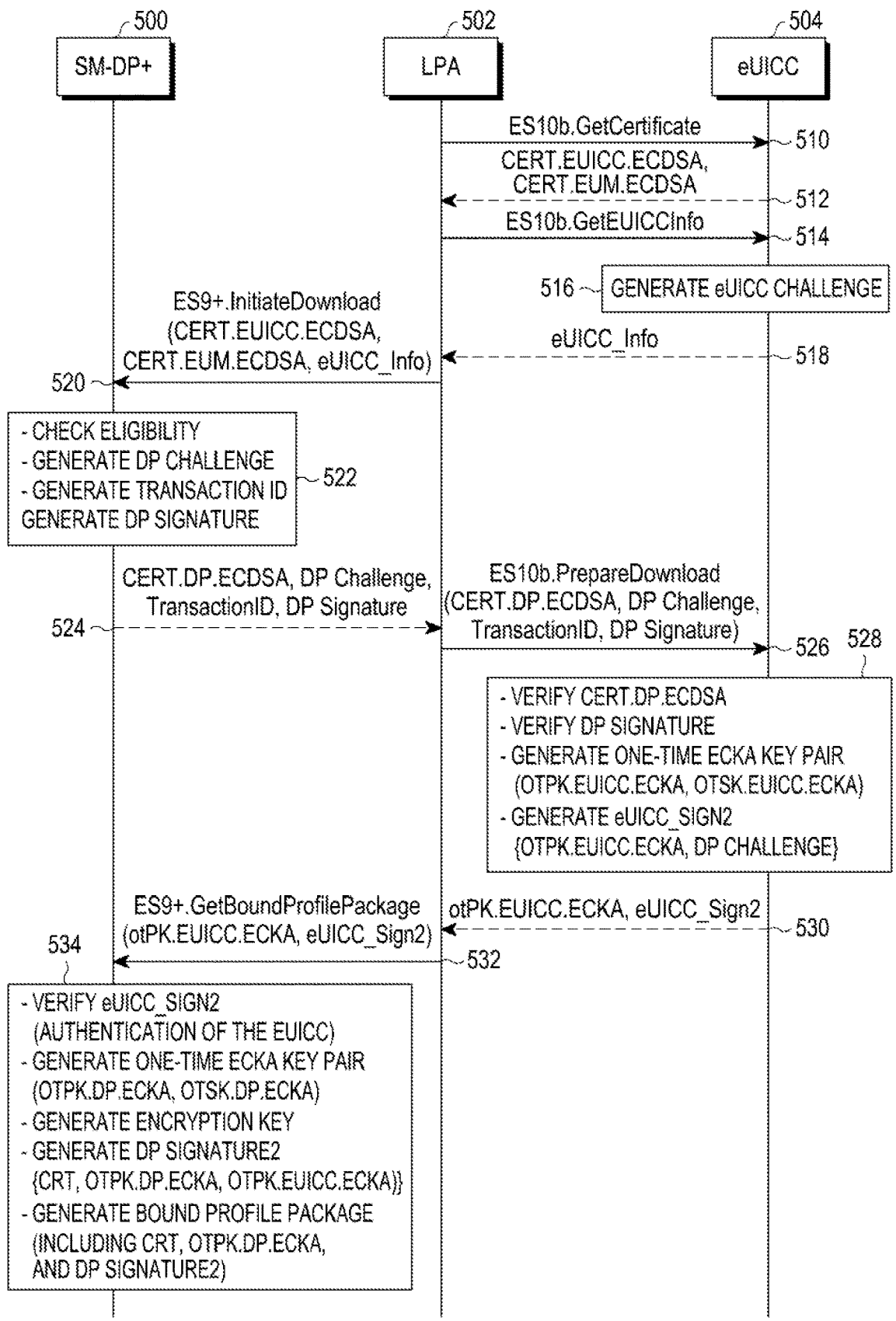
FIGS. 5A and 5B are diagrams illustrating a method for downloading a profile by an eUICC of a terminal in a communication system.
Figure 5B:
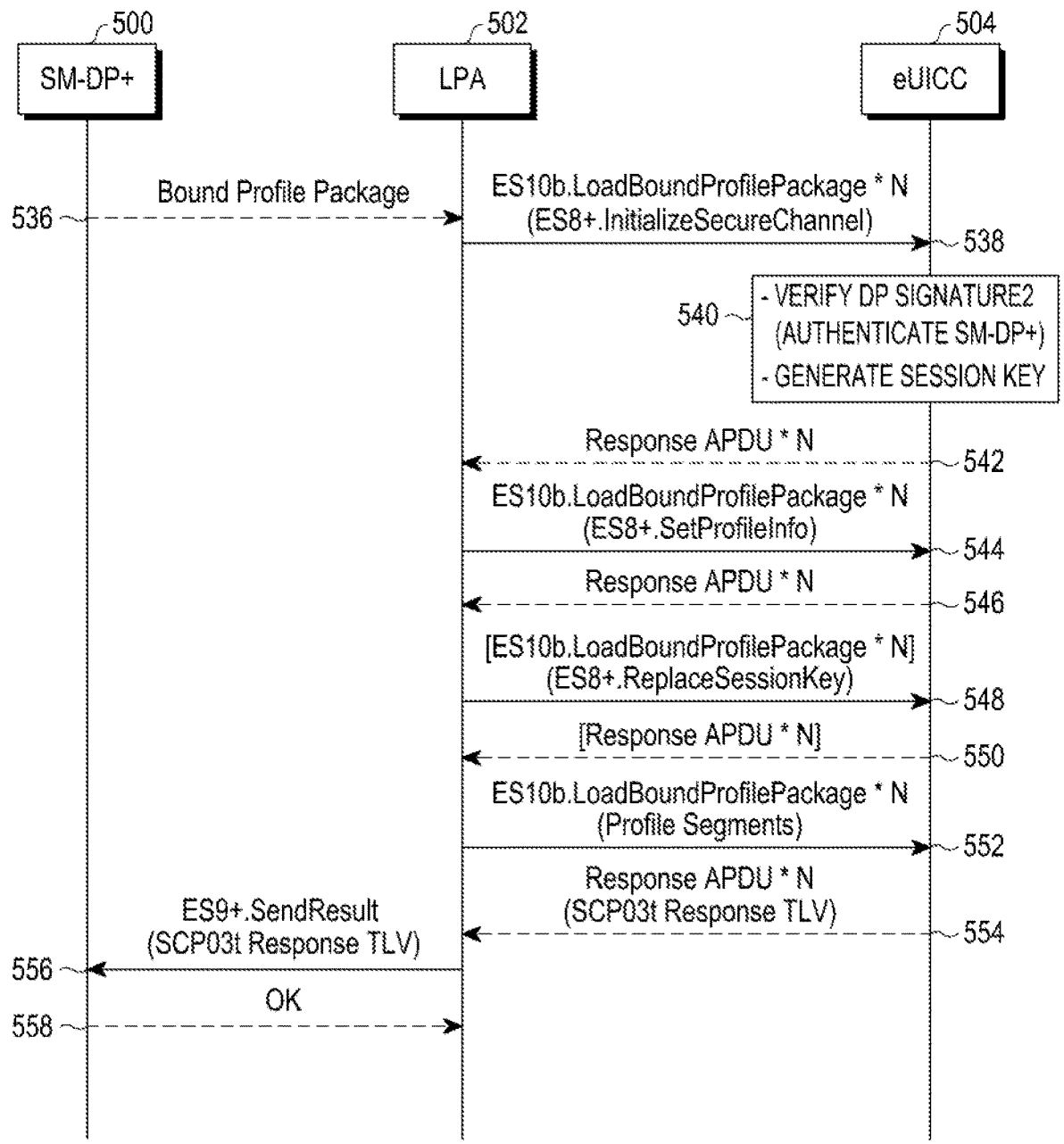

FIGS. 5A and 5B are diagrams illustrating a method for downloading a profile by an eUICC of a terminal in a communication system.

Referring to FIG. 5, the SM-DP+ 500 may communicate directly with the LPA 502 by using an IP based-HTTPS without involving the SM-SR+.

The SM-DP+ 500 may store its signature certificate (CERT.DP.ECDSA: certificate of DP used for digital signature verification) and private key (SK.DP.ECDSA: private key of DP for digital signature verification) in an internal storage. The SM-DP+ 500 may also store a transport layer security (TLS) server certificate (CERT.DP.TLS: certificate of DP used for TLS) and private key (SK.DP.ECDSA: private key of DP for TLS) for HTTPS in an internal storage. The internal storages for storing the certificate CERT.DP.ECDSA and SK.DP.ECDSA and the certificate CERT.DP.TLS and SK.DP.TLS may be physically the same storage device or different storage devices.

The eUICC 504 may store its signature certificate (CERT.EUICC.ECDSA: certificate of eUICC used for digital signature verification) and private key (SK.eUICC.ECDSA: private key of eUICC for digital signature verification) in an internal storage.

A procedure of downloading a profile by the terminal is as follows.

When the LPA 502 sends an ES10b.GetCertificate message to the eUICC 504 so as to request the eUICC 504 for an eUICC certificate (510), the eUICC 504 may return an eUICC certificate (CERT.eUICC.ECDSA) to the LPA 502 (512). At the same time, the eUICC 504 may also return an EUM certificate (CERT.EUM.ECDSA: certificate of EUM used for digital signature verification), in addition to the eUICC certificate. Alternatively, if the eUICC certificate or the EUM certificate is stored in the LPA 502, then steps 510 and 512 may be omitted.

If the LPA 502 needs to deliver the eUICC's signature value to the SM-DP+ 500, then the LPA 502 may send an ES10b.GetSignature message to the eUICC 504 so as to request the eUICC 504 for generation of the signature value. With regard to this, factors to be contained in the signature may be values delivered by the LPA 502, and the values may include at least one of an EventID (identifier for identifying a specific profile download event), a NotificationID (similar to EventID), a MatchingID (similar to EventID), an Activation Code Token (similar to EventID), and a random value generated by the terminal.

If the LPA 502 does not require the eUICC's signature value, then the LPA 502 may send an ES10b.GetEUICCInfo message to the eUICC 504 so as to request the eUICC 504 for eUICC information (eUICC_Info) (514).

In response to the request (514) from the LPA 502, the EUICC 504 generates an eUICC challenge (516). The eUICC challenge is a random value generated by the eUICC 504 for subsequent authentication of the SM-DP+ 500.

The eUICC 504 may return the eUICC_Info to the LPA 502 (518). The EUICC_Info may contain the eUICC challenge, version information of the eUICC, or the like.

The LPA 502 may send an ES9+.InitiateDownload message to the SM-DP+ 500 (520). Before the ES9+.InitiateDownload message is sent, an HTTPS session connection may be established between the LPA and the SM-DP+. The HTTPS session connection may use the same session over the entire profile download procedure, or may use different sessions for each step of the profile download procedure. Optionally, the ES9+.InitiateDownload message may be an ES9+.InitiateAuthentication message or ES9.EventRequest message.

The ES9+.InitiateDownload message may contain the eUICC_Info, for example, the eUICC challenge generated by the eUICC 504. The ES9+.InitiateDownload message may also contain the eUICC certificate or the EUM certificate.

When the eUICC certificate has been delivered to the SM-DP+ 500, the SM-DP+ 500 may verify the EUM certificate by using a CI certificate or CI certificate public key (PK.CI.ECDSA: public key of CI used for digital signature verification). The SM-DP+ 500 may verify the eUICC certificate by using the verified EUM certificate and verify the eUICC signature value by using the eUICC certificate. Optionally, the certificate and signature verifications may be omitted.

The SM-DP+ 500 may check the eligibility of the eUICC 504 on the basis of the eUICC_Info. With regard to this, the SM-DP+ 500 may use the eUICC version information of the eUICC_Info to check the eligibility of the eUICC 504.

Further, the SM-DP+ 500 may generate a DP challenge (522) that is a random value. The DP challenge is a random value generated by the SM-DP+ 500 for subsequent authentication of the eUICC 504.

Further, the SM-DP+ 500 may generate a TransactionID (522). The TransactionID is an identifier for identifying a specific profile download session so as to make it possible to process a plurality of terminal requests simultaneously. Without the TransactionID that distinguishes between profile download sessions, the SM-DP+ 500 could download a profile to only one terminal at a time; and thus when a certain terminal delays responding to the SM-DP+ during interworking with the SM-DP+, other terminals could not download profiles. To solve this problem of download impossibility, the SM-DP+ 500 may apply a session-specific lifetime so as to delete a session after a period of time corresponding to the lifetime of the session expires, but this approach still has a limitation on the processing capability of the SM-DP+ 500. However, a plurality of sessions can be identified using the TransactionID, and thus the SM-DP+ 500 can process requests from a plurality of terminals.

If the SM-DP+ 500 receives a MatchingID or an EID from the LPA 502, the SM-DP+ 500 may check whether there is a to-be-downloaded profile corresponding to the MatchingID or EID.

Further, for data including the eUICC_Challenge, the DP Challenge, and the TransactionID value, the SM-DP+ 500 may generate a DP signature by using the SK.DP.ECDSA (522).

The DP signature may be a signature value for authenticating the SM-DP+ 500 by the eUICC 504.

The SM-DP+ 500 may deliver the signature certificate (CERT.DP.ECDSA) of the SM-DP+ 500, the DP challenge, the TransactionID, and the DP signature, in response to the ES9+.InitiateDownload message 520 (524).

Upon receiving the response (524), the LPA 502 may send an ES10b.PrepareDownload message to the eUICC 504 (526). The ES10b.PrepareDownload message may also be an ES10b.GetAuthDataRequest message. The ES10b.PrepareDownload message may contain the CERT.DP.ECDSA, the DP Challenge, the TransactionID, and the DP Signature.

The eUICC 504 may verify the DP certificate (CERT.DP.ECDSA) by using the CI certificate or CI public key stored in the eUICC 504 (528).

If the verification of the certificate (CERT.DP.ECDSA) is successful, the eUICC may verify the SM-DP+'s signature value (DP signature) (528). The eUICC 504 may use the DP challenge and TransactionID received from the LPA 502, the eUICC challenge delivered to the LPA 502 by the eUICC 504, and the public key (PK.DP.ECDSA) of the SM-DP+ 500 included in the CERT.DP.ECDSA to verify the DP signature.

If the DP signature passes the verification, the eUICC 504 may generate an one-time asymmetric key pair (otPK.EUICC.ECKA, otSK.EUICC.ECKA) (528). Alternatively, when the ES10b.PrepareDownload 526 is triggered by a specific SM-DP+ or when the LPA 502 requests the ES10b.PrepareDownload 526 by using a separate indicator, the eUICC 504 may load and use a previously generated one-time asymmetric key pair, rather than newly generating an one-time asymmetric key pair.

The one-time asymmetric key pair of the eUICC 504, together with the one-time asymmetric key pair of the SM-DP+ 500, may be used to generate an encryption key between the SM-DP+ 500 and the eUICC 504. The encryption key may be generated in such a manner that the SM-DP+ 500 generates the encryption key by combining the one-time private key of the SM-DP+ 500 and the one-time private key of the eUICC 504, or the eUICC 504 generates the encryption key by combining the one-time private key of the eUICC 504 and the one-time private key of the SM-DP+ 500. The SM-DP+ 500 may transmit factors additionally required for generation of the encryption key to the eUICC 504 via the LPA 502 in subsequent steps.

For data including the one-time public key (otPK.EUICC.ECKA) of the generated one-time asymmetric key pair and the DP challenge, the eUICC 504 may calculate an eUICC signature value (eUICC_Sign2) by using the signature private key (SK.eUCIC.ECDSA) of the eUICC 504. Since the DP challenge generated by the SM-DP+ 500 is used for the calculation of the eUICC signature value, the SM-DP+ 500 may use the eUICC signature value to authenticate the eUICC 504 in subsequent steps. Further, the eUICC_Sign2 allows the eUICC 504 to deliver the generated otPK.eUICC.ECKA value to the SM-DP+ 500 without any forgery.

The eUICC 504 may transmit the generated eUICC one-time public key (otPK.EUICC.ECKA) and the generated eUICC signature value (eUICC_Sign2) to the LPA 502 (530).

The LPA 502 may send an ES9+GetBoundProfilePackage message to the SM-DP+ 500 (532). The ES9+GetBoundProfilePackage message 532 may also be called an eUICCManagementRequest or ProfileRequest message.

The ES9+GetBoundProfilePackage message 532 may contain the eUICC one-time public key and the eUICC signature. Additionally, the ES9+GetBoundProfilePackage message 532 may also carry the eUICC signature certificate (CERT.eUICC.ECDSA) for verification of the eUICC signature value and the EUM certificate (CERT.EUM.ECDSA) for verification of the eUICC signature certificate. Additionally, the ES9+GetBoundProfilePackage message 532 may contain the EventID, MatchingID, NotificationID, or Activation Code Token for use as an identifier in downloading a specific profile.

When the eUICC certificate has been delivered to the SM-DP+ 500, the SM-DP+ 500 may verify the EUM certificate by using the CI certificate or CI certificate public key (PK.CI.ECDSA). The SM-DP+ 500 may verify the eUICC certificate by using the verified EUM certificate and verify the eUICC signature value by using the eUICC certificate. Optionally, the certificate and signature verifications may be omitted.

The SM-DP+ 500 may verify the eUICC signature (i.e., eUICC_Sign2) by using the eUICC one-time public key received from the LPA 502 in step 532, the DP challenge delivered to the LPA 502 in step 524, and the public key contained in the eUICC certificate (534). If the verification of the eUICC_Sign 2 is successful, then this means that the SM-DP+ 500 has authenticated the eUICC 504. If the verification is unsuccessful, then the SM-DP+ 500 may stop the corresponding session and return an error message to the LPA 502.

The SM-DP+ 500 may map a profile to be downloaded, by using the EventID (or NotificationID, MatchingID, or Activation Code Token) value received in step 532. If there is no profile to be downloaded, the SM-DP+ 500 may return an error message and end the corresponding session.

The SM-DP+ 500 may generate a DP one-time asymmetric key pair (otPK.DP.ECKA, otSK.DP.ECKA) (534). The SM-DP+ 500 may generate an encryption key between the eUICC 504 and the SM-DP+ 500 by using the DP one-time asymmetric key pair (534). The encryption key is generated as follows.

The SM-DP+ 500 generates the encryption key by combining the one-time private key of the SM-DP+ and the one-time private key of the eUICC.

The eUICC 504 generates the encryption key by combining the one-time private key of the eUICC 504 and the one-time private key of the SM-DP+.

Further, the SM-DP+ 500 may calculate an SM-DP+ signature value (DP Signature2) (534). The DP Signature2 is a value calculated for data including a control reference template (CRT), the SM-DP+ one-time public key, the eUICC one-time public key, and the TransactionID by using the SM-DP+ signature private key (SK.DP.ECDSA). The CRT may be used as a factor for generating the encryption key.

The SM-DP+ 500 may generate a profile package (Bound Profile Package or BPP) bound to a specific eUICC (534). The BPP may include the CRT, the one-time public key of the SM-DP+ 500, and the DP Signature2. Further, the BPP may include ProfileInfo (or MetaData) encrypted with the encryption key. Further, the BPP may include an encrypted profile protection key (PPK) obtained by encrypting a PPK with the generated encryption key. Further, the BPP may include profile package blocks (PPBs) encrypted with the generated encryption key or the PPK. The encrypted PPBs may be obtained by dividing the entire profile data into installable units, that is, profile elements (PEs), dividing the PE into encryptable units, that is, PPBs, and then encrypting the PPBs. The PPBs may be encrypted using the SCP03t protocol.

The SM-DP+ 500 may return the BPP to the LPA 502, in response to the ES9+GetBoundProfilePackage message 532 (536).

The LPA 502 may send an ES1b.LoadBoundProfilePackage message multiple times (N) so as to deliver ES8+.InitializeSecureChannel information included in the BPP to the eUICC 504 (538). The ES8+.InitializeSecureChannel information may include the CRT, the one-time public key of the SM-DP+, and the DP Signature2. The ES8+.InitializeSecureChannel information may also be referred to as EstablishSecureChannel information. The ES10b.LoadBoundProfilePackage message may carry a "StoreData" command.

The eUICC 504 may verify the DP signature value (DP Signature2) by using the public key (PK.DP.ECDSA) of the DP signature certificate (CERT.DP.ECDSA) received in step 526, the CRT received in step 538, the one-time public key of the SM-DP+, and the one time public key of the eUICC delivered to the LPA 502 in step 530 (540).

If the verification 540 is unsuccessful, the eUICC 504 returns an error message to the LPA 502 and does not perform the subsequent steps. If the verification 540 is successful, the eUICC 504 may generate an encryption key by using the CRT, the one-time private key of the eUICC, and the one-time public key of the SM-DP+. Optionally, the eUICC 504 may deliver an APDU N times to the LPA 502, in response to the ES10b.LoadBoundProfilePackage message 538 (542).

The LPA 502 may send the ES1b.LoadBoundProfilePackage message multiple times (N) so as to deliver ES8+.SetProfileInfo information included in the BPP to the eUICC 504 (544). The ES8+.SetProfileInfo may also be referred to as ES8+.StoreMetadata or InstallProfileRecord. The ES8+.SetProfileInfo may include the ProfileInfo (or Metadata or ProfileRecord). Optionally, the eUICC 504 may deliver an APDU N times to the LPA 502, in response to the ES10b.LoadBoundProfilePackage message 544 (546).

Optionally, the LPA 502 may send the ES10b.LoadBoundProfilePackage message multiple times (N) so as to deliver ES8+.ReplaceSessionKey information to the eUICC 504 (548). That is, when the BPP received by the LPA 502 from the SM-DP+ 500 includes ES8+.ReplaceSessionKey information, the LPA 502 may send the ES10b.LoadBoundProfilePackage message N times so as to deliver the ES8+.ReplaceSessionKey information included in the BPP to the eUICC. The ES8+.ReplaceSessionKey information may be referred to as UpdateSessionKeyRequest information. The ES8+.ReplaceSessionKey information may include the ProfileProtectionKey (PPK) encrypted with the encryption key in step 534. Optionally, the eUICC 504 may deliver an APDU N times to the LPA 502, in response to the ES10b.LoadBoundProfilePackage message 548 (550).

Subsequently, the LPA 502 may send the ES1b.LoadBoundProfilePackage message multiple times (N) so as to deliver the encrypted profile package blocks (PPBs) or profile segments included in the BPP to the eUICC 504 (552). The eUICC 504 may decrypt and process the respective profile segments in sequence by using the encryption key or PPK.

After all the profile segments are processed, the eUICC 504 may calculate the eUICC signature value and deliver the same to the LPA 502 (554). With regard to this, the LPA 502 may inform the SM-DP+ 500 of the result of the profile installation by sending the corresponding eUICC signature value through an ES9+.SendResult message (556), and the SM-DP+ 500 may send a confirmation (OK) message to the LPA 502 (558).

Figure 6A:
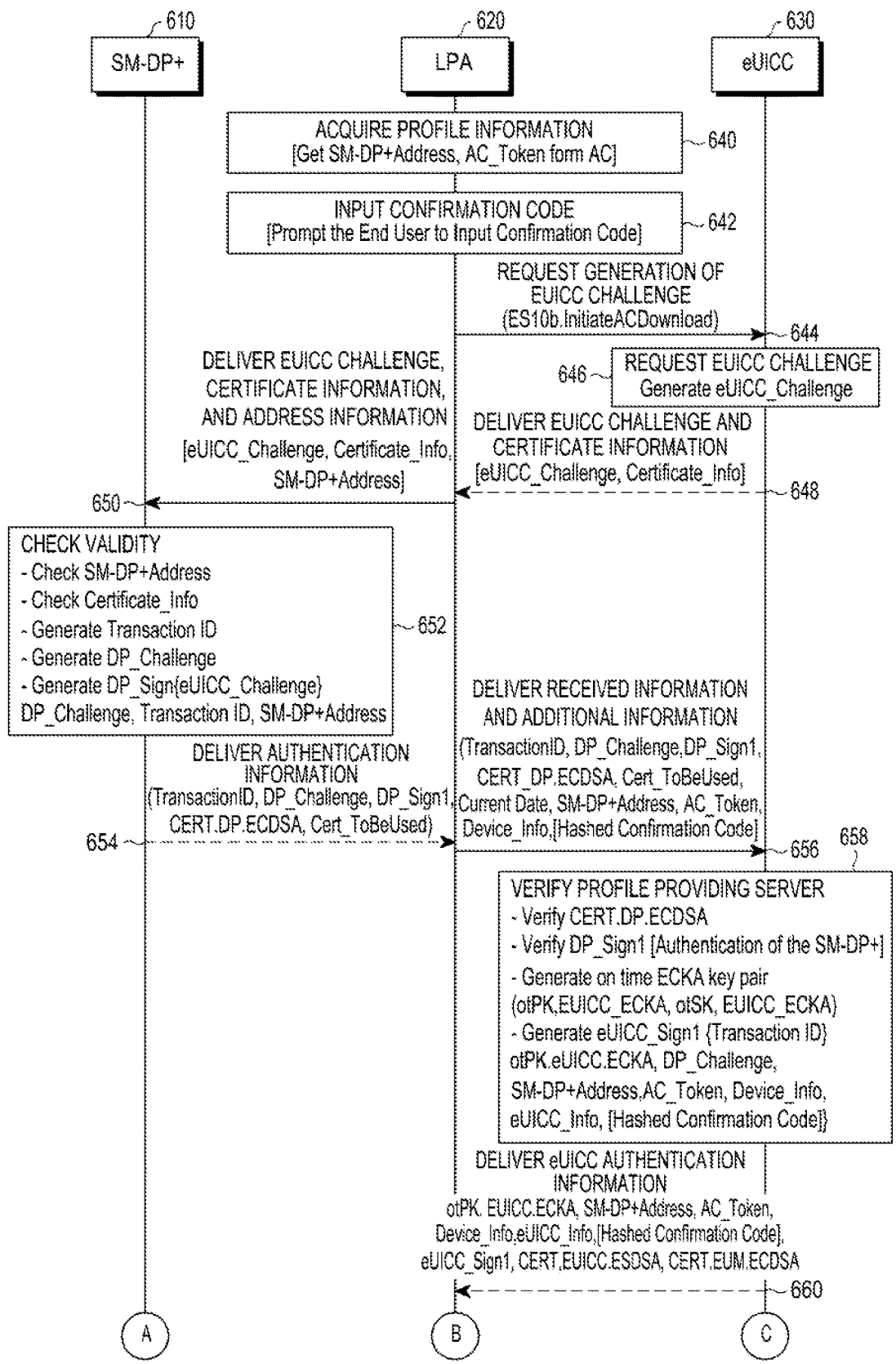
FIGS. 6A and 6B are diagrams illustrating another profile installation method according to the present disclosure.
Figure 6B:
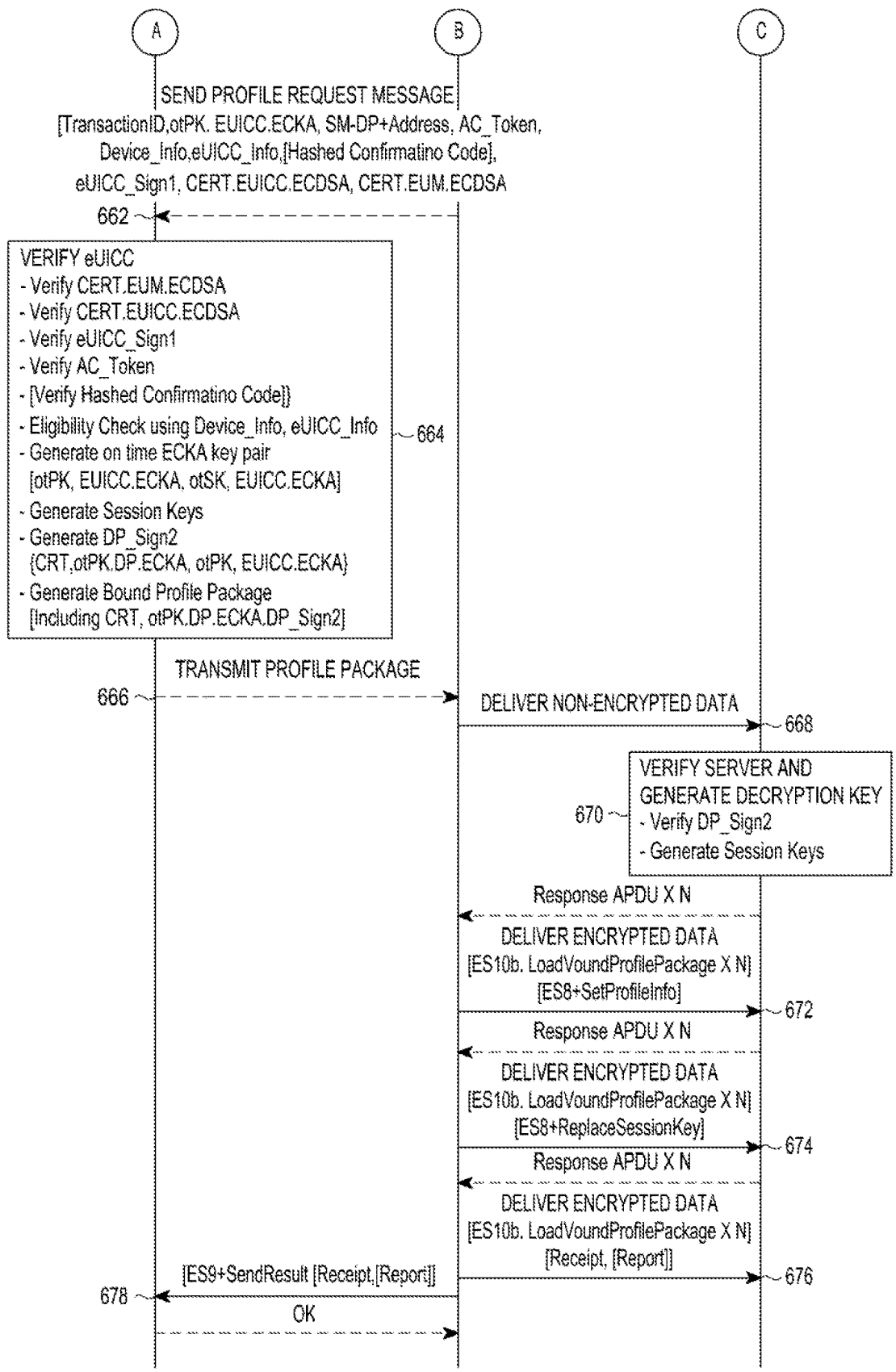

FIGS. 6A and 6B are diagrams illustrating another profile installation method according to the present disclosure.

In FIGS. 6A and 6B, when compared to FIGS. 5A and 5B, the eUICC signature step in the initial round will be omitted and steps subsequent to the initial round will be described in more detail.

Referring to FIGS. 6A and 6B, the LPA 620 may acquire profile information (640). For example, the LPA 620 may receive the address of the SM-DP+ 610 and a profile installation key from the SM-DS. The profile installation key may be the EventID, the MatchingID, the NotificationID, or the Activation Code Token. Here, the eUICC 630 is inserted into or embedded in the LPA 620, and operations of the LPA 620 and the eUICC 630 may be construed as internal operations of the terminal.

The LPA 620 may input a confirmation code by using the acquired profile installation key information (642). Step 642 is not an essential step, and may be optionally performed when the confirmation code exists.

The LPA 620 may request the eUICC 630 for generating an eUICC challenge (644).

When the LPA 620 requests the generation of an eUICC challenge, the eUICC 630 may generate the eUICC challenge and then store the same.

The eUICC 630 may deliver the generated eUICC challenge and certification information (Certificate_Info) to the LPA 620 (648). The certification information (Certificate_Info) may include an eUICC certificate type and available encryption key information. The encryption key information may mean elliptic curve parameters. The encryption key information may be plural in number, and may separately include information used for signature generation and information used for signature verification. Since the elliptic curve parameters are delivered, the SM-DP+ can select compatible elliptic curve parameters.

The LPA 620 may deliver the eUICC challenge, the Certificate_Info, and additionally the address information of the SM-DP+ 610, included in the profile information, to the SM-DP+ 610 corresponding to the address information (650).

The SM-DP+ 610 may check whether the SM-DP+ included in the received information is valid (652). The validity check may be performed by verifying whether the received address information of the SM-DP+ is the same as the server address of the SM-DP+ 610 or checking whether the received address information of the SM-DP+ corresponds to any of a plurality of valid addresses. If the validity check is unsuccessful, the SM-DP+ 610 may transmit an error code to the LPA 620 and stop the profile download procedure.

Further, the SM-DP+ 610 may check the Certificate_Info (652). First, the SM-DP+ 610 may check whether the certificate type is valid. Further, the SM-DP+ 610 may check whether the encryption key information is supportable by the SM-DP+ 610. The checking process may be a process of comparing whether encryption key information for the signature of the eUICC 630 matches encryption key information verifiable by the SM-DP+ 610 and whether encryption key information for verification by the eUICC 630 matches encryption key information used to generate a signature by the SM-DP+ 610.

If the checking process is valid, the SM-DP+ 610 may store the certificate type and the encryption key information to be used and then generate a transaction ID (TransactionID) (652). The SM-DP+ 610 may use the transaction ID to check whether a subsequent request message from the LPA 620 is valid. The transaction ID may also serve as an identifier for allowing the SM-DP+ to simultaneously process requests from a plurality of terminals.

Subsequently, the SM-DP+ 610 may generate a DP challenge (652). The DP challenge may be a SM-DP+ 's challenge or a profile providing server's challenge. The DP challenge may be a 16-byte random number.

Subsequently, the SM-DP+ 610 may generate a DP_Sign1 (652). The DP_Sign1 may be a signature value generated by the SM-DP+ 610, the signature value including the eUICC_Challenge, the DP_Challenge, and the TransactionID.

If step 652 is normally performed, the SM-DP+ 610 may deliver authentication information to the LPA 620 (654). The SM-DP+ 610 may deliver information including the transaction ID, the DP challenge, the DP_Sign1, the SM-DP certificate, and the Cert_ToBe_Used to the LPA 620. The SM-DP+ certificate may be an elliptic curve digital signature algorithm (ECDSA) certificate. The Cert_ToBe_Used may be information including the certificate type and the encryption key information to be used, which are stored in the SM-DP+ 610.

The LPA 620 may deliver the received information and additionally a current time of the terminal, the address of the profile providing server, the profile installation key (AC_Token), the terminal information, and the hashed confirmation code to the eUICC 630 (656). The hashed confirmation code may be delivered when step 642 is performed. Further, before step 656 is performed, the LPA 620 may map the transaction ID and the address of the SM-DP+ and store the mapped transaction ID and the SM-DP+ address together.

The eUICC 630 may verify the SM-DP+ 610 on the basis of the information received in step 656 (658).

First, the eUICC 630 verifies the SM-DP+ certificate (CERT.DP.ECDSA) (658). The verification may be a signature verification process using a certificate issuer (CI) certificate or a public key of the CI certificate, stored in the eUICC 630. The signature verification may be a verification process using a public key that is selected using information included in the Cert_ToBe_Used.

If the verification is successful, the eUICC 630 verifies the delivered DP_Sign1 (658). The verification may be a signature verification process using the public key included in the SM-DP+ certificate. If the verification is successful, then this means that the eUICC 630 has authenticated the SM-DP+ 610.

Subsequently, the eUICC 630 may generate an one-time public key and personal key pair (658). The SM-DP+ 610 also generates the public key and personal key pair as a separate value. When the SM-DP+ 610 and the eUICC 630 exchange only the public key of the so generated value with each other, they may share a session key by combining the public key with the personal key. Since the public key is generated as an one-time key, they may share a new session key whenever a profile is downloaded.

With regard to this, in order to safely deliver the public key, the eUICC 630 may generate a signature value (eUICC_Sign1) by using the public key and deliver the same (658). To this end, the eUICC 630 may generate a signature by using the personal key previously stored in the eUICC 630, the signature including the received DP challenge along with the one-time public key of the eUICC 630. Since the signature including the DP challenge is generated, the SM-DP+ 610 may subsequently authenticate the eUICC 630. The signature may additionally include at least one of the transaction ID, the address of the SM-DP+, the profile installation key, the terminal information, the eUICC information, and the hashed confirmation code value, and the additionally included information may be used for additional verification of the SM-DP+ 610. For convenience, the signature is referred to the eUICC_Sign1. When the signature is generated, the eUICC 630 may generate the signature by selecting the personal key of the eUICC, which matches the certification type and the encryption key information used in the received Cert_ToBe_Used.

The eUICC 630 may deliver eUICC authentication information to the LPA 620 (660). The eUICC authentication information may include at least one of the one-time public key of the eUICC, the SM-DP+ address, the profile installation key, the terminal information, the eUICC information, the hashed confirmation code value, the eUICC_Sign1, the eUICC certificate, and the certificate of the EUM issuing the eUICC certificate.

The LPA 620 may send a profile request message to the SM-DP+ 630 (662). The profile request message sent to the SM-DP+ 610 may carry the eUICC authentication information received from the eUICC 630. The LPA 620 may deliver at least one of the transaction ID stored before performing step 656, the eUICC one-time public key, the SM-DP+ address, the profile installation key, the terminal information, the eUICC information, the hashed confirmation code information, the eUICC_Sign1, the eUICC certificate, and the certificate of the EUM issuing the eUICC certificate to the SM-DP+ 610 by transmitting the same to the SM-DP+ address corresponding to the transaction ID.

The SM-DP+ 610 may check the transaction ID received in step 662 so as to check whether a valid transaction ID exists, and if there is no valid transaction ID, may return an error code to the LPA 620 and end the download procedure. The valid transaction ID may, for example, indicate that the transaction ID is stored in a storage or a memory of the SM-DP+ and thus can be retrieved, and the SM-DP+ corresponding to the transaction ID performs step 654 but first receives the message corresponding to step 662. However, when the message of step 662 has been already received and then the message of step 662 is received for the same transaction ID, the error code may not be returned in some cases. For example, when a second profile request message is sent while step 664 to be described below is performed for the message received first in step 662, the error code is not returned for the second profile request message and the second message may be discarded.

Subsequently, for the profile request that is determined as the valid transaction, the SM-DP+ 610 may verify the eUICC (664).

The SM-DP+ 610 may verify the EUM (eUICC manufacturer) certificate (664). The verification may be a verification process of first extracting the public key from the CI certificate stored in the SM-DP+ 610 and then verifying the signature of the eUICC manufacturer certificate by using the extracted public key, or verifying the signature of the eUICC manufacturer certificate by directly using the stored public key.

Subsequently, the SM-DP+ 610 may use the certificate public key extracted from the EUM certificate to verify the signature value included in the received eUICC certificate, thereby verifying the eUICC certificate (664).

Subsequently, the SM-DP+ 610 may use the public key included in the verified eUICC certificate to verify the eUICC_Sign1 value (664). If the verification is successful, then this means that the SM-DP+ 610 has authenticated the eUICC 630.

Subsequently, the SM-DP+ 610 may verify whether the profile installation key (AC_Token) is valid (664). This may be a process of checking whether the value matching the corresponding profile installation key exists among values stored in the storage of the SM-DP+ and whether there is a downloadable profile corresponding to the stored profile installation key.

Further, optionally, the SM-DP+ 610 may verify the hashed confirmation code (664). This may be a process of simply comparing the hashed confirmation code with the stored hashed confirmation code or a process of newly calculating a hashed confirmation code and comparing the hashed confirmation code with the calculated hashed confirmation code.

Subsequently, the SM-DP+ 610 may additionally determine whether the profile installation is possible, that is, the eligibility of the profile installation, by comparing the terminal information, the eUICC information, and the like. The information may also include accessible network type information and installable memory region information.

Only when the verification as described above is successful, the SM-DP+ 610 may approve the profile download and perform the subsequent steps. If the verification is unsuccessful, the SM-DP+ 610 may return an error code to the LPA 620 and end the profile download procedure. With regard to this, the SM-DP+ 610 deletes the stored transaction ID and the stored DP challenge before ending the download procedure. If the verification is successful, as described above, the SM-DP+ 610 may generate an one-time public key and private key pair of the profile providing server (664). The encryption key information used for generation of the one-time asymmetric key pair may be the encryption key information included in the Cert_ToBe_Used delivered in step 654.

As described above, the SM-DP+ 610 may generate a session key by using the private key and the received one-time public key of the eUICC (664). The CRT information and the EID information may be additionally used for the generation of the session key.

Further, the SM-DP+ 610 may generate DP_Sign2 (664). The DP_Sign2 may be a signature value using the previously stored private key of the SM-DP+ and may correspond to a signature value calculation for the value including the CRT, the DP one-time public key, and the eUICC one-time public key.

Further, the SM-DP+ 610 may use the generated session key to generate an encrypted profile package (664). The encrypted profile package may be generated by one of the following two methods.

Method 1: a session key is generated for a non-encrypted profile package and the profile package is encrypted with the generated session key by using the SCP03t encryption scheme.

Method 2: a random key is previously randomly generated for a non-encrypted profile package, the profile package is encrypted with the random key, the random key is encrypted with the generated session key to generate an encrypted random key, and the profile package is combined with the encrypted random key.

The encrypted profile package may additionally include the CRT, the one-time public key of the profile providing server, and the generated DP_Sign2 that may be used to generate the session key by the eUICC.

The SM-DP+ 610 may transmit the encrypted profile package to the LPA 620 (666).

The LPA 620 may deliver the profile package to the eUICC 630. With regard to this, the LPA 620 may deliver non-encrypted data in the profile package. The LPA 620 may distinguish between non-encrypted data and a plurality of pieces of encrypted data in the encrypted profile package, divide the non-encrypted data into sizes transmittable to the eUICC 630, and first deliver the divided non-encrypted data to the eUICC 630. The delivery method may be a method using a "STORE DATA" APDU.

Further, the non-encrypted data may be distinguished by identifying a tag value included in the encrypted profile package. The tag value may be the first 1-byte or 2-byte data in the encrypted profile package, the end of the non-encrypted data may be delimited by identifying the subsequent length bytes, and the delimited non-encrypted data may be delivered.

The non-encrypted data may include the CRT, the DP one-time public key, and the DP_Sign2 value.

The eUICC 630 may verify the signature and generate a decryption key (670). The eUICC 630 may verify the DP_Sign2. This may be a signature verification process using the previously checked public key of the SM-DP+ certificate. If the verification is successful, the eUICC 630 may generate a session key for decrypting the encrypted profile package by using the received CRT, SM-DP+ one-time public key value, EID value, and the eUICC one-time private key value stored only in the eUICC.

The LPA 620 may transmit the encrypted data (672). The LPA 620 may identify, as the encrypted data, the data after the boundary of the non-encrypted data delimited at the time of performing step 668, check whether a specific tag exists, and when a tag indicating the encrypted data is discovered, determine the size of the encrypted data by identifying the length bytes subsequent to the tag and transmit the encrypted data corresponding to the size to the eUICC 630. With regard to this, it is possible to segment the encrypted data and separately transmit the data segments by using the "STORE DATA" command.

Subsequently, the LPA 620 may perform a process similar to step 672 for the next encrypted data. The data transmitted in this step may be the encrypted random key described in connection with when the encrypted package is generated by method 2 in step 664. When the eUICC 630 receives the encrypted random key, for the subsequent encryption data, the eUICC 630 may decrypt the encrypted random key with the session key to extract the random key and thereafter use the random key as the session key for decrypting the subsequent encrypted data.

Subsequently, the LPA 620 may identify other encrypted data identifying tag values and length bytes to distinguish between a plurality of encryption data, and may transmit each of the encrypted data to the eUICC 630 by using a plurality of "STORE DATA" commands.

Then, the eUICC 630 decrypts each of the encrypted data by using the session key or the decrypted random key, and installs the profile by the installable unit on the basis of profile installable unit information included therein. Of course, the installable unit information may be installed so as to decrypt the subsequent encrypted data. If all the encrypted data are completely transmitted and decrypted and all the installable unit information are completely installed by repeating the above steps, then the eUICC 630 may transmit the corresponding result to the LPA 620, and the result may be delivered to the SM-DP+ 610 (678).

In the embodiments of the present disclosure, the LPA 620 and the eUICC 630 have been separately described, but the eUICC may be included in or inserted into the terminal. Therefore, in the embodiments of the present disclosure, the operations between the terminal and the eUICC may also be construed as the internal operations of the terminal including the eUICC.

According to the operations as described above, the authentication, verification, profile package download, profile package delivery, and profile installation procedures can be performed for the eUICC and the SM-DP+.

If the profile installation procedure of FIG. 6 ends, the LPA 620 may transmit a profile enable command to the eUICC 630 so as to enable the profile, and may use the mobile communication network after performing authentication with the mobile communication system by using the enabled profile.

Figure 7A:
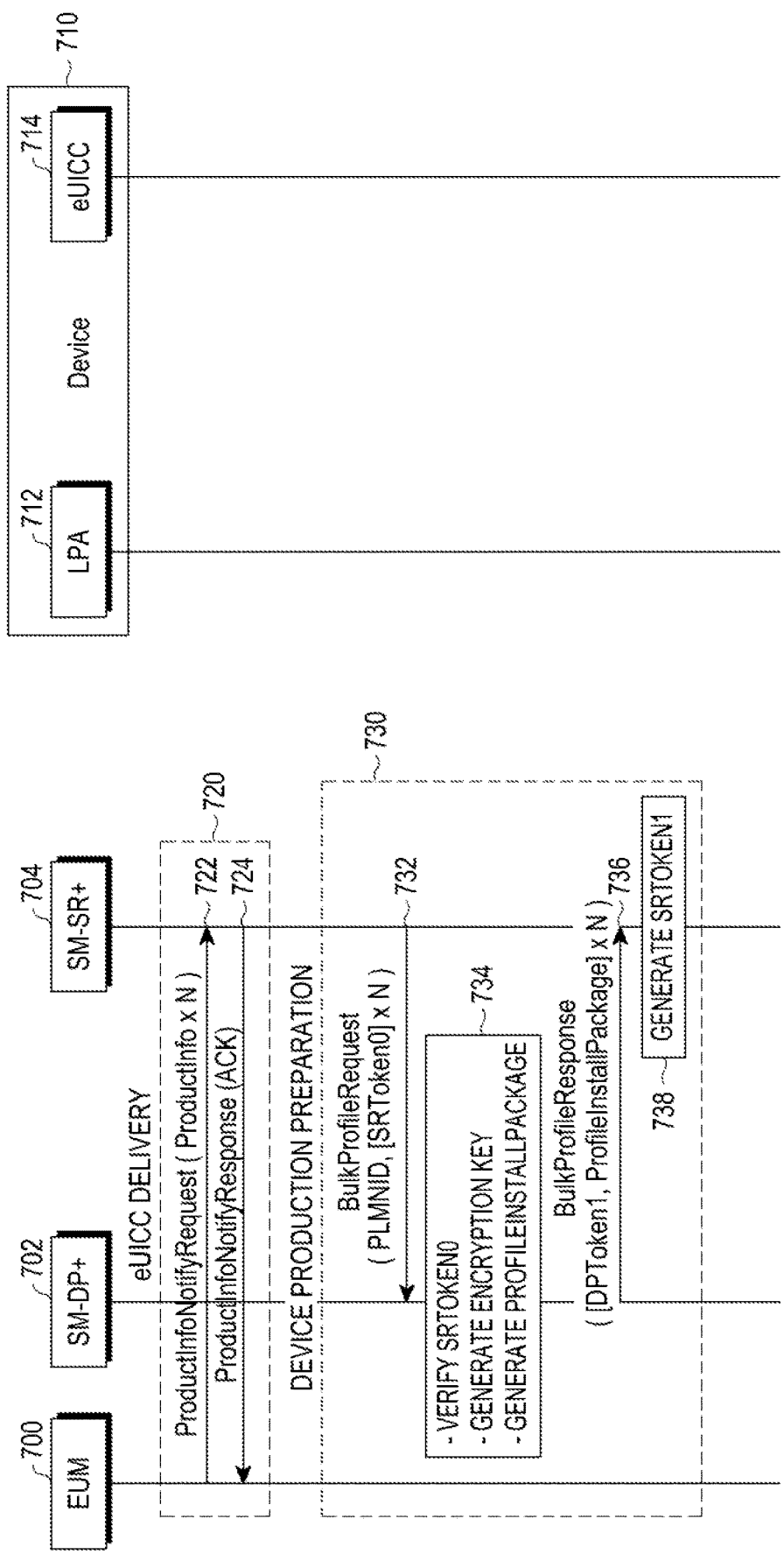
FIGS. 7A, 7B, and 7C are diagrams illustrating a method for provisioning bulk profiles for a plurality of terminals at one time.
Figure 7B:
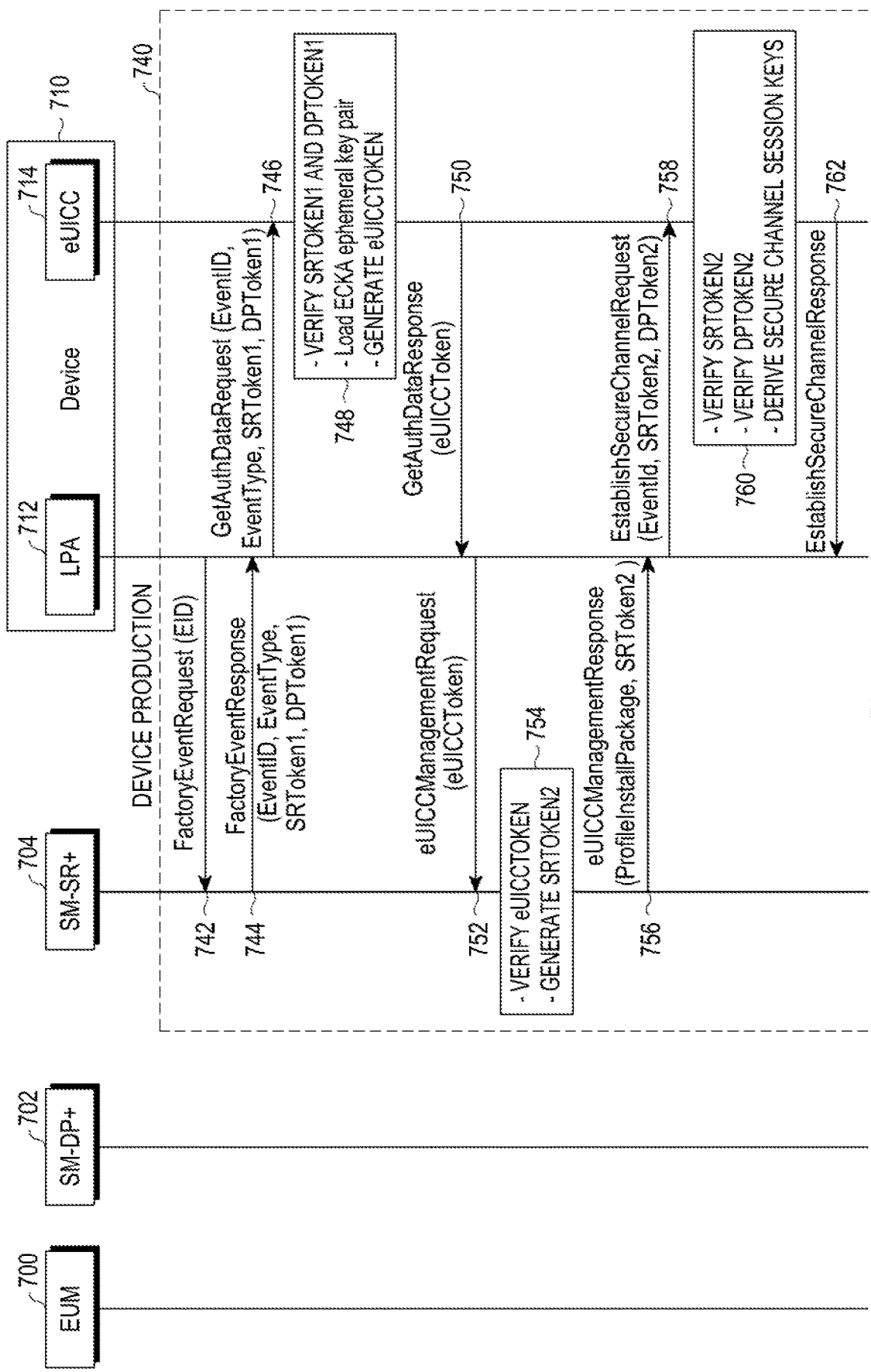
Figure 7C:
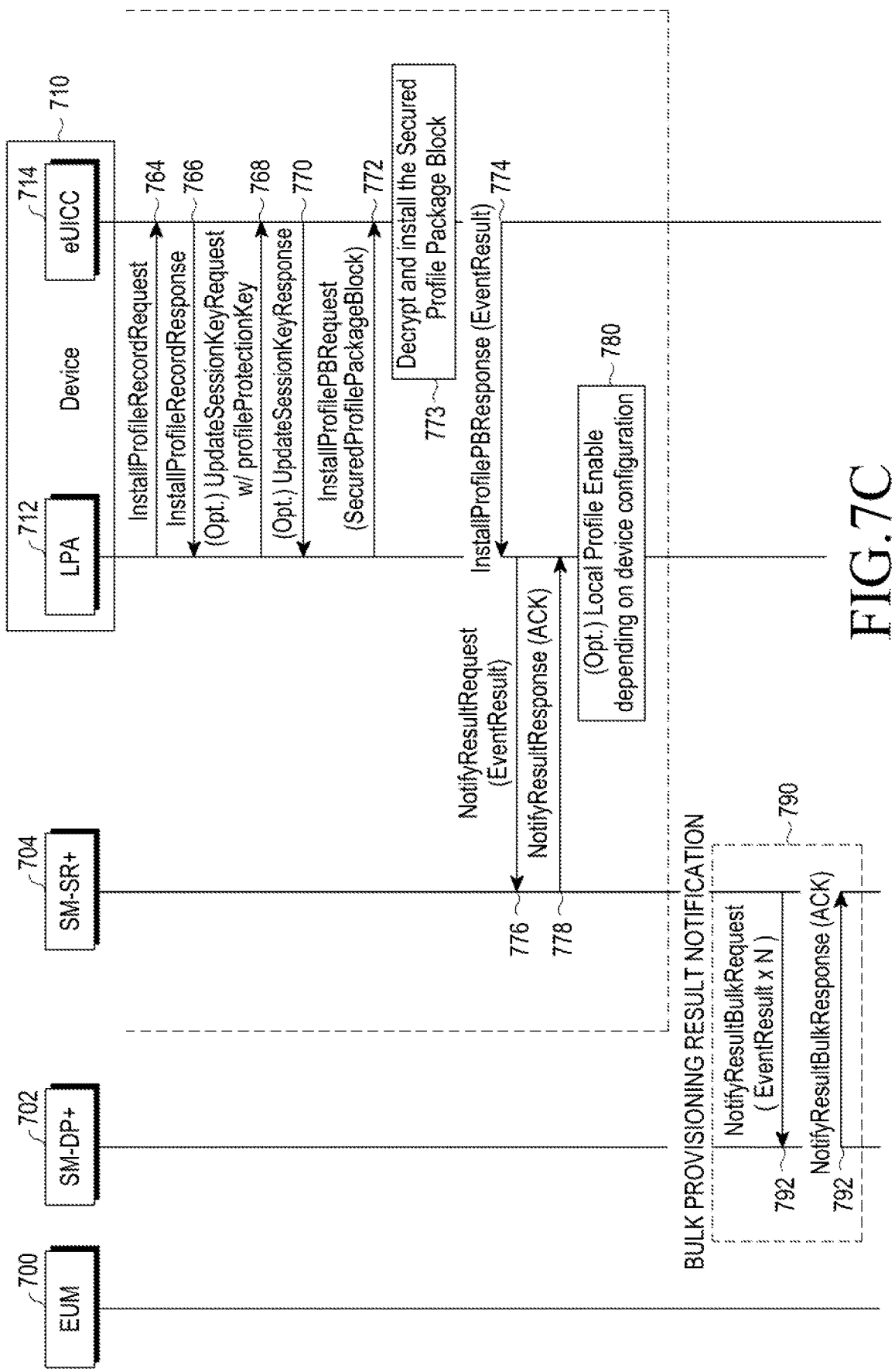

FIGS. 7A, 7B, and 7C illustrate a method for provisioning bulk profiles for a plurality of terminals at one time.

Referring to FIG. 7, for the convenience of the description, a procedure of installing the bulk profiles may be divided into an eUICC delivery phase 720, a device production preparation phase 730, and a device production phase 740.

Reference will first be made to the eUICC delivery phase 720.

The SM-SR+ (or production server) 704 may receive a ProductionInfoNotifyRequest message from the eUICC manufacturer (EUM) 700 and thereby receive product information of N eUICCs (722). The SM-SR+ 704 may send a ProductionInfoNotifyResponse (ACK) message to the EUM (724).

The eUICC 714 may be configured to perform the following steps only for a specific SM-SR+, and a method for specifying a SM-SR+ may include the following two methods.

The EUM previously configures the identifier of the SM-SR+ when the eUICC is manufactured.

A specific credential is transmitted to the SM-SR+, and the eUICC performs a specific procedure only when a request is made using the credential.

The product information of the N eUICCs may include eUICC Info, an eUICC certificate, a previously generated one-time public key, and an EUM certificate. The product information may also additionally include the credential. The previously generated one-time public key may be used by the eUICC only via a specific SM-SR+.

Next, reference will be made to the device production preparation phase 730.

The SM-SR+ 704 may send a BulkProfileRequest message to the SM-DP+ 702 so as to request the SM-DP+ 702 for preparation for downloading a plurality of profiles (732). The BulkProfileRequest message in this step may include the following information.

Profile type identifier

SM-SR certificate and signature value

N eUICC certificates, N eUICC one-time public keys, N pieces of eUICC information The N pieces of information may be transmitted in a form in which the SM-DP+ 702 can map the information to eUICCs.

The signature value may be a signature value for a value including the one-time public key.

The SM-DP+ 702 may verify the SR-SM+ certificate and signature value (SRToken0) (734).

If the verification is successful, the SM-DP+ 702 may generate an one-time asymmetric key pair (i.e., public key and private key), and may use the eUICC one-time asymmetric key pair with the one-time key received in step 732 to generate an encryption key (734). The encryption key may be used to encrypt a profile or encrypt a symmetric key with which a profile is encrypted.

The SM-DP+ 702 may generate N pieces of data each including an encrypted profile, the one-time public key generated by the SM-DP+, and the SM-DP+ signature value, that is, N ProfileInstallPackages (734).

The SM-DP+ 702 may send a BulkProfileResponse message to the SM-SR+ 704 so as to deliver the generated ProfileInstallPackages (736).

For a value including some or all of the data received from the SM-DP+, the SM-SR+ 704 may calculate the signature value (SRToken1) of the SM-SR+ 704 (738). The signature value may be a value previously possessed by the SM-SR+ 704 or may be a signature value using a "specific credential" received from the EUM in step 722.

Next, reference will be made to the device production phase 740.

For the convenience of the description, it is assumed that each device 710 includes the LPA 712 and the eUICC 714. If a specific condition is satisfied, the LPA 712 may send a FactoryEventRequest (EID) message to the SM-SR+ 704 so as to request the SM-SR+ 704 for profile installation (742). The specific condition may be a condition applied in the device production phase (e.g., in device manufacturing factory), and for example, may be as follows.

The step is performed if a command is received through wireless communication or wired connection The step is performed if a command is received through a manual operation The step is performed if a specific time reaches The step is performed if passing through a specific location With regard to this, the LPA 712 may receive the eUICC challenge value from the eUICC 714 before sending the FactoryEventRequest message 742. The FactoryEventRequest message 742 may include at least one of the EID and the eUICC challenge.

When the FactoryEventRequest message 742 includes the eUICC challenge, the SM-SR+ signature value (SRToken1) including the eUICC challenge may be calculated in step 728.

The SM-SR+ 704 may transmit a response including the signature value of the SM-DP+ 702 and the signature value of the SM-SR+ 704 to the LPA (744).

The LPA 712 may send a profile installation preparation message (GetAuthDataRequest) including the signature value of the SM-DP+ 702 and the signature value of the SM-SR+ 704 to the eUICC 714 (746).

The eUICC 714 verifies the signature of the SM-SR+ 704, and if the verification is successful, verifies the signature of the SM-DP+ 702 (748). If either of the verifications is unsuccessful, the eUICC 714 returns an error message and ends the procedure without performing the subsequent steps. Optionally, the eUICC 714 may check whether the SM-SR+ 704 is a specific server. The check method may be a method of checking the ID of the SM-SR+ 704 or verifying the signature value of the SM-SR+ 704. The eUICC 714 may newly generate an one-time asymmetric key pair when the SM-SR+ 704 is not an authorized server (i.e., specific server), but may use the previously generated one-time asymmetric key pair without newly generating an one-time asymmetric key pair when the SM-SR+ 704 is an authorized server (i.e., specific server).

For data including the one-time public key and the parameters received from the LPA, the eUICC 714 may generate an eUICC signature value (eUICCToken) by using the signature private key configured for the eUICC (748).

Subsequently, the eUICC 714 may send a GetAuthDataResponse message to the LPA 712 so as to deliver data including the eUICC signature value and the one-time public key to the LPA 712 (750).

The LPA 712 may send an eUICCManagementRequest message including the received eUICC signature value and one-time public key to the SM-SR+ 704 so as to request the SM-SR+ 704 for profile download (752).

The SM-SR+ 704 verifies the eUICC signature value (754). If the verification is unsuccessful, the SM-SR+ 704 may return an error message and then stop the profile installation procedure for the corresponding device. Further, the SM-SR+ 704 may sign a part or all of the encrypted profile, received in step 736, by using the signature private key of the SM-SR+ 704 (754). Another signature value of the SM-DP+ 702 may also be included in the encrypted profile.

In response to the message of step 752, the SM-SR+ 704 may send an eUICCManagementResponse message to the LPA 712 so as to deliver the encrypted profile and the signature value of the SM-SR+ 704 to the LPA 712 (756).

The LPA 712 may send an EstablishSecurChannelRequest message to the eUICC 714 so as to deliver, to the eUICC 714, the signature value (DPToken2) obtained by signing data including the signature value (SRToken2) of the SM-SR+ 704, the one-time public key of the SM-SR+ 704, and the one-time public key of the SM-DP+ 702 with the signature private key of the SM-DP+ (758).

The eUICC 714 may verify the signature value of the SM-SR+ 704 (760). If the verification is unsuccessful, the eUICC 714 may return an error message to the LPA 712 and end the profile installation procedure.

If the signature value of the SM-SR+ 704 is successfully verified, the eUICC 714 may verify the signature value of the SM-DP+ 702 (760). If the verification is unsuccessful, the eUICC 714 may return an error message and end the profile installation procedure.

If the signature value of the SM-DP+ 702 is successfully verified, the eUICC 714 may generated an encryption key by using the one-time public key of the SM-DP+ 702, received from the LPA 712, and the one-time public key of the eUICC 714 (760).

In response to the message received in step 758, the eUICC 714 may send an EstablishSecureChannelResponse message to the LPA 712 (762).

The LPA 712 may send an InstallProfileRecordRequest message to the eUICC 714 so as to deliver an encrypted ProfileRecord (i.e., MetaData) to the eUICC 714 (764).

The eUICC 714 may decrypt the encrypted ProfileRecord with the encryption key generated in step 760 and then install the same. Further, in response to the message received in step 764, the eUICC 714 may send an InstallProfileRecordResponse message to the LPA 712 (766).

Optionally, the LPA 712 may deliver an encrypted profile protection key (PPK) to the eUICC 714 (768). Then, the eUICC 714 may decrypt the encrypted PPK with the encryption key generated in step 760 and then send a response message to the LPA 712 (770).

Subsequently, the LPA 712 may deliver an encrypted profile package block (PPB) to the eUICC 714 (772).

The eUICC 714 may decrypt the encrypted PPB with the encryption key in step 760 or the PPK in step 770 (773). If the decryption is unsuccessful, the eUICC 714 may return an error code of the eUICC 714 and end the profile installation procedure. If the decryption is successful, the eUICC 714 may check whether the decrypted PPB, alone or in combination with a part or all of the previously received PPB, constitutes at least one installable unit, that is, profile element, and may install installable profile elements. When a part or all of the PPB cannot be used to constitute the profile element, the unused PPB may be stored in a buffer so that it can subsequently constitute a profile element in combination with a part or all of another PPB.

In response to the message of step 772, the eUICC 714 may send a response message to the LPA 712 (774).

If there are M encrypted PPBs, steps 772, 773, and 774 may be repeated M times.

If the installation is successfully performed up to the last PPB, the eUICC 714 may send a profile installation completion message including the eUICC signature to the LPA 712.

After the profile installation is completed, the LPA 712 may send an installation completion notification message (NotifyResultRequest) message including the eUICC signature to the SM-SR+ 704 (775), and may receive a response to the NotifyResultRequest message (778).

The LPA 712 may additionally enable the profile installed in the eUICC 714 (780).

Since steps 742 to 780 are performed for each device, these steps may be repeatedly performed for N devices.

Finally, the SM-SR+ 704 may notify the SM-DP+ 702 of the bulk profile provisioning result (792), and may receive a response thereto (794). For the convenience of the description, steps 792 and 794 may be referred to as a bulk provisioning result notification step 790.

In the following, interfaces between entities in a system for providing a profile to an eUICC of a terminal, their functions, and messages for the functions will be defined.

Table 2 shows an example of functions and protocols of terminal (LPA)-to-server or server-to-server interfaces in the system.

TABLE 2

| Interface | Function Caller | Function Provider | Function Name | Protocol/ Data Object |
|---|---|---|---|---|
| ES1 | EUM | SM-SR+ | ES1__ProductInfoNotify Request | HTTPS/JSON |
| ES2 | MNO | SM-DP+ | ES2__DownloadProfileRequest | |
| | | | ES2__ActivationVoucherRequest | |
| | SM-DP+ | MNO | ES2__NotifyResultRequest | |
| ES3 | SM-DP+ | SM-SR+ | ES3__eUICCManagementRequest | |
| | SM-SR+ | SM-DP+ | ES3__DownloadProfileRequest | |
| | | | ES3__ProfileRequest | |
| | | | ES3__NotifyResultRequest | |
| | | | ES3__BulkProfileRequest | |
| | | | ES3__NotifyResultBulkRequest | |
| ES4 | MNO | SM-SR+ | ES4__eUICCManagementRequest | |
| | SM-SR+ | MNO | ES4__TerminalRequest | |
| | | | ES4__NotifyResultRequest | |
| ES9 | LPA | SM-SR+ | ES9__EventRequest | |
| | | | ES9__eUICCManagementRequest | |
| | | | ES9__TerminalRequest | |
| | | | ES9__TerminalAuthRequest | |
| | | | ES9__NotifyResultRequest | |
| | | | ES9__FactoryEventRequest | |
| ES9+ | LPA | SM-DP+ | ES9+.InitiateAuthentication | |
| | | | ES9+.GetBoundProfilePackage | |
| ES11 | LPA | SM-DS | ES11__PSRequest/ES11__PSListRequest | |
| | | | ES11__PSRegistrationRequest | |
| | | | ES11__PSConfirmRequest | |
| | | | ES11__EventIDRequest | |
| | | | ES11__DeleteEventRequest | |
| ES12 | SM-SR+ | SM-DS | ES12__RegisterEventRequest | |
| | | | ES12__DeleteEventRequest | |
| ES13 | LPA | MNO | ES13__URLRequest | |

Table 3 shows an example of the functions and protocols of a terminal (LPA)-to-eUICC interface in the system.

TABLE 3

| Interface | Function Caller | Function Provider | Function Name | Protocol/ Data Object |
|---|---|---|---|---|
| ES10 | LPA | eUICC | ES10__GetAuthDataRequest | APDU/TLV |
| | | | ES10__EstablishSecureChannelRequest | |
| | | | ES10__InstallProfileRecordRequest | |
| | | | ES10__UpdateSessionKeyRequest | |
| | | | ES10__InstallProfilePackageBlockRequest | |

TABLE 3-continued

| Interface | Function Caller | Function Provider | Function Name | Protocol/ Data Object |
|---|---|---|---|---|
| | | | ES10__ReleaseSecureChannelRequest ES10__eUICCManagementRequest ES10__TerminalAuthRequest | |

First, the functions (messages) shown in Table 2 will be described in detail.

The terminal-to-server and server-to-server interface functions shown in Table 2 may be communicated using a data object in the JSON (JavaScript object notation) format through a HTTPS (hyper text transfer protocol over secure socket layer) protocol.

The HTTP header includes a header for a HTTP request and a header for a HTTP response.

The HTTP request header may have a format shown in Table 4 below.

TABLE 4

<HTTP Method> <URI> HTTP/1.1 CRLF
Host: <Administration Host> CRLF
X-Admin-Protocol: samsung-gsma/1.0 CRLF
Content-Type: application/json CRLF
[Content-Length: xxxx CRLF] or [Transfer-Encoding: chunked CRLF]
CRLF
[body]
<JSON structure>

A method for the HTTP request may be a HTTP POST method. Referring to Table 4, the resource "<uri>" (uniform resource identifier) of the HTTP request may be configured by "<query path>", and may have a value such as "/v1/es9/euicc-mgmt".

The HTTP request header may, for example, contain "Content-type", "Content-length", "Host", and "X-Admin-Protocol" fields, and their usages may be defined as shown in Table 5 below.

TABLE 5

| Field | Usage | MOC |
|---|---|---|
| "Content-type" | Shall be set to "application/json" | M |
| "Content-length" | The length of the request body in octets (8-bit bytes). This mode shall be used. | M |
| "Host" | The FQDN of the servers (i.e. DPID, SRID, DSID). | M |
| "X-Admin-Protocol" | Shall be set to "samsung-gsma/1.0" | M |

In Table 5 above, the MOC (Mandatory/Optional/Conditional) may have a value of M (mandatory), O (optional), or C (conditional).

The HTTP response header may have a format shown in Table 6 below.

TABLE 6

HTTP/1.1 200 OK CRLF [or HTTP/1.1 204 No Content CRLF]
X-Admin-Protocol: samsung-gsma/1.0 CRLF
Content-Type: application/json CRLF
[Content-Length: xxxx CRLF]
CRLF
[body]
<JSON structure>

Reference will now be made to specific messages for the functions shown in Table 2.

"ES1_ProductInfoNotifyRequest", a function of the ES1 interface (interface between EUM and SM-SR+), is a message used when the EUM delivers a previously generated one-time public key (ePK) list to the SM-SR+ for the purpose of bulk profile provisioning. The bulk profile provisioning may, for example, refer to provisioning of a plurality of profiles, such as a factory production scenario. As an example, <query path> of the ES1_ProductInfoNotifyRequest message may be "/v1/es1/product-info-notify".

As an example, the JSON body schema corresponding to the request message for the ES1_ProductInfoNotifyRequest message is given in Table 7 below.

TABLE 7

```
{
    "type":"object",
    "properties":{
        "productInfoList":{
            "type":"array",
            "items":{
                "type":"object",
                "properties":{
                    "euiccInfo":{
                        "type":"object",
                        "properties":{
"majorSpecVersion":{"type":"integer"},
"minorSpecVersion":{"type":"integer"},
"maxBlockSize":{"type":"integer"},
"maxProfileSize":{"type":"integer"},
"firmwareVersion":{"type":"string"},
                            "eccParameter":{
                                "type":"object",
"description":"elliptic curve parameters",
                                "properties":{
"keyParameterReferenceEcdsa":{
"type":"string",
"pattern":"^[0-9,a-f,A-F]{2}$",
"description";"one byte hexadecimal integer contained in
certEuiccEcdsa - "
                                ],
"keyParameterReferenceEcka":{
"type":"string",
"pattern":"^[0-9,a-f,A-F]{2}$",
"description":"one byte hexadecimal integer contained in
certEuiccEcka - "
                                }
                            }
                        }
                    },
                    "certEuiccEcdsa":{"type":"string",
"format":"base64"},
                    "certEuiccEcka":{"type":"string",
"format":"base64"},
                    "ePkList":{
                        "type":"array",
                        "items":"type":"string",
"format":"base64"}
                    }
                }
            }
        }
    }
}
```

TABLE 7-continued

```
    },
    "certEumEcdsa":{"type":"string", "format":"base64"}
    }
}
```

As an example, the JSON body schema corresponding to the response message for the ES1_ProductInfoNotifyRequest message is given in Table 8 below.

TABLE 8

```
{
    "type":"object",
```

TABLE 8-continued

```
    "properties":{
        "resultCode":{"type":"integer"}
    }
}
```

"ES2_DownloadProfileRequest", a function of the ES2 interface (interface between MNO and SM-DP+), is a message used when the MNO requests the SM-DP+ for download of a profile. As an example, <query path> of the ES2_DownloadProfileRequest message may be "/v1/es2/download-profile".

As an example, the JSON body schema corresponding to the request message for the ES2_DownloadProfileRequest message is given in Table 9 below.

TABLE 9

```
{
    "type":"object",
    "properties":{
        "event":{
            "type":"object",
            "properties":{
                "eventType":{
                    "enum":[0],
                    "description":"downloadProfile (0)"
                },
                "eventId":{"type":"null"},
                "eid":{
                    "type":"string",
                    "pattern":"^[0-9,a-f,A-F] {32,64}$",
                    "description":"16~32 byte hexadecimal integer. The length shall be even."
                },
                "profileRecord":{
                    "type":"object",
                    "properties":{
                        "profileRecordPart1":{
                            "type":"object",
                            "properties":{
    "profileId":"type":"string",
    "plmnId":{"type":"string"},
    "profileDescription":{"type":"string", "maxLength":256}
                            }
                        },
                        "profileRecordPart2":{
                            "type":"object",
                            "properties":{
                                "profileType":{
    "enum":[0,1],
    "description":"provisioning (0), operation (1)"
                                },
                                "profileRequestType":{
    "type":"integer",
    "description":"OPTIONAL -- conditional if ProfileRecordPart1.profileId = NULL"
                                },
                                "profileState":{
    "enum":[0,1],
    "description":"disable (0), enabled (1)"
                                },
                                "ownerMno":{
    "type":"string",
    "description":"OPTIONAL"
                                },
                                "defaultSr":{
    "type":"object",
    "properties":{
    "primarySr":{"type":"string"},
    "secondarySr":{
    "type":"string",
    "description":"OPTIONAL -- to be used by the LPA when the primary SM-SR+ is not reachable (e.g., due to the primary SM-SR+ server failure)"
                                    }
                                }
                            },
                            "authorizedSr":{
```

TABLE 9-continued

```
"type":"array",
"items":{"type":"string}
                        },
                        "profilePolicyRule":{
"type":"array",
                "items":{
"type":"object",
"properties":{
"pprLocalDelete":{
    "type":"object",
    "description":"OPTIONAL -- conditional if ppr.pprLocalMgmtNotification does not exist",
    "properties":{
        "pprId":{
            "type":"integer",
            "description":"value is 0"
        },
        "deleteAuthorization":{
            "enum":[0,1],
            "description":"authorizationNotRequired          (0), authorizationRequired (1)"
        }
    }
},
"pprLocalMgmtNotification":{
"type":"object",
"description":"OPTIONAL   --   conditional if ppr.pprLocalDelete does not exist",
    "properties":{
        "pprId":{
            "type":"integer",
            "description":"value is 1"
        },
        "notiEventList":{
            "type":"array",
            "description":"OPTIONAL",
            "items":{
                "enum":[0,1,2],
                "description":"enable (0), disable (1), delete (2)"
            }
        }
    }
}
                            }
                        }
                    }
                }
            }
        },
        "userConfirmation":{
            "type":"object"
            "properties":{
                "confirmType":{
                    "enum":[0,1],
                    "description":"yesOrNo (0), codeInput (1)"
                },
                "confirmCode":{
                    "type":"string",
                    "description":"OPTIONAL -- condtional if confirmType = codeInput (1)"
                },
                "confirmMessage":{
                    "type":"string",
                    "description":"OPTIONAL"
                }
            }
        }
    },
    "dsInfo":{
        "type":"object",
        "properties":{
            "primaryDs":{"type":"string"},
            "secondaryDs":{"type":"string", "description":OPTIONAL},
            "currentDs":{
                "enum":[0,1,2],
```

TABLE 9-continued

```
        "description":"unknown (0), primaryDs (1), secondaryDs (2)"
      },
      "pushStatus":{
        "enum":[0,1,2],
        "description":"unknown (0), available (1), notAvailable (2)"
      }
    },
    "description":"OPTIONAL"
  },
  "srId":{"type":"string"},
  "mnoId":{"type":"string"}
  }
}
```

As an example, the JSON body schema corresponding to the response message for the ES2_DownloadProfileRequest message is given in Table 10 below.

TABLE 10

```
{
  "type":"objcect",
  "properties":{
    "resultCode": {"type":"integer"},
    "eventId":{"type":"string"}
  }
}
```

"ES2_ActivationVoucherRequest", a function of the ES2 interface (interface between MNO and SM-DP+), is a message used when the MNO requests the SM-DP+ for activation of a voucher. As an example, <query path> of the ES2_ActivationVoucherRequest message may be "/v1/es2/activation-voucher".

As an example, the JSON body schema corresponding to the request message for the ES2_ActivationVoucherRequest message is given in Table 11 below.

TABLE 11

```
{
  "type":"object",
  "properties":{
    "voucherTypes":{
      "type":"array",
      "items":{
        "type":"object",
        "properties":{
          "mnoId":{"type":"string"},
          "activator":{
            "enum":[0,1],
            "description":"denotes the entity that authorizes the activation of this voucher -- mno (0), dp (1)"
          },
          "srId":{
            "type":"string",
            "description":" indicates the SM-SR+ that the LPA should send the voucher to"
          },
          "profileRecord":{
            "type":"object",
            "description":"OPTIONAL -- conditional if activator = dp (1)",
            "properties":{
              "profileRecordPart1":{"type":"object"},
              "profileRecordPart2":{"type":"object"}
            }
          },
          "userConfirmation":{
```

TABLE 11-continued

```
            "type":"object",
            "description":"OPTIONAL -- conditional if activator - dp (1)",
            "properties":{
              "confirmType":{
                "enum":[0,1],
                "description":"yesOrNo (0), codeInput (1)"
              },
              "confirmCode":{
                "type":"string",
                "description":"OPTIONAL -- conditional if confirmType = codeInput (1)"
              },
              "confirmMessage":{
                "type":"string",
                "description":"OPTIONAL"
              }
            }
          }
        }
      }
    }
  }
}
```

As an example, the JSON body schema corresponding to the response message for the ES2_ActivationVoucherRequest message is given in Table 12 below.

TABLE 12

```
{
  "type":"object",
  "properties":{
    "resultCode":{"type":"integer"},
    "voucherPackage":{
      "type":"array",
      "items":{
        "type":"object",
        "properties":{
          "activationVoucher":{
            "type":"object",
            "properties":{
              "srId":{
                "type":"string",
                "description":"SM-SR+ the LPA should send this voucher to"
              },
              "dpId":{
                "type":"string",
                "description":"SM-DP+ who generates the ActivationCode"
              },
              "activationCode":{"type":"string", "minLength":10, "maxLength":20}
```

TABLE 12-continued

```
        }
    },
    "profileId":{
        "type":"string",
        "description":"OPTIONAL -- conditional
if the VoucherType.profileRecord.profileRecordPart1.
ProfileID was NULL"
        }
      }
     }
    }
   }
  }
}
```

"ES2_NotifyResultRequest", a function of the ES2 interface, is a message used when the SM-DP+ requests the MNO for notification of an event result. As an example, <query path> of the ES2_NotifyResultRequest message may be "/v1/es2/notify-result".

As an example, the JSON body schema corresponding to the request message for the ES2_NotifyResultRequest message is given in Table 13 below.

TABLE 13

```
{
  "type":"object",
  "properties":{
    "eventResult":{
      "type":"object",
      "description":"OPTIONAL -- conditional if
ES3_NotifyResultRequest contains eventResult.
The SM-DP+ shall use the eventResult
obtained from the ES3_NotifyResultRequest as it is."
    },
    "resultCode":{
      "type":"integer",
      "description":"OPTIONAL -- conditional if
ES3_NotifyResultRequest does not contain eventResult."
    }
  }
}
```

As an example, the JSON body schema corresponding to the response message for the ES2_NotifyResultRequest message is given in Table 14 below.

TABLE 14

```
{
  "type":"object",
  "properties":{
    "resultCode":{"type":"integer"}
  }
}
```

"ES3_eUICCManagementRequest", a function of the ES3 interface (interface between SM-DP+ and SM-SR+), is a message used when the SM-DP+ requests the SM-SR+ for remote profile download to an eUICC. As an example, <query path> of the message may be "/v1/es3/euicc-mgmt".

As an example, the JSON body schema corresponding to the request message for the ES3_eUICCManagementRequest message is given in Table 15 below.

TABLE 15

```
{
  "type":"object",
  "properties":{
    "eventType":{
      "enum":[0],
      "description":"downloadProfile (0)"
    },
    "eId":{
      "type":"string",
      "pattern":"^[0-9,a-f,A-f] {32, 64}$",
      "description":"16~32 byte hexadecimal integer. The length shall
be even."
    },
    "dsInfo":{
      "type":"object",
      "description":"OPTIONAL: The SM-DP+ shall use the dsInfo
obtained from ES2_DownloadProfileRequest as it is."
    },
    "mnoId":{"type":"string"},
    "dpId":{"type":"string"}
  }
}
```

As an example, the JSON body schema corresponding to the response message for the ES3_eUICCManagementRequest message is given in Table 16 below.

TABLE 16

```
{
  "type":"object",
  "properties":{
    "resultCode":{"type":"integer"},
    "eventId":{"type":"string"}
  }
}
```

"ES3_DownloadProfileRequest", a function of the ES3 interface, is a message used when the SM-SR+ requests the SM-DP+ for download of a profile. As an example, <query path> of the message may be "/v1/es3/download-profile".

As an example, the JSON body schema corresponding to the request message for the ES3_DownloadProfileRequest message is given in Table 17 below.

TABLE 17

```
{
  "type":"object",
  "properties":{
    "requestType":{
      "enum":[0,1],
      "description":"mnoInitiated (0), terminalInitiated (1)"
    },
    "event":{
      "type":"object",
      "description":"OPTIONAL -- conditional if requestType =
mnoInitiated (0) end SM-SR+ received event object fromt eh ES4_eUICCManagementRequest.
The SM-SR+ merge eventId the SM-SR+ generated into the event object obtained from the
ES4_eUICCManagementRequest."
```

TABLE 17-continued

```
  },
  "eventId":{
    "type":"string",
    "description":"OPTIONAL  --  conditional if event does not exist"
  },
  "terminalInfo":{
    "type":"object",
    "properties":{
      "majorSpecVersion":{"type":"integer"},
      "minorSpecVersion":{"type":"integer"},
      "imei":{"type":"string", "description":"OPTIONAL"}
    }
  },
  "euiccinfo":{
    "type":"object",
    "description":"OPTIONAL  --  conditional if eventType  - downloadProfile (0)",
    "properties":{
      "majorSpecVersion":{"type":"integer"},
      "minorSpecVersion":{"type":"integer"},
      "maxBlockSize":{"type":"integer"},
      "maxProfileSize":{"type":"integer"},
      "firmwareVersion":{"type":"string"},
      "eccParameter":{
        "type":"object",
        "description":"elliptic curve parameters",
        "properties":{
          "keyParameterReferenceEcdsa":{
            "type":"string",
            "pattern":"^[0-9,a-f,A-F] (2)$",
            "description":"one byte hexadecimal integer contained in certEuiccEcdsa - "
          },
          "keyParameterReferenceEcka":{
            "type":"string",
            "pattern":"^[0-9,a-f,A-F] (2)$",
            "description":"one byte hexadecimal integer contained in certEuiccEcka - "
          }
        }
      }
    }
  },
  "activationCode":{
    "type":"string", "minLength":10, "maxLength":20,
    "description":"OPTIONAL  --  conditional if requestType  - terminalInitiated (1)"
  }
 }
}
```

As an example, the JSON body schema corresponding to the response message for the ES3_DownloadProfileRequest message is given in Table 18 below.

TABLE 18

```
{
 "type":"object",
 "properties":{
  "resultCode":{"type":"integer"},
  "dpToken1":{
   "type":"object",
   "properties":{
    "profileRecordPart1":{
     "type":"object",
     "properties":{
      "profileId":{"type":"string","null"},
      "plmnId":{"type":"string"},
      "profileDescription":{"type":"string", "maxlength":256}
     }
    },
    "ePkDpEcka":{"type":"string", "format":"base64"},
    "confirmType":{
```

TABLE 18-continued

```
     "enum":[0,1],
     "description":"yesOrNo (0), codeInput (1)"
    },
    "confirmMessage":{
     "type":"string",
     "description":"OPTIONAL"
    },
    "confirmCodeHash1":{
     "type":"string",
     "format":"base64",
     "description":"OPTIONAL  --  conditional if event.userConfirmation.confirmType or dpToken1.confirmType was codeInput (1)"
    },
    "signDp1":{"type":"string", "format":"base64"},
    "certDpEcdsa":{"type":"string", "format":"base64"},
    "certDpEcka":{"type":"string", "format":"base64"}
   }
  }
 }
}
```

"ES3_ProfileRequest", a function of the ES3 interface, is a message used when the SM-SR+ requests the SM-DP+ for generation of a profile. As an example, <query path> of the message may be "/v1/es3/profile".

As an example, the JSON body schema corresponding to the request message for the ES3_ProfileRequest message is given in Table 19 below.

TABLE 19

```
{
 "type":"object",
 "properties":{
   "euiccToken":{
     "type":"object",
     "properties":{
       "eventId":{"type":"string"},
       "signEuicc":{"type":"string", "format":"base64"},
       "nonceEuicc":{"type":"string", "format":"base64"},
       "ePkEuiccEcka":{"type":"string", "format":"base64"},
       "euiccInfo":{
         "type":"object",
         "properties":{
           "majorSpecVersion":{"type":"integer"},
           "minorSpecVersion":{"type":"integer"},
           "maxBlockSize":{"type":"integer"},
           "maxProfileSize":{"type":"integer"},
           "firmwareVersion":{"type":"string"},
           "eccParameter":{
             "type":"object",
             "description":"elliptic curve parameters",
             "properties":{
   "KeyParameterReferenceEcdsa":{
   "type":"string",
   "pattern":"^[0-9,a-f,A-F]{2}$",
   "description":"one byte hexadecimal integer contained in certEuiccEcdsa - "
             },
   "keyParameterReferenceEcka":{
   "type":"string",
   "pattern":"^[0-9,a-f,A-F]{2}$",
   "description":"one byte hexadecimal integer contained in certEuiccEcka - "
           }
```

TABLE 19-continued

```
         }
       }
     }
   }
 },
 "nonceSr":{"type":"string", "format":"base64"},
 "confirmCodeHash2":{
   "type":"string",
   "format":"base64",
   "description":"OPTIONAL -- conditional if event.userConfirmation.confirmType or dpToken1.confirmType was codeInput (1)"
 },
 "certsEuicc":{
   "type":"object",
   "properties":{
     "certEuiccEcdsa":{"type":"string", "format":"base64"},
     "certEumEcdsa":{"type":"string", "format":"base64"},
     "certEuiccEcka":{
       "type":"string",
       "format":"base64",
       "description":"OPTIONAL -- conditional if eventType - downloadProfile (0)"
     }
   }
 }
}
```

As an example, the JSON body schema corresponding to the response message for the ES3_ProfileRequest message is given in Table 20 below.

TABLE 20

```
{
 "type":"object",
 "properties":{
   "resultCode":{"type":"integer"},
   "profileInstallPackage":{
     "type":"object",
     "properties":{
       "dpToken2":{
         "type":"object",
         "properties":{
           "signDp2":{"type":"string", "format":"base64"}
         }
       },
       "securedProfileRecordPart2":{
         "type":"string",
         "format":"base64",
         "description":"The securedProfileRecordPart2 is a SCP03tCommand TLV securing the ProfileRecoredPart2 TLV. This TLV shall be protected with the SCP03t session keys"
       },
       "profileProtectionKey":{
         "type":"string",
         "format":"base64",
         "description":"OPTIONAL -- The profileProtectionKey si SCP03tCommand TLV containing the SCP03SessionKey TLV. This TLV shall be protected with the SCP03t session keys "
       },
       "securedProfilePackage":{
         "type":"array",
         "description":"The SM-DP+ shall generate the
```

TABLE 20-continued

```
securedProfilePackage ",
        "items":{
            "type":"string",
            "format":"base64",
            "description":"Each item contains a
SCP03t command TLV containing a ProfilePackageBlock. This TLV shall be protected with the
SCP03t session keys or the profileProtectionKey if used."
        }
      }
    }
   }
  }
}
```

"ES3_NotifyResultRequest", a function of the ES3 interface, is a message used when the SM-SR+ requests the SM-DP+ for notification of an event result. As an example, <query path> of the message may be "/v1/es3/notify-result".

As an example, the JSON body schema corresponding to the request message for the ES3_NotifyResultRequest message is given in Table 21 below.

TABLE 21

```
{
    "type":"object",
    "properties":{
        "eventResult":{
            "type":"object",
            "description":"OPTIONAL -- conditional if
ES9_NotifyResultRequest contains eventResult.
The SM-SR+ shall use the eventResult
obtained from the ES9_NotifyResultRequest as it is."
        },
        "resultCode":{
            "type":"integer",
            "description":"OPTIONAL -- conditional if
ES9_NotifyResultRequest does not contain eventResult nor
localEventResult"
        }
    }
}
```

As an example, the JSON body schema corresponding to the response message for the ES3-NotifyResultRequest message is given in Table 22 below.

TABLE 22

```
{
    "type":"object",
    "properties":{
        "resultCode": {"type":"integer"}
    }
}
```

"ES3_BulkProfileRequest", a function of the ES3 interface, is a message used when the SM-SR+ requests the SM-DP+ for one or more profiles. As an example, <query path> of the message may be "/v1/es3/bulk-profile".

As an example, the JSON body schema corresponding to the request message for the ES3_BulkProfileRequest message is given in Table 23 below.

TABLE 23

```
{
    "type":"object",
    "properties":{
        "plmnId":{"type":"string"},
        "certSREcdsa":{"type":"string", "format":"base64"},
```

TABLE 23-continued

```
        "srToken0List":{
            "type":"array",
            "items":{
                "type":"object",
                "properties":{
                    "certEuiccEcka":{"type":"string",
"format":"base64"},
                    "ePkEuiccEcka":{"type":"string",
"format":"base64"},
                    "euiccInfo":{
                        "type":"object",
                        "description":"OPTIONAL -- conditional
if eventType = downloadProfile (0)",
                        "properties":{
    "majorSpecVersion":{"type:integer"},
    "minorSpecVersion":{"type:integer"},
    "maxBlockSize":{"type:integer"},
    "maxProfileSize":{"type:integer"},
    "firmwareVersion":{"type:string"},
                            "eccParameter":{
                                "type":"object",
    "description":"elliptic curve parameters",
                                "properties":{
    "keyParameterReferenceEcdsa": {
    "type":"string",
    "pattern":"^[0-9,a-f,A-F]{2}$",
    "description":"one byte hexadecimal integer contained in
certEuiccEcdsa - "
                                },
    "keyParameterReferenceEcka":{
    "type":"string",
    "pattern":"^[0-9,a-f,A-F]{2}$",
    "description":"one byte hexadecimal integer contained in
certEuiccEcdsa - "
                                }
                            }
                        }
                    },
                    "certEumEcdsa":{"type":"string",
"format":"base64"},
                    "signSr0":{"type":"string", "format":"base64"}
                }
            }
        }
    }
}
```

As an example, the JSON body schema corresponding to the response message for the ES3_BulkProfileRequest message is given in Table 24 below.

TABLE 24

```
{
"type":"object",
"properties":{
    "resultCode":{"type":"integer"},
    "bulkProfileList":{
        "type":"array",
        "items":{
            "type":"object",
            "properties":{
                dpToken:{
                    "type":"object",
                    "properties":
                        "profileRecordPart1:{
                            "type":"object",
                            "properties":{
"profileId":{"type":["string","null"]},
"plmnId:{"type":"string"},
"profileDescription":{"type":"string", "maxLength":256}
                            }
                        },
                        "ePkDpEcka":{"type":"string",
"format":"base64"},
                        "signDp1":{"type":"string",
"format":"base64"},
    "certDpEcdsa:{"type":"string","format":"base64"},
                        "certDpEcka":{"type":"string",
"format":"base64"}
                    }
                },
                "profileInstallPackage":{
                    "type":"object",
                    "properties":{
                        "dpToken2":{
                            "type":"object",
                            "properties":{
    "signDp2":{"type":"string", "format":"base64"}
                            }
                        },
                        "securedProfileRecordPart2":{
                            "type":"string",
                            "format":"base64",
                            "description":"The
securedProfileRecordPart2 is a SCP03tCommand TLV securing the ProfileRecordPart2 TLV.
This TLV shall be protected with the SCP03t session keys"
                        },
                        "profileProtectionKey":{
                            "type":"string",
                            "format":"base64",
    "description":"OPTIONAL -- The profileProtectionKey is a SCP03tCommand TLV
containing the SCP03SessionKey TLV. This TLV shall be protected with the SCP03t session
keys"
                        },
                        "securedProfilePackage":{
                            "type":"array",
                            "description":"The SM-
DP+ shall generate the securedProfilePackage",
                            "items":
    "type":"string",
    "format":"base64",
    "description":"Each item contains a SCP03t command TLV containing a
ProfilePackageBlock, This TLV shall be protected with the SCP03t session Keys or the
profileProtectionKey if included."
                        }
                    }
                }
            }
        }
    }
}
}
```

"ES3_NotifyResultBulkRequest", a function of the ES3 interface, is a message used when the SM-SR+ requests the SM-DP+ for notification of a bulk profile provisioning event result. As an example, <query path> of the message may be "/v1/es3/notify-result-bulk".

As an example, the JSON body schema corresponding to the request message for the ES3_NotifyResultBulkRequest message is given in Table 25 below.

TABLE 25

```
{
  "type":"object",
  "properties":{
    "eventResultList":{
      "type":"array",
      "items":{
        "type":"object",
        "properties":{
          "eventResult":{
            "type":"object",
            "description":"OPTIONAL",
            "properties":{
              "resultCode":{"type":"integer"},
              "eId":{
                "type":"string",
                "pattern":"^[0-9,a-f,A-F]{32,64}$",
                "description":"16~32 byte hexadecimal integer. The Length shall be even."
              },
              "eventId":{"type":"string"},
              "signResult":"type":"string",
              "format":"base64"}
          }
        },
```

TABLE 25-continued

```
        "resultCode":{
          "type":"integer",
          "description":"OPTIONAL"
        }
      }
    }
  }
}
```

As an example, the JSON body schema corresponding to the response message for the ES3_NotifyResultBulkRequest message is given in Table 26 below.

TABLE 26

```
{
  "type":"object",
  "properties":{
    "resultCode":{"type":"integer"}
  }
}
```

"ES4_eUICCManagementRequest", a function of the ES4 interface (interface between MNO and SM-SR+), is a message used when the MNO requests the SM-SR+ for remote platform/profile management for an eUICC. As an example, <query path> of the message may be "/v1/es4/euicc-mgmt".

As an example, the JSON body schema corresponding to the request message for the ES4_eUICCManagementRequest message is given in Table 27 below.

TABLE 27

```
{
  "type":"object",
  "properties":{
    "event":{
      "type":"object",
      "properties":{
        "eventType":{
          "enum": [0,1,2,3,4,5,6,7,8,9,10,11,12,13],
          "description":"downloadProfile  (0),
enableProfile (1), disableProfile (2), delteProfile (3), getProfileRegistry (4),
updateProfileRegistry (5), getEPR (6), updateEPR (7), getDSInfo (8), updateDSInfo (9),
getCIInfo (10), updateCIInfo (11), getFirmwareInfo (12), updateFirmwareInfo (13)"
        },
        "eventId":{
          "type":{"string","null"},
          "description":"NULL  in  the
ES4_eUICCManagementRequest or the ES2_DownloadProfileRequest or the
ES3_eUICCManagementRequest"
        },
        "eId":{
          "type":"string",
          "pattern":"^[0-9,a-f,A-F] (32,64}$",
          "description":"16~32 byte hexadecimal integer.
The length shall be even."
        },
        "profileId":{
          "type":{"string","null"},
          "description":"OPTIONAL  --  conditional if
eventType = { enableProfile (1), disableProfile (2), deleteProfile (3),
getProfileRegisty (4) }"
        },
        "profileRecord":{
          "type":"object",
          "description":"OPTIONAL  --  conditional if
eventType = { downloadProfile (0), updateProfileRegisty (5) }",
          "properties":{
            "profileRecordPart1":{
              "type":"object",
              "properties":{
```

TABLE 27-continued

```
"profileId":"type":{"string","null"},
"plmId":{"type":"string"},
"profileDescription":{"type":"string", "maxLength":256}
            }
        },
        "profileRecordPart2":{
            "type":"object",
            "properties":{
                "profileType":{
"enum":[0,1],
"description":"provisioning (0), operational (1)"
            },
"profileRequestType":{
"type":"integer",
"description":"OPTIONAL -- conditional if ProfileRecordPart1.profileId = NULL"
            },
            "profileState":{
"enum":[0,1],
"description":"disabled (0), enable (1)"
            },
            "ownerMno":{
"type":"string",
"description":"OPTIONAL"
            },
            "defaultSr":{
"type":"object",
"properties":{
"primarySr":{"type":"string"},
"secondarySr":{
"type":"string",
"description":"OPTIONAL -- to be used by the LPA when the primary SM-SR+ is not
reachable (e.g., due to the primary SM-SR+ server failure)"
            }
        }
    },
            "authorizedSr":{
"type":"array",
"items":{"type":"string"}
            },
            "profilePolicyRule":{
"type":"array",
                "items":{
"type":"object",
"properties":{
"pprLocalDelete":{
    "type":"object",
    "description":"OPTIONAL   --   conditional if ppr.pprLocalMgmtNotification
does not exist",
    "properties":{
        "pprId":{
            "type":"integer",
            "description":"value is 0"
        },
        "deleteAuthorization":{
            "enum":[0,1],
            "description":"authorizationNotRequired   (0),
authorizationRequired (1)"
        }
    }
},
"pprLocalMgmtNotification":{
    "type":"object",
    "description":"OPTIONAL   --   conditional if ppr.pprLocalDelete does not
exist",
    "properties":{
        "pprID":{
            "type":"integer",
            "description":"value is 1"
        },
        "notiEventList":{
            "type":"array",
            "description":"OPTIONAL",
            "items":{
                "enum":[0,1,2],
                "description":"enable (0), disable (1), delete
(2)"
            }
        }
    }
}
}
```

TABLE 27-continued

```
                }
              }
            }
          }
        }
      }
    },
    "userConfirmation":{
      "type":"object",
      "description":"OPTIONAL  --  conditional  if eventType - downloadProfile (0)",
      "properties":{
        "confirmType":{
          "enum":[0,1],
          "description":yesOrNo   (0), codeinput (1)"
        },
        "confirmCode":{
          "type":"string",
          "description":"OPTIONAL  -- conditional if confirm"type" = codeInput (1)"
        },
        "confirmMessage":{
          "type":"string",
          "description":"OPTIONAL"
        }
      }
    },
    "eprId":{
      "type":"string",
      "description":"OPTIONAL  --  conditional  if eventType - getEPR (0)"
    },
    "epr":{
      "type":"object",
      "description":"OPTIONAL  --  conditional  if eventType = updateEPR (7)",
      "properties":{
        "eprServerAccessControl":{
          "type":"object",
          "description":"OPTIONAL",
          "properties":{
            "eprID":{
  "type":"integer",
  "description":"value is 0"
            },
            "authorizedSr":{
  "type":"array",
  "items":{"type":"string"}
            },
            "srAccessControl":{
  "enum":[0,1],
  "description":"blackList (0), whiteList (1)"
            },
            "srList":{
  "type":"array",
  "description":"OPTIONAL -- conditional if SM-SR+ list exists",
  "items":{"type":"string"}
            },
            "dpAccessControl":{
  "enum":[0,1],
  "description":"blackList (0), whiteList (1)"
            },
            "dpList":{
  "type":"array",
  "description":"OPTIONAL -- conditional if SM-DP+ list exists",
  items:{"type":"string"}
            }
          }
        },
        "eprSubsidyLock":{
          "type":"object",
          "description":"OPTIONAL",
          "properties":{
            "eprId":{
  "type":"integer",
  "description":"value is 1"
            },
            "authorizedSr":{
  "type":"array",
```

TABLE 27-continued

```
        "items":{"type":"string"}
            },
            "lockType":{
"enum":[0,1,2],
"description":"unlocked (0), mnoLocked (1), countryLocked (2)"
            },
            "mnoList":{
"type":"array",
"description":"OPTIONAL -- conditional if lockType - mnoLocked (1)",
"items":{"type":"string"}
            },
            "countryList":{
"type":"array",
"description":"OPTIONAL -- conditional if LockType = countryLocked (2)",
"items":{"type":"string"}
                }
            }
        },
        "eprUserConfirmation":{
            "type":"object",
            "description":"OPTIONAL",
            "properties":{
                "eprId":{
"type":"integer",
"description":"value is 2"
            },
            "authorizedSr":{
"type":"array",
"items":{"type":"string"}
            },
            "mnoList":{
"type":"array",
"items":{"type":"string","null"}
                }
            }
        }
    },
    "dsInfoStatic":{
        "type":"object",
        "description":"OPTIONAL -- condtional if
eventType - updateDSInfo (9)",
        "properties":{
            "primaryDs":{"type":"string"},
            "secondaryDs":{
                "type":"string",
                "description":"OPTIONAL"
            },
            "authorizedSr":{
                "type":"array",
                "items":{"type":"string"}
            }
        }
    },
    "ciInfo":{
        "type":"object",
        "description":"OPTIONAL -- conditional if
eventType = updateCIInfo (11)",
        "properties":{
            "ciList":{
                "type":"array",
                "items":{
                    "type":"string",
                    "format":"base64",
"description":"CERT_CI_ECDSA is included"
                }
            },
            "authorizedSr":{
                "type":"array",
                "items":{"type":"string"}
            }
        }
    },
    "firmwareInfo":{
        "type":"object",
        "description":"OPTIONAL -- conditional if
eventType = updateFirmwareInfo (13)",
```

TABLE 27-continued

```
        "properties":{
          "firmwareData":{
            "type":"string",
            "format":"base64"
          },
          "signEum":{
            "type":"string",
            "format":"base64",
          },
          "authorizedSr":{
            "type":"array",
            "items":{"type":"string"}
          }
        }
      }
    }
  },
  "dsInfo":{
    "type":"object",
    "properties":{
      "primaryDs":{"type":"string"},
      "secondaryDs":{"type":"string",
"description":"OPTIONAL",
      "currentDs":{
        "enum":[0,1,2],
        "description":"unknown   (0),   primaryDs   (1),
secondaryDs (2)"
      },
      "pushStatus":{
        "enum":[0,1,2],
        "description":"unknown   (0),   available   (1),
notAvailable (2)"
      }
    }
  },
  "dpId":{
    "type":"string",
    "description":"OPTIONAL  --  conditional if event.eventType =
downloadProfile (0)"
  },
  "mnoId":{
    "type":"string",
    "description":"OPTIONAL  --  conditional if event.eventType =
downloadProfile (0)"
  }
 }
}
```

As an example, the JSON body schema corresponding to the response message for the ES4_eUICCManagementRequest message is given in Table 28 below.

TABLE 28

```
{
  "type":"object",
  "properties":{
    "resultCode":{"type":"integer"},
    "eventid":{"type":"string"}
  }
}
```

1 "ES4_TerminalRequest", a function of the ES4 interface, is a message used when the SM-SR+ requests the MNO for return of an authentication result for device swap or local deletion. As an example, <query path> of the message may be "/v1/es4/terminal".

As an example, the JSON body schema corresponding to the request message for the ES4_TerminalRequest message is given in Table 29 below.

TABLE 29

```
{
  "type":"object",
  "properties":{
    "terminalRequestType":{
      "enum":[1,2],
      "description":"deviceSwap (1), localDeleteAuthorization (2)"
    },
    "eventId":{"type":"string"},
    "eId":{
      "type":"string",
      "pattern":"^[0-9, a-f, A-F] {32,64}$",
      "description":"16~32 byte hexadecimal integer. The length shall
be even."
    },
    "deviceSwapParameter":{
      "type":"object",
      "description":"OPTIONAL -- conditinoal if terminalRequestType =
deviceSwap (1)",
      "properties":{
        "ownerMno":{"type":"string"},
        "profileId":{"type":"string"},
        "eId2":{"type":"string"},
        "dsInfo1":{
          "type":"object",
          "properties":{
            "primaryDs":{"type":"string"},
            "secondaryDs":{"type":"string",
```

TABLE 29-continued

```
"description":"OPTIONAL"},
        "currentDs":{
            "enum":[0,1,2],
                "description":"unknown      (0),
primaryDs (1), secondaryDs (2)"
        },
        "pushStatus":{
            "enum":[0,1,2],
                "description":"unknown      (0),
available (1), notAvailable (2)"
        }
    }
},
"dsInfo2":{
    "type":"object",
    "properties":{
        "primaryDs":{"type":"string"},
        "secondaryDs":{"type":"string",
"description":"OPTIONAL"},
        "currentDs":{
            "enum":[0,1,2],
                "description":"unknown      (0),
primaryDs (1), secondaryDs (2)"
        },
        "pushStauts":{
            "enum":[0,1,2],
                "description":"unknown      (0),
available (1), notAvailable (2)"
        }
    }
  }
 }
},
"localDeletePrameter":{
```

TABLE 29-continued

```
        "type":"object",
        "description":"OPTIONAL -- conditional if terminalRequestType =
localDeleteAuthorization (2)",
        "properties":{
            "ownerMno":{"type":"string"},
            "profileId":{"type":"string"}
        }
    }
  }
}
```

As an example, the JSON body schema corresponding to the response message for the ES4_TerminalRequest message is given in Table 30 below.

TABLE 30

```
{
    "type":"object",
    "properties":{
        "resultCode":{"type":"integer"}
    }
}
```

"ES4_NotifyResultRequest", a function of the ES4 interface, is a message used when the SM-SR+ requests the MNO for notification of an event result. As an example, <query path> of the message may be "/v1/es4/notify-result".

As an example, the JSON body schema corresponding to the request message for the ES4_NotifyResultRequest message is given in Table 31 below.

TABLE 31

```
{
  "type":"object",
  "properties":{
    "eventResult":{
      "type":"object",
      "description":"OPTIONAL -- condtional      if
ES9_NotifyResultRequest contains eventResult. The SM-SR+ shall use the eventResult
obtained form the ES9_NotifyResultRequest as it is."
    },
    "localEventResult":{
      "type":"object",
      "description":"OPTIONAL -- condtional      if
ES9_NotifyResultRequest contains localEventResult. The SM-SR+ shall use the
localEventResult obtained form the ES9_NotifyResultRequest as it is."
    },
    "certEuiccEcdsa":{
      "type":"string",
      "format":"base64",
      "description":"OPTIONAL -- conditional      if
ES9_NotifyResultRequest contains eventResult of localEventResult. SM-SR+ shall use
certEuiccEcdsa it stored for eventResult or use certEuiccEcdsa obtained from the
ES9_NotifyResultRequest for localEventResult."
    },
    "certEumEcdsa":{
      "type":"string",
      "format":"base64",
      "description":"OPTIONAL -- conditional      if
ES9_NotifyResultRequest contains eventResult or localEventResult. SM-SR+ shall use
certEumEcdsa it stored for eventResult or use certEuiccEcdsa obtained from the
ES9_NotifyResultRequest for localEventResult."
    },
    "resultCode":{
      "type":"integer",
      "description":"OPTIONAL -- conditional      if
ES9_NotifyResultRequest does not contain eventResult nor localEventResult."
    }
  }
}
```

As an example, the JSON body schema corresponding to the response message for the ES4_NotifyResultRequest message is given in Table 32 below.

TABLE 32

```
{
  "type":"object",
  "properties":{
    "resultCode":{"type":"integer"}
  }
}
```

"ES9_EventRequest", a function of the ES9 interface (interface between LPA and SM-SR+), is a message used when the LPA requests the SM-SR+ for the event corresponding to a specific event ID. As an example, <query path> of the message may be "/v1/es9/event".

As an example, the JSON body schema corresponding to the request message for the ES9_EventRequest message is given in Table 33 below.

TABLE 33

```
{
"type":"object",
"properties": {
  "eventId":"type":"string"},
  "terminalInfo":{
      "type":"object",
      "properties":{
        "majorSpecVersion":{"type":"integer"},
        "minorSpecVersion":{"type":"integer"},
        "imei":{"type":"string", "description":"OPTIONAL"}
      }
  },
  "euiccInfo:{
      "type":"object",
      "description":"OPTIONAL  --  conditional if eventType = downloadProfile (0)",
      "properties":{
        "majorSpecVersion":{"type":"integer"},
        "minorSpecVersion":{"type":"integer"},
        "maxBlockSize":{"type":"integer"},
        "maxProfileSize":{"type":"integer"},
        "firmwareVersion":{"type":"string"},
        "eccParameter":{
          "type":"object",
          "description":"elliptic curve parameters",
          "properties":{
            "keyParameterRefereneEcdsa:"{
                "type":"string",
                "pattern":"^[0-9,a-f,A-F] {2}$",
                "description":"one byte hexadecimal integer contained in certEuiccEcdsa - "
            },
            "keyParameterReferenceEcka":{
                "type":"string",
                "pattern":"^[0-9,a-f,A-F] {2}$",
                "description":"one byte hexadecimal integer contained in certEuiccEcka - "
            }
          }
        }
      }
    }
  }
}
```

As an example, the JSON body schema corresponding to the request message for the ES9_EventRequest message is given in Table 34 below.

TABLE 34

```
{
  "type":"object",
  "properties":{
    "resultCode":{"type":"integer"},
    "eventType":{
      "enum":[0,1,2,3,4,5,6,7,8,9,10,11,12,13],
      "description":"downloadProfile (0), enableProfile (1), disableProfile (2), deleteProfile (3), getProfileRegistry (4), updateProfileRegistry (5), getEPR (6), updateEPR (7), getDSInfo (8), updateDSInfo (9), getCIInfo (10), updateCIInfo (11), getFirmwareInfo (12), updateFirmwareInfo (13)"
    },
    "srToken1":{
      "type":"object",
      "properties":{
        "certSrEcdsa":{"type":"string", "format":"base64"},
        "nonceSr":{"type":"string", "format":"base64"},
        "signSr1":{"type":"string", "format":"base64"}
      }
    },
    "dpToken1":{
      "type":"object",
      "description":"OPTIONAL  --  condtional if eventType = downloadProfile (0)",
      "properties":{
        "profileRecordPart1":{
          "type":"object",
          "properties":{
            "profileId":{"type":["string","null"]},
            "plmnId":"type":"string"},
            "profileDescription":{"type":"string", "maxLength":256}
          }
        },
        "ePkDpEcka":{"type":"string", "format":"base64"},
        "confirmType":{
          "enum":[0,1],
          "description":"yesOrNo (0), codeInput (1)"
        },
        "confirmMessage":{
          "type":"string",
          "description":"OPTIONAL"
        },
        "confirmCodeHash1":{
          "type":"string",
          "format":"base64",
          "description":"OPTIONAL  --  conditional if event.userConfirmation.confirmType or dpToken1.confirmType is codeInput (1)"
        },
        "signDp1":{"type":"string", "format":"base64"},
        "certDpEcdsa":{"type":"string", "format":"base64"},
        "certDpEcka":{"type":"string", "format":"base64"}
      }
    }
  }
}
```

"ES9_eUICCManagementRequest", a function of the ES9 interface, is a message used when the LPA requests the SM-SR+ for remote platform/profile management for an eUICC. As an example, <query path> of the message may be "/v1/es9/euicc-mgmt".

As an example, the JSON body schema corresponding to the request message for the ES9_eUICCManagementRequest message is given in Table 35 below.

TABLE 35

```
{
  "type":"object",
  "properties":{
    "euiccToken":{
      "type":"object",
      "properties":{
        "eventId":{"type":"string"},
```

TABLE 35-continued

```
        "signEuicc":{"type":"string", "format":"base64"},
        "nonceEuicc":{
            "type":"string",
            "format":"base64",
            "description":"OPTIONAL  --  conditional  if
eventType != downloadProfile (0)"
        },
        "ePkEuiccEcka":{
            "type":"string",
            "format":"base64",
            "description":"OPTIONAL  --  conditional  if
eventType = downloadProfile (0)"
        },
        "euiccInfo":{
            "type":"object",
            "description":"OPTIONAL  --  conditional  if
eventType = downloadProfile (0),"
            "properties":{
                "majorSpecVersion":{"type":"integer"},
                "minorSpecVersion":{"type":"integer"},
                "maxBlockSize":{"type":"integer"},
                "maxProfileSize":{"type":"integer"},
                "firmwareVersion":{"type":"string"},
                "eccParameter":{
                    "type":"object",
                    "description":"elliptic curve
parameters",
                    "properties":{
    "keyParameterReferenceEcdsa":{
    "type":"string",
    "pattern":"^[0-9,a-f,A-F]{2}$",
    "description":"one byte hexadecimal integer contained in
certEuiccEcdsa - "
                    },
    "keyParameterReferenceEcka":{
    "type":"string",
```

TABLE 35-continued

```
    "pattern":"^[0-9,a-f,A-F]{2}$",
    "description":"one byte hexadecimal integer contained in
certEuiccEcka - "
                    }
                }
            }
        }
    }
},
        "confirmCodeHash2":{
            "type":"string",
            "format":"base64",
            "description":"OPTIONAL -- conditional if dpToken1.
confirmType was codeInput (1)"
        },
        "certsEuicc":{
            "type":"object",
            "properties":{
                "certEuiccEcdsa":{"type":"string", "format":"base64"},
                "certEumEcdsa":{"type":"string", "format":"base64"},
                "certEuiccEcka":{
                    "type":"string",
                    "format":"base64",
                    "description":"OPTIONAL  --  conditional  if
eventType = downloadProfile (0)"
                }
            }
        }
    }
}
```

As an example, the JSON body schema corresponding to the response message for the ES9_eUICCManagementRequest message is given in Table 36 below.

TABLE 36

```
{
    "type":"object",
    "properties":{
        "resultCode":{"type":"integer"},
        "event":{
            "type":"object",
            "description":"OPTIONAL  --  conditional if eventType !=
downloadProfile (0). The event object is constructed by the SM-SR+ which merge eventId
the SM-SR+ generated into the event object obtained from the ES4 eUICCManagementRequest."
        },
        "profileInstallPackage":{
            "type":"object",
            "description":"OPTIONAL  --  condtional if eventType =
downloadProfile (0). SM-SR+ shall use profileInstallPackage obtained from
ES3 ProfileResponse as it is.",
            "properties":{
                "dpToken2":{
                    "type":"object",
                    "properties":{
                        "signDp2":{"type":"string",
"format":"base64"}
                    }
                },
                "securedProfileRecordPart2":{
                    "type":"string",
                    "format":"base64",
                    "description":"The securedProfileRecordPart2 is
a SCP03tCommand TLV securing the ProfileRecordPart2 TLV. This TLV shall be protected with
the SCP03t session keys"
                },
                "profileProtectionKey":{
                    "type":"string",
                    "format":"base64",
                    "description":"OPTIONAL  --        The
profileProtectionKey is a SCP03tCommand TLV containing the SCP03SessionKey TLV. This TLV
shall be protected with the SCP03t session keys"
                },
                "securedProfilePackage":{
                    "type":"array",
```

TABLE 36-continued

```
    "description":"The SM-DP+ shall generate the
securedProfilePackage ",
        "items":{
            "type":"string",
            "format":"base64":,
            "description":"Each item contains a
SCP03t command TLV containing a ProfilePackageBlock. This TLV shall be protected with the
SCP03t session keys of the profileProtectionKey if used."
            }
          }
        }
      },
      "srToken2":{
        "type":"object",
        "properties":{
          "signSr2":{"type":"string", "format":"base64"}
        }
      }
    }
  }
}
```

"ES9_TerminalRequest", a function of the ES9 interface, is a message used when the LPA requests the SM-SR+ for profile download, device swap, or local profile deletion. As an example, <query path> of the message may be "/v1/es9/terminal".

As an example, the JSON body schema corresponding to the request message for the ES9_TerminalRequest message is given in Table 37 below.

TABLE 37

```
{
  "type":"object",
  "properties":{
    "terminalRequestType":{
      "enum":[0,1,2],
      "description":"downloadProfile (0), deviceSwap (1), localDeleteAuthorization (2)"
    },
    "eId":{
      "type":"string",
      "pattern":"^[0-9,a-f,A-F] {32,64}$",
      "description":"16~32byte hexadecimal integer. The length shall be even."
    },
    "activationVoucher":{
      "type":"object",
      "description":"OPTIONAL -- conditional if terminalRequestType = downloadProfile (0)",
      "properties":{
        "srId":{"type":"string"},
        "dpId":{"type":"string"},
        "activationCode":{"type":"string", "minLength":10, "maxLength":20}
      }
    },
    "deviceSwapParameter":{
      "type":"object",
      "description":"OPTIONAL -- conditional if terminalRequestType = deviceSwap (1)",
      "properties":{
        "ownerMno":{"type":"string"},
        "profileId":{"type":"string"},
        "eId2":{"type":"string"},
        "dsInfo1":{
          "type":"object",
          "properties":{
            "primaryDs":{"type":"string"},
            "secondaryDs":{"type":"string", "description":"OPTIONAL"},
            "currentDs":{"type":"string",
              "enum":[0,1,2],
              "description":"unknown (0), primaryDs (1), secondaryDs (2)"
            },
```

TABLE 37-continued

```
            "pushStatus":{
              "enum":[0,1,2],
              "description":"unknown (0), available (1), notAvailable (2)"
            }
          }
        },
        "dsInfo2":{
          "type":"object",
          "properties":{
            "primaryDs":{"type":"string"},
            "secondaryDs":{"type":"string", "description":"OPTIONAL"},
            "currentDs":{
              "enum":[0,1,2],
              "description":"unknown (0), primaryDs (1), secondaryDs (2)"
            },
            "pushStatus":{
              "enum":[0,1,2],
              "description":"unknown (0), available (1), notAvailble (2)"
            }
          }
        }
      }
    },
    "localDeleteParameter":{
      "type":"object",
      "description":"OPTIONAL -- conditional if terminalRequestType = localDeleteAutorization (2),"
      "properties":{
        "ownerMno":{"type":"string"},
        "profileId":{"type":"string"}
      }
    },
    "terminalInfo":{
      "type":"object",
      "properties":{
        "majorSpecVersion":{"type":"integer"},
        "minorSpecVersion":{"type":"integer"},
        "imei":{"type":"string", "description":"OPTIONAL"}
      }
    },
    "euiccInfo":{
      "type":"object",
      "description":"OPTIONAL -- condtional if eventType = downloadProfile (0)",
      "properties":{
        "majorSpecVersion":{"type":"integer"},
        "minorSpecVersion":{"type":"integer"},
        "maxBlockSize":{"type":"integer",
        "maxProfileSize":{"type":"integer"},
        "firmwareVersion":{"type":"string"},
```

TABLE 37-continued

```
        "eccParameter":{
            "type":"object",
            "description":"elliptic curve parameters",
            "properties":{
                "keyParameterReferenceEcdsa":{
                    "type":"string",
                    "pattern":"^[0-9,a-f,A-F]{2}$",
                    "description":"one byte hexadecimal integer contained in certEuiccEcdsa - "
                },
                "keyParameterReferenceEcka":{
                    "type":"string",
                    "pattern":"^[0-9,a-f,A-F]{2}$",
                    "description":"one byte hexadecimal integer contained in certEuiccEcka - "
                }
            }
        }
    }
  }
}
```

As an example, the JSON body schema corresponding to the response message for the ES9_TerminalRequest message is given in Table 38 below.

TABLE 38

```
{
  "type":"object",
  "properties":{
    "resultCode":{"type":"integer"},
    "eventId":{"type":"string"},
    "eventType":{
      "type":"string",
      "description":"OPTIONAL -- conditional if terminalRequestType = downloadProfile (0)"
    },
    "srToken1":{
      "type":"object",
      "properties":{
        "certSrEcdsa":{"type":"string", "format":"base64"},
        "noncoSr":{"type":"string", "format":"base64"},
        "signSr1":{"type":"string", "format":"base64"},
      }
    },
    "dpToken1":{
      "type":"object",
      "description":"OPTIONAL -- conditional if terminalRequestType = downoadProfile (0)",
      "properties":{
        "profileRecordPart1":{
          "type":"object",
          "properties":{
            "profileId":{"type":["string","null"]},
            "plmnId":{"type":"string",
            "profileDescription":{"type":"string","maxLength":256}
          }
        },
        "ePkDpEcka":{"type":"string", "format":"base64"},
        "confirmType":{
          "Enum:[0,1],
          "description":"yesOrNo (0), codeInput (1)"
        },
        "confirmMessage":{
          "type":"stiring",
          "description":"OPTIONAL"
```

TABLE 38-continued

```
        },
        "signDr1":{"type":"string", "format":"base64"},
        "certDpEcdsa":{"type":"string", "format":"base64"},
        "certDpEcka":{"type":"string", "format":"base64"},
      }
    }
  }
}
```

"ES9_TerminalAuthRequest", a function of the ES9 interface, is a message used when the LPA requests the SM-SR+ for authorization for local profile management. As an example, <query path> of the message may be "/v1/es9/terminal-auth".

As an example, the JSON body schema corresponding to the request message for the ES9_TerminalAuthRequest message is given in Table 39 below.

TABLE 39

```
{
  "type":"object",
  "properties":{
    "euiccToken":{
      "type":"object",
      "properties":{
        "eventId":{"type:"string"},
        "signEuicc":{"type":"string", "format":"base64"},
        "nonceEuicc":{"type":"string", "format":"base64"},
        "euiccInfo":{
          "type":"object",
          "properties":{
            "majorSpecVersion":{"type":"integer"},
            "minorSpecVersion":{"type":"integer"},
            "maxBlockSize":{"type:"integer"},
            "maxProfileSize":{"type":"integer"},
            "firmwareVersion":{"type":"string"},
            "eccParameter":{
              "type":"object" ,
              "description":"elliptic curve, parameters",
              "properties":{
                "keyParameterReferenceEcdsa":{
                  "type":"string",
                  "pattern":"^[0-9,a-f,A-F]{2}$",
                  "description":"one byte hexadecimal integer contained in certEuiccEcdsa - "
                },
                "keyParameterReferenceEcka ":{
                  "type":"string",
                  "pattern":"^[0-9,a-f,A-F]{2}$",
                  "description":"one byte hexadecimal integer contained in certEuiccEcka - "
                }
              }
            }
          }
        }
      }
    },
    "certsEuicc":{
      "type":"object",
      "properties":{
        "certEuiccEcdsa":{"type":"string", "format":"base64"},
        "certEumEcdsa"{"tyde":"string,", "format":"base64"}
      }
    }
  }
}
```

As an example, the JSON body schema corresponding to the response message for the ES9_TerminalAuthRequest message is given in Table 40 below.

TABLE 40

```
{
  "type":"object",
  "properties":{
    "resultCode":{"type":"integer"},
    "srToken2":{
      "type":"object",
      "description":"OPTIONAL -- conditional if Terminal RequestType = localDeleteAuthorization (2)",
      "properties":{
        "signSr2":{"type":"string", "format":"base54"}
      }
```

TABLE 40-continued

```
    }
  }
}
```

"ES9_NotifyResultRequest", a function of the ES9 interface, is a message used when the LPA requests the SM-SR+ for notification of an event result. As an example, <query path> of the message may be "/v1/es9/notify-result".

As an example, the JSON body schema corresponding to the request message for the ES9_NotifyResultRequest message is given in Table 41 below.

TABLE 41

```
{
  "type":"object",
  "properties":{
    "eventResult":{
      "type":"object",
      "description":"OPTIONAL  -- conditional if LPA receives response from the eUICC containing eventResult. The LPA feeds to parse eventResult TLV from the eUICC to construct JSON object.",
      "properties":{
        "resultCode":{"type":"integer"},
        "eId":{}
          "type":"string",
          "pattern":"^[0-9,a-f,A-F]{32,64}$",
          "description":"16~32 byte hexadecimal integer. The length shall be even."
      },
      "eventId":{type":"string"},
      "profileRegistry":{
        "type":"array",
        "description":"OPTIONAL  -- conditional if eventType = getProfileRegistry (4)",
        "items":{
          "type":"object",
          "properties":{
            "profileRecord":{
              "type":"object",
              "properties":{
  "profileRecordPart1":{
  "type":"object",
  "properties":{
  "profileId": {"type":"string"},
  "plmnId":{"type":"string"},
    "profileDescription":{"type":"string", "maxlength":256}
          }
        },
  "profileRecordPart2":{
  "type":"object",
  "properties":{
  "profileType":{
    "enum":[0,1],
    "description":"provisioning (0), operational (1)"
  },
  "profileRequestType":{
    "type":"integer",
    "description":"OPTIONAL  -- conditional if ProfileRecoedPart1.profileId = NJLL"
  },
  "profileState":{
    "enum":[0,1],
    "description":"disable) (0) enabled (1)"
  }
  "ownerMno":{
    "type":"string",
    "description":"OPTIONAL"
  },
  "defaultSr":{
    "type":"object",
    "properties":{
      "primarySr":["type":"string"],
      "secondarySr":{
        "type":"string",
        "description":"OPTIONAL -- to be used by the LPA when the primary SM-SR+ is not reachable (e.g., due to the primary SM-SR+ server failure)"
```

TABLE 41-continued

```
        }
      }
    },
    "authorizedSr ":{
      "type":"array",
      "items":{"type":"string"}
    },
    "profilePolicyRule":{
      "type":"array",
      "items":{
        "type":"object",
        "properties":{
          "pprLocalDelete":{
            "type":"object",
            "description":"OPTIONAL -- condtional if profilePolicyRule[i].pprLocalMdmtNotification does not exist",
            "properties":{
              "pprId":{"type":"integer", "description":"value is 0"},
              "deleteAuthorization":{
                "enum":[0,1],
                "description":"authorizationNotRequired (0), authorizationRequired (1)"
              }
            }
          },
          "pprLocalMgmtNotification":{
            "type":"object",
            "description":"OPTIONAL -- conditional if profilePolicyRule[i].pprLocalDelete does not exist",
            "properties": {
              "pprId":"type":"integer", "description":"value is 1"},
              "notiEventList":{
                "type":"array",
                "description":"OPTIONAL",
                "items":{
                  "enum":[0,1,2],
                  "description":"enable (0), disable (1), delete (2)"
                }
              }
            }
          }
        }
      }
    },
    "epr":{
      "type":"object",
      "description":"OPTIONAL -- conditional if eventType = getEPR (6)",
      "properties":{
        "eprServerAccessControl":{
          "type":"object",
          "description":"OPTIONAL",
          "properties":{
            "eprId":{"type":"integer", "description":"value is 0"},
            "authorized":{
              "type":"array",
              "items":{"type":"string"}
            },
            "SrAccessControl":{
              "enum": [0,1],
              "description":"blackList (0), whiteList (1)"
            },
            "srList":{
              "type":"array",
              "description":"OPTIONAL -- conditional it SM-SR+ list exists",
              "items":{"type":"string"}
            },
            "dpAccessControl":{
              "enum":[0,1],
              "description":"blackList (0), whiteList (1)"
            },
```

TABLE 41-continued

```
            "dpList":{
"type":"array",
"description":"OPTIONAL -- conditional if SM-DP+ list exists",
"items":{"type":"string"}
            }
          }
        },
        "eprSubsidyLock":{
          "type":"object",
          "description":"OPTIONAL",
          "properties":{
"cprId":{"type":"integer", '"description":"value is 1"},
            "authorizedSr":{
"type":"array",
"items":{"type":"string"}
            },
            "lockType":{
"enum":[0,1,2],
"description":"unlocked (0), mnoLocked (1), countryLocked (2)"
            },
            "mnoList":{
"type":"array",
"description":"OPTIONAL -- conditional if lockType - mnoLocked (1)",
"items":{"type":"string"}
            },
            "countryList":{
"type":"array",
"description":"OPTIONAL -- conditional if lockType - countryLocked (2)",
"items":{"type":"string"}
            }
          }
        },
        "eprUserConfirmation":{
          "type":"object",
          "description":"OPTIONAL",
          "properties":{
            "eprId":{
"type":"integer",
"description":"value is 2"
            },
            "authorizedSr":{
"type":"array",
"items":{"type":"string"}
            },
            "mnoList":{
"type":"array",
"items":{"type":["string","null"]}
            }
          }
        }
      }
    },
    "dsInfoStatic":{
      "type":"object",
      "description":"OPTIONAL -- conditional if
eventType = getDSInfo (8)",
      "properties":{
        "primaryDs":{"type":"string"},
        "secondaryDs":{
          "type":"string",
          "description":"OPTIONAL"
        },
        "authorizedSr":{
          "type":"array",
          "items":{"type":"string"}
        }
      }
    },
    "ciInfo":{
      "type":"object",
      "description":"OPTIONAL -- conditional if
eventType - cctCIInfo (10)",
      "properties":{
        "ciList":{
          "type":"array",
          "items":{
            "type":"string",
            "format":"base64",
"description":"CERT CI ECDSA is included"
          }
```

TABLE 41-continued

```
            },
            "authorizedSr":{
              "type":"array",
              "items":{"type":"string"}
            }
          }
        },
        "firmwareInfo":{
          "type":"object ",
          "description":"OPTIONAL -- conditional if
eventType = getFirmwareInfo (12)",
          "properties ":{
            "firmawareVersion":{
              "type":"string"
            },
            "authorizedSr:{
              "type":"array",
              "items":{"type":"string"}
            }
          }
        },
        "signResult":{"type":"string", "format":"base64"}
      }
    },
"LocalEventResult":{
      "type":"object",
      "description":"OPTIONAL -- conditional if LPA receives
response from the eUTCC containing localEventResult",
      "properties":{
        "resultCode":{"type":"integer"},
        "localEventType":{
          "enum":[0,1,2,3,4,5,6,8,9,10],
          "description":"enableProfile        (0),
disableProfile (1), deleteProfile (2), getProfileRegistry (3), updateProfileRegistry
(4), getEid (5), getDsInfoStatic (6), updateDsInfoStatic (7), getCert (8), getEuiccInfo
(9), resetEuicc (10)"
        },
        "eId":{
          "type":"string",
          "pattern":"^[0-9,a-f,A-F]{32,64}$",
          "description":"16~32 byte hexadecimal integer.
The length shall be even."
        },
  "profileId":{"type":"string"},
        "timeStamp":{"type":"string", "description":"sample:
1295103598"},
        "nonceEuicc":{"type":"integer"},
        "signResult":{"type":"string", "format":"base64"}
      }
    },
    "certEuiccEcdsa":{
      "type":"string",
      "format":"base64",
      "description":"OPTIONAL        --      conditional      if
ES9_NotifyResultRequest contains localEventResult"
    },
    "certEumEcdsa":{
      "type":"string",
      "format":"base64",
      "description":"OPTIONAL        --      conditional      if
ES9_NotifyResultRequest contains localEventResult"
    },
    "resultCode":{
      "type":"integer",
      "description":"OPTIONAL -- conditional if the response from
the eUICC does not contain eventResult nor localEventResult"
    }
  }
}
```

As an example, the JSON body schema corresponding to the response message for the ES9_NotifyResultRequest message is given in Table 42 below.

TABLE 42

```
{
    "type":"object",
    "properties":{
        "resultCode":{"type":"integer"}
    }
}
```

"ES9_FactoryEventRequest", a function of the ES9 interface, is a message used when the LPA requests the SM-SR+ for the profile download event for a specific eUICC in bulk profile provisioning. As an example, <query path> of the message may be "/v1/es9/factory-event".

As an example, the JSON body schema corresponding to the request message for the ES9_FactoryEventRequest message is given in Table 43 below.

TABLE 43

```
{
  "type":"object",
  "properties":{
    "eId":{
      "type":"string",
      "pattern":"^[0-9,a-f,A-F]{32,64}$",
      "description":"16~32 byte hexadecimal integer. The length shall be even."
    }
  }
}
```

As an example, the JSON body schema corresponding to the response message for the ES9_FactoryEventRequest message is given in Table 44 below.

TABLE 44

```
{
  "type":"object",
  "properties":{
    "resultCode":{"type":"integer"},
    "eventId":{"type":"string"},
    "eventType":{
      "enum":[0],
      "description":"downLoadProfile (0)"
    },
    "srToken1":{
    "type":"object",
    "properties":{
        "certSrEcdsa":{"type":"string", "format":"base64"},
        "nonceSr":{"type":"string", "format":"base64"},
        "signSr1":{"type":"string", "format":"base64"},
      }
    },
    "cpToken1":{
      "type":"object",
      "properties":{
        "profileRecordPart1":{
          "type":"object",
          "properties":{
            "profileId":{"type":"string"},
            "plmnId":{"type":"string"},
            "profileDescription":{"type":"string", "maxLength":256}
          }
        },
        "ePkDpEcka":{"type":"string", "format":"base64"},
        "signDp1":{"type":"string", "format":"base64"},
```

TABLE 44-continued

```
        "certDpEcdsa":{"type":"string", "format":"base64"},
        "certDpEcka":{"type":"string", "format":"base64"}
      }
    }
  }
}
```

"ES9+.InitiateAuthentication", a function of the ES9+ interface (interface between LPA and SM-DP+), is a message used when the LPA requests the SM-DP+ for authentication initialization. As an example, <query path> of the message may be "/v1/es9/init-auth".

As an example, the JSON body schema corresponding to the request message for the ES9+.InitiateAuthentication message is given in Table 45 below.

TABLE 45

```
{
    "type" : "object",
    "properties" : {
      "eUiccChallenge" {
        "type" : "string",
        "format" : "base64",
        "description" : "base64 encoded binary data containing eUICC_Challenge "
      },
      "svn" : {
        "type" : "string",
        "description" : "SVN in string, e.g.; 1.0.0"
      },
      "certificateInfo" : {
        "type" : "string",
        "format" : "base64",
        "description" : "base64 encoded binary data containing Certificate_Info "
      },
      "smdpAddress" : {
        "type" : "string",
        "description" : "SM-DP+ Address"
      }
    }
}
```

As an example, the JSON body schema corresponding to the response message for the ES9+.InitiateAuthentication message is given in Table 46 below.

TABLE 46

```
{
    "type" : "object",
    "properties" : {
      "resultCode" : {
        "type" : "string",
        "description" : "Code value indicating the result"
      },
      "transactionId" : {
        "type" : "string",
        "pattern" : "^[0-9,a-f,A-F]{2,32}$",
        "description" : "Hexadecimal representation of the TransactionID "
      },
      "euiccInputData" : {
        "type" : "string",
        "format" : "base64",
        "description" : "base64 encoded binary data
      }
    }
}
```

An example of the ES9+.InitiateAuthentication HTTP request message sent from the LPA to the SM-DP+ is shown in Table 47 below.

TABLE 47

```
HTTP POST /gsma/rsp1/es9plus/initiateAuthentication HTTP/1.1
Host: smdp.gsma.com
X-Admin-Protocol: gsma/rsp1
Content-Type: application/json
Content-Length: 174
{
  "eUiccChallenge" : "ZVVpY2NDaGFsbGVuZ2VFeGFtcGxlQmFzZTY0oUFZUQnNZVE5D",
  "svn" : "1.0.0",
  "certificateinfo" : "RmVHRnRjR3hsUW1GelpUWTBvVUZadVFuTlpWR1TU",
  "smdpAddress" : "smdp.gsma.com"
}
```

An example of the ES9+.InitiateAuthentication HTTP response message sent from the SM-DP+ to the LPA is shown in Table 48 below.

TABLE 48

```
HTTP/1.1 200 OK
X-Admin-Protocol: gsma/rsp1
Content-Type application/json
Content-Length: 123
{
  "resultCode" : "9000",
  "transactionId" : "0123456789ABCDEF,
  "euiccInputData" "RKNFZshFVUa05qUm14e1YyNWtUbUpHRkFTV0RRZHdxZGFzc1ducFp"
}
```

"ES9+.GetBoundProfilePackage", a function of the ES9+ interface, is a message used when the LPA requests the SM-DP+ for a bound profile package (BPP). As an example, <query path> of the message may be "/v1/es9/get-bound".

As an example, the JSON body schema corresponding to the request message for the ES9+.GetBoundProfilePackage message is given in Table 49 below.

TABLE 49

```
{
  "type : "object",
  "properties" : {
    "transactionId" : {
      "type" : "string",
      "pattern" : "^[0-9,A-F]{2,32}$",
      "description" : "Hexadecimal representation of the TransactionID "
    },
    "eUiccPrepareDownloadResponse" : {
      "type" : "string",
      "format" : "base64",
      "description" : "base64 encoded binary data containing eUICC_PrepareDownloadPresponse "
    }
  }
}
```

As an example, the JSON body schema corresponding to the response message for the ES9+.GetBoundProfilePackage message is given in Table 50 below.

TABLE 50

```
{
  "type" : "object",
  "properties" : {
    "resultCode" : {
      "type" : "string",
      "description" : "Code value indicating the result"
    },
    "transactionId" : {
```

TABLE 50-continued

```
      "type" : "string",
      "pattern" : "^(0-9,A-F]{2,32}$",
      "description" : "Hexadecimal representation of the TransactionID "
    },
    "profileMetaData" : {
      "type" : "object",
      "description" : "data containing Profile Metadata",
      "properties" : {
        "iccid" : {
          "type" : "string",
          "pattern" : "^(0-9,A-F]{10}$",
          "description" : "OPTIONAL  -  ICCID in hexadecimal string"
        },
        "isdpAid" : {
          "type" : "string",
          "pattern" : "^(0-9,A-F}$",
          "description" : "OPTIONAL  -  AID of the ISD-P in hexadecimal string"
        },
        "profileState" : {
          "enum" : [0,1],
          "description" : "OPTIONAL  -  disabled (0), enabled (1) "
        },
        "profileNickname" : {
          "type" : "string",
          "pattern" : "^[^](0,64)$",
          "description" : "OPTIONAL - Profile Nickname in UTF-8 string"
        },
        "profileProviderName" : {
          "type" : "string",
          "pattern" : "^ [^](0,32)$",
          "description" : " OPTIONAL - Profile Provider's name in UTF-8 string"
        },
        "profilename" : {
          "type" : "string",
          "pattern" : "^ [^](0,64)$",
          "description" : "OPTIONAL - Profile name in UTF-8 string"
        },
        "iconType" : {
          "enum" : [0,1],
          "description" : "OPTIONAL - JPG (0), PNG (1)"
        },
        "icon" : {
          "type" : "string",
          "format" : base64",
          "description" : "CONDITIONAL  -  BLOB representing the icon. This SHALL be present if iconType is present"
        }
```

TABLE 50-continued

```
    },
    "boundProfilePackage" : {
        "type" : "string",
        "format" : "base64",
        "description" : "base64 encoded binary data containing Bound
Profile Package"
    }
  }
}
```

"ES11_PSRequest" or "ES11_PSListRequest", a function of the ES11 interface (interface between LPA and SM-DS), is a message used when the LPA requests the SM-DS for a push service or a list of push services. As an example, <query path> of the message may be "/v1/es11/push-service".

As an example, the JSON body schema corresponding to the request message for the ES11_PSRequest or ES11_PSListRequest message is given in Table 51 below.

TABLE 51

```
{
}
```

As an example, the JSON body schema corresponding to the response message for the ES11_PSRequest or ES11_PSListRequest message is given in Table 52 below.

TABLE 52

```
{
  "type":"object",
  "properties": [
    "resultCode":{"type":integer"},
    "pushServices":{
      "type":"array",
      "description":"OPTIONAL -- if resultCode is '9000 Success'",
      "items":{
        "type":"object",
        "properties":{
          "pushServiceId":{
            "enum":[0,1,2,3],
            "description":"ePS (0), GCM (1), APNS (2), 3rd-party (3)"
          },
          "pushServerId":{"type":"string", "description":"OPTIONAL"},
          "pushClientId":{"type":"string", "description":"OPTIONAL"}
        }
      }
    }
  ]
}
```

"ES11_PSRegistrationRequest", a function of the ES11 interface, is a message used when the LPA requests the SM-DS for registration of the LPA for push notification. As an example, <query path> of the message may be "/v1/es11/push-service/registration".

As an example, the JSON body schema corresponding to the request message for the ES11_PSRegistrationRequest message is given in Table 53 below.

TABLE 53

```
{
  "type":"object",
  "properties":{
    "resultCode":{"type":"integer"},
```

TABLE 53-continued

```
    "protectedEid":{
      "type":"object",
      "properties":{
        "eid":{
          "type":"string",
          "pattern":"^[0-9,a-f,A-F]{32,64}$",
          "description":"16-32 byte hexadecimal integer.
The length shall be even."
        },
        "timeStamp":{"type":"string", "description":"sample:1295103598"},
        "signEid":{"type":"string", "format":"base64"}
      }
    },
    "pushService":{
      "type":"object",
      "properties":{
        "pushServiceId":{
          "enum":[0,1,2,3],
          "description":"ePS (0), GCM (1), APNS (2), 3rd-party (3)"
        },
        "pushServerId":{"type":"string", "description":"OPTIONAL"},
        "pushClientId":{"type":"string", "description":"OPTIONAL"}
      }
    },
    "pushToken":{"type":"string"},
    "eIdToken":{"type":"string"}
  }
}
```

As an example, the JSON body schema corresponding to the response message for the ES11_PSRegistrationRequest message is given in Table 54 below.

TABLE 54

```
{
  "type":"object",
  "properties":{
    "resultCode":{"type":"integer"}
  }
}
```

"ES11_PSConfirmRequest", a function of the ES11 interface, is a message used when the LPA requests the SM-DS for return of a push service registration result. As an example, <query path> of the message maybe "/v1/es11/push-service/confirm".

As an example, the JSON body schema corresponding to the request message for the ES11_PSConfirmRequest message is given in Table 55 below.

TABLE 55

```
{
  "type":"object",
  "properties":{
    "eid":{
      "type":"string",
      "pattern":"^[0-9,a-f,A-F]{32,64}$",
      "description":"16~32 byte hexadecimal integer. The length
shall be even."
    }
  }
}
```

As an example, the JSON body schema corresponding to the response message for the ES11_PSConfirmRequest message is given in Table 56 below.

TABLE 56

```
{
    "type":"object",
    "properties":{
        "resultCode":{"type":"integer"}
    }
}
```

"ES11_EventIDRequest", a function of the ES11 interface, is a message used when the LPA requests the SM-DS for return of at least one pending event ID associated with a specific EID. As an example, <query path> of the message may be "/v1/es11/event-id".

As an example, the JSON body schema corresponding to the request message for the ES11_EventIDRequest message is given in Table 57 below.

TABLE 57

```
{
    "type":"object",
    "properties":{
        "protectedEid":{
            "type":"object",
            "properties":{
                "eId":{
                    "type":"string",
                    "pattern":"^[0-9,a-f,A-F]{32,64}$",
                    "description":"16~32 byte hexadecimal integer. The length shall be even."
                },
                "timeStamp":{"type":"string", "description":"sample: 1295103598"},
                "signEid":{"type":"string", "format":"base64"}
            }
        }
    }
}
```

As an example, the JSON body schema corresponding to the response message for the ES11_EventIDRequest message is given in Table 58 below.

TABLE 58

```
{
    "type":"object",
    "properties":{
        "resultCode":{"type":"integer"},
        "eventIdList":{
            "type":"array",
            "description":"conditional if resultCode indicates SUCCESS",
            "items":{
                "type":"object",
                "properties":{
                    "eventId":{"type":"string"},
                    "srId":{"type":"string"}
                }
            }
        }
    }
}
```

"ES11_DeleteEventRequest", a function of the ES11 interface, is a message used when the LPA requests the SM-DS for deletion of a specific event. As an example, <query path> of the message may be "/v1/es1/delete-event".

As an example, the JSON body schema corresponding to the request message for the ES11_DeleteEventRequest message is given in Table 59 below.

TABLE 59

```
{
    "type":"object",
    "properties":{
        "protectedEid":{
            "type":"object",
            "properties":{
                "eId":{
                    "type":"string",
                    "pattern":"^[0-9,a-f,A-F]{32,64}$",
                    "description":"16~32 byte hexadecimal integer. The length shall be even."
                },
                "timeStamp":{"type":"string"},
                "description":"sample:1295103598"},
                "signEid":{"type":"string", "format":"base64"}
            }
        },
        "eventId":{"type":"string"}
    }
}
```

As an example, the JSON body schema corresponding to the response message for the ES11_DeleteEventRequest message is given in Table 60 below.

TABLE 60

```
{
    "type":"object",
    "properties":{
        "resultCode":{"type":"integer"}
    }
}
```

"ES12_RegisterEventRequest", a function of the ES12 interface (interface between SM-SR+ and SM-DS), is a message used when the SM-SR+ requests the SM-DS for insertion of an event. If a push token is registered for an EID, the SM-DS transmits the push token to the corresponding push server. As an example, <query path> of the message may be "/v1/es12/register-event".

As an example, the JSON body schema corresponding to the request message for the ES12_RegisterEventRequest message is given in Table 61 below.

TABLE 61

```
{
    "type":"object",
    "properties":{
        "eventId":{"type":"string"},
        "eId":{
            "type":"string",
            "pattern":"^[0-9,a-f,A-F]{32,64}$",
            "description":"16~32 byte hexadecimal integer. The length shall be even."
        },
        "srId":{"type":"string"}
    }
}
```

As an example, the JSON body schema corresponding to the response message for the ES12_RegisterEventRequest message is given in Table 62 below.

TABLE 62

```
{
    "type":"object",
    "properties":{
        "resultCode":{"type":"integer"}
    }
}
```

"ES12_DeleteEventRequest", a function of the ES12 interface, is a message used when the SM-SR+ requests the SM-DS for deletion of a specific event. As an example, <query path> of the message may be "/v1/es12/delete-event".

As an example, the JSON body schema corresponding to the request message for the ES12_DeleteEventRequest message is given in Table 63 below.

TABLE 63

```
{
    "type":"object",
    "properties":{
        "eventId":{"type":"string"}
    }
}
```

As an example, the JSON body schema corresponding to the response message for the ES12_DeleteEventRequest message is given in Table 64 below.

TABLE 64

```
{
    "type":"object",
    "properties":{
        "resultCode":{"type":"integer"}
    }
}
```

"ES13_URLRequest", a function of the ES13 interface (interface between LPA and MNO), is a message used when the LPA requests the MNO for return of URL for processing a subscription request or activation voucher validation. As an example, <query path> of the message may be "/v1/es13/url".

As an example, the JSON body schema corresponding to the request message for the ES13_URLRequest message is given in Table 65 below.

TABLE 65

```
{
    "type":"object",
    "properties":{
        "urlType":{
            "enum":[0,1],
            "description":"denotes the type of URL - subscription (0), activation voucher (1)"
        },
        "protectedEid":{
            "type":"object",
            "properties":{
                "eId":{
                    "type":"string",
                    "pattern":"^[0-9,a-f,A-F]{32,64}$",
                    "description":"16~32 byte hexadecimal integer. The length shall be even."
                },
                "timeStamp":{"type":"string",
"description":"sample:1295103598"},
                "signEid":{"type":"string", "format":"base64"}
            }
```

TABLE 65-continued

```
        }
    }
}
```

As an example, the JSON body schema corresponding to the response message for the ES13_URLRequest message is given in Table 66 below.

TABLE 66

```
{
    "type":"object",
    "properties":{
        "resultCode":{"type":"integer"},
        "url":{"type":"string"}
    }
}
```

Next, the functions (messages) shown in Table 3 will be described in detail.

The terminal-to-eUICC interface (i.e., ES10) functions shown in Table 3 may be communicated using a data object in the TLV (tag length value) format through a APDU (application protocol data unit) protocol.

The terminal-to-eUICC ES 10 interface may satisfy the following requirements. The requirements are as follows: before an APDU is transmitted, the terminal (i.e., LPA) opens a logical channel by using a "MANAGE CHANNEL" command, and selects a TAF application by using a "SELECT" command; and an AID for the TAF has, for example, a value such as "A 00 00 05 59 10 10 FF FF FF FF 89 00 00 03 00".

The functions for the terminal-to-eUICC ES 10 interface include a remote management function (RMF) and a local management function (LMF).

First, the RMF will be described.

The LPA may call the RMF of the eUICC by transmitting a "STORE DATA" command. The data field of the "STORE DATA" command may be coded according to Table 67.

TABLE 67

| DGI | Length | Value Description | | MOC |
|---|---|---|---|---|
| 'TBD' | Var | Remote Management Function | | M |
| | | Tag | Length | Value Description | MOC |
| | | 'XX'(NOTE) | var. | request TLV | M |

When the data size of the "STORE DATA" command is greater than 255 bytes, the data may be split and may be transmitted through a plurality of "STORE DATA" commands.

The response data of the "STORE DATA" command may be coded according to Table 68.

TABLE 68

| DGI | Length | Value Description | | MOC |
|---|---|---|---|---|
| 'TBD' | Var | Remote Management Function | | M |
| | | Tag | Length | Value Description | MOC |
| | | 'XX'(NOTE) | var. | response TLV | M |

When the size of the response data is greater than 255 bytes, chaining of the command may be performed. That is, the LPA may retrieve the response data by using a plurality of "GetResponse" commands. The tag value of the data field may be automatically allocated through the AUTOMATIC TAG option of ASN.1 (abstract syntax notation one).

The RMF may include a remote management request TLV and a remote management response TLV. The remote management request TLV may be transmitted form the LPA to the eUICC by using a "STORE DATA" command. In response to the received remote management request TLV, the eUICC may transmit the remote management response TLV by using a "STORE DATA APDU" response or "GET RESPONSE APDU" response.

An example of the RMF will be described.

The LPA may send a "GetAuthData" request message to the eUICC in order to trigger the eUICC to prepare authentication of the SM-SR+, SM-DP+, or SM-DS, and may receive a response message from the eUICC.

As an example, the schema of the request message for the GetAuthData message is given in Table 69 below.

TABLE 69

```
ES10_GetAuthDataRequest ::= SEQUENCE {
    eventID         EventID,
    eventType       EventType,
    srToken1        SRToken1,
    dpToken1        DPToken1                OPTIONAL,
    -- conditional if eventType = downloadProfile (0)
    terminalType    TerminalType            OPTIONAL,
    -- conditional if eventType = downloadProfile (0)
    provisioningType ProvisioningType OPTIONAL    -- conditional
if eventType = downloadProfile (0)
}
```

As an example, the schema of the response message for the GetAuthData message is given in Table 70 below.

TABLE 70

```
ES10_GetAuthDataResponse ::= SEQUENCE {
    resultCode      ResultCode,
    eUICCToken      EUICCToken,
    eventID         EventID
    OPTIONAL
}
```

The LPA may send an "EstablishSecureChannel" request message to the eUICC in order to deliver parameters for session key agreement, and may receive a response message from the eUICC.

As an example, the schema of the request message for the EstablishSecureChannel message is given in Table 71 below.

TABLE 71

```
ES10_EstablishSecureChannelRequest ::= SEQUENCE {
    eventID                 EventID,
    profileRecordPart1      ProfileRecordPart1,
```

TABLE 71-continued

```
    dpToken2                DPToken2,
    srToken2                SRToken2
}
```

As an example, the schema of the response message for the EstablishSecureChannel message is given in Table 72 below.

TABLE 72

```
ES10_EstablishSecureChannelResponse ::= SEQUENCE {
    resultCode              ResultCode
}
```

The LPA may send an "InstallProfileRecord" request message to the eUICC in order to deliver ProfileRecordPart2 protected by the established secure channel SCP03t, and may receive a response message from the eUICC.

As an example, the schema of the request message for the InstallProfileRecord message is given in Table 73 below.

TABLE 73

```
ES10_InstallProfileRecordRequest ::= SEQUENCE {
    securedProfileRecordPart2       SCP03tCommandTLV
}
```

If the eUICC receives the InstallProfileRecord request message, and a valid SCP03t channel is established, the eUICC processes "SCP03tCommandTLV" in the request TLV by using the session key SCP03 of the designated secure channel. Contrarily, if there is no valid channel SCP03t, the eUICC may return a response TLV indicating failure.

As an example, the schema of the response message for the InstallProfileRecord message is given in Table 74 below.

TABLE 74

```
ES10_InstallProfileRecordResponse ::= SEQUENCE {
    resultCode          ResultCode,
    scp03tResponseTLV   SCP03tResponseTLV       OPTIONAL    -- conditional
    if resultCode indicates a failure
}
```

The LPA may send an "UpdateSessionKey" request message carrying a previously generated profileProtectionKey used for protecting a profile package to the eUICC in order to replace the established session key with the profileProtectionKey, and may receive a response message from the eUICC.

As an example, the schema of the request message for the UpdateSessionKey message is given in Table 75 below.

TABLE 75

```
ES10_UpdateSessionKeyRequest ::= SEQUENCE {
    profileProtectionKey        SCP03tCommandTLV
}
```

As an example, the schema of the response message for the UpdateSessionKey message is given in Table 76 below.

TABLE 76

```
ES10_UpdateSessionKeyResponse ::= SEQUENCE {
    resultCode              ResultCode,
    scp03tResponseTLV       SCP03tResponseTLV
}
```

The LPA may send an "InstallProfilePackageBlock" request message to the eUICC so as to deliver a data SecuredProfilePackageBlock received from the SM-SR+ or SM-DP+, and may receive a response message from the eUICC.

As an example, the schema of the request message for the InstallProfilePackageBlock message is given in Table 77 below.

TABLE 77

```
ES10_InstallProfilePackageBlockRequest ::= SEQUENCE {
    securedProfilePackageBlock      SCP03tCommandTLV,
    lastPBIndicator                 LastPBIndicator
}
LastPBIndicator ::= ENUMERATED { morePB (0), lastPB (1) }
```

As an example, the schema of the response message for the InstallProfilePackageBlock message is given in Table 78 below.

TABLE 78

```
ES10_InstallProfilePackageBlockResponse ::= SEQUENCE {
    resultCode              ResultCode,
    eventResult             EventResult         OPTIONAL,    --
conditional if the SecuredProfilePackageBlock was last.
    scp03tResponseTLV       SCP03tResponseTLV   OPTIONAL    -- conditional
if resultCode indicates a failure
}
EventResult ::= SEQUENCE {
    resultCode              ResultCode,
    eID                     EID,
    eventID                 EventID,
    profileID               ProfileID
    OPTIONAL,       -- conditional if eventType = downloadProfile (0)
    profileRegistry         ProfileRegistry     OPTIONAL,    -- conditional
if eventType = getProfileRegistry (4)
    epr                     EUICCPolicyRule     OPTIONAL,
    -- conditional if eventType = getEPR (6)
    dsInfoStatic            DSInfoStatic                    OPTIONAL,
    -- conditional if eventType = getDSInfo (8)
    ciInfo                  CIInfo
    OPTIONAL,       -- conditional if eventType = getCIInfo (10)
    firmwareInfo            FirmwareInfo                    OPTIONAL,
    -- conditional if eventType = getFirmwareInfo (12)
    sign_Result             SIGN_ECDSA
}
```

Here, "sign_result" may be calculated using the SK_eUICC_ECDSA for all value data in the EventResult, excluding itself (the sign_result). For example, when eventType=getProfileRegistry, the sign_result is the result of signing the resultCode|eID|eventID|profileRegistry.

The LPA may send a "ReleaseSecurChannel" request message to the eUICC so as to release the secure channel and associated session key, and may receive a response message from the eUICC.

As an example, the schema of the request message for the ReleaseSecureChannel message is given in Table 79 below.

TABLE 79

```
ES10_ReleaseSecureChannelRequest ::= SEQUENCE {
}
```

If the eUICC receives the ReleaseSecureChannel request message, the eUICC may remove the stored SCP03t secure channel-session key set.

As an example, the schema of the request message for the ReleaseSecurChannel message is given in Table 80 below.

TABLE 80

```
ES10_ReleaseSecureChannelResponse ::= SEQUENCE {
    resultCode              ResultCode
}
```

The LPA may send an "eUICCManagement" request message to the eUICC in order to deliver the srToken2 and event contained in the ES9_eUICCManagementResponse message received from the SM-SR+, and may receive a response message from the eUICC.

As an example, the schema of the request message for the eUICCManagement message is given in Table 81 below.

TABLE 81

```
ES10_eUICCManagementRequest ::= SEQUENCE {
    event           Event,
    srToken2        SRToken2
}
```

As an example, the schema of the response message for the eUICCManagement message is given in Table 82 below.

TABLE 82

```
ES10_eUICCManagementResponse ::= SEQUENCE {
    eventResult         EventResult
}
```

Here, the detailed structures of the event and the eventResult may be further defined.

The LPA may send a "TerminalAuth" request message to the eUICC in order to trigger the eUICC to prepare authentication of the SM-SR+ for device swap authentication or local deletion authentication, and may receive a response message from the eUICC.

As an example, the schema of the request message for the TerminalAuth message is given in Table 83 below.

TABLE 83

```
ES10_TerminalAuthRequest ::= SEQUENCE {
    eventID                                    EventID,
    terminalRequestType    TerminalRequestType (deviceSwap |
LocalDeleteAuthorization),
    srToken1                                   SRToken1
}
```

As an example, the schema of the response message for the TerminalAuth message is given in Table 84 below.

TABLE 84

```
ES10_TerminalAuthResponse ::= SEQUENCE {
    resultCode      ResultCode,
    eUICCToken      EUICCToken
}
```

Next, the LMF will be described.

The LPA may call the LMF of the eUICC by transmitting a "STORE DATA" command. The data field of the "STORE DATA" command may be coded according to Table 85.

TABLE 85

| DGI | Length | Value Description | MOC |
|---|---|---|---|
| 'TBD' | Var | Local Management Function | M |
| | Tag | Length | Value Description | MOC |
| | 'XX'(NOTE) | var. | request TLV | M |

When the data size of the "STORE DATA" command is greater than 255 bytes, the data may be split and may be transmitted through a plurality of "STORE DATA" commands.

The response data of the "STORE DATA" command may be coded according to Table 86.

TABLE 86

| DGI | Length | Value Description | MOC |
|---|---|---|---|
| 'TBD' | Var | Local Management Function | M |
| | Tag | Length | Value Description | MOC |

TABLE 86-continued

| | 'XX'(NOTE) | var. | response TLV | M |
|---|---|---|---|---|

When the size of the response data is greater than 255 bytes, chaining of the command may be performed. That is, the LPA may retrieve the response data by using a plurality of "GetResponse" commands. The tag value of the data field may be automatically allocated through the AUTOMATIC TAG option of ASN.1.

The LMF may include a local management request TLV and a local management response TLV. The local management request TLV may be transmitted form the LPA to the eUICC by using a "LOCAL STORE DATA" command. In response to the received local management request TLV, the eUICC may transmit the local management response TLV by using a "STORE DATA APDU" response or "GET RESPONSE APDU" response.

An example of the LMF will be described.

The LPA may send a "LocalManagement" request message to the eUICC in order to deliver a localEvent containing detailed information on a local management event, and may receive a response message from the eUICC.

As an example, the schema of the request message for the LocalManagement message is given in Table 87 below.

TABLE 87

```
ES10_LocalManagementRequest ::= SEQUENCE {
    localEvent              LocalEvent
}
LocalEvent ::= SEQUENCE {
    localEventType          LocalEventType,
    timeStamp               UTCTime,
                            /* the time when the LPA
        generated this localEvent */
    profileID                                         ProfileID
            OPTIONAL,  /* conditional if localEventType =
    { enableProfile (0), disableProfile (1),
    deleteProfile (2), updateProfileRegistry (4) } */
    profileDescription      ProfileDescription     OPTIONAL,   /*
conditional if localEventType = updateProfileRegistry (4) */
    primaryDS                                         DSID
            OPTIONAL,       /* conditional if localEventType =
    updateDSInfoStatic (7) */
    secondaryDS                                       DSID
            OPTIONAL,  /* if localEventType =
```

TABLE 87-continued

```
        updateDSInfoStaticC (7) */
        srToken2                    SRToken2
        OPTIONAL         -- conditional for after authorization of the SM-SR+
}
LocalEventType ::= ENUMERATED {
        enableProfile (0),
        disableProfile (1),
        deleteProfile (2),
        getProfileRegistry (3),
        updateProfileRegistry (4),
        getEID (5),
        getDSInfoStatic (6),
        updateDSInfoStatic (7),
        getCert (8),
        getEUICCInfo (9),
resetEUICC (10)
}
```

As an example, the schema of the response message for the LocalManagement message is given in Table 88 below.

TABLE 88

```
ES10_LocalManagementResponse ::= SEQUENCE {
        resultCode                  ResultCode,
profileRegistry                     ProfileRegistry         OPTIONAL,    -- conditional
if localEventType = getProfileRegistry (3)
        protectedEID                ProtectedEID                         OPTIONAL,
        -- conditional if localEventType = getEID (5)
        dsInfoStatic                DSInfoStatic                         OPTIONAL,
        -- conditional if localEventType = getDSInfoStatic (6)
        certs_eUICC                 CERTS_eUICC                          OPTIONAL,
        -- conditional if localEventType = getCert (8)
        euiccInfo                                           EUICCInfo
        OPTIONAL,      -- conditional if localEventType = getEUICCInfo (9)
        localEventResult LocalEventResult                   OPTIONAL,    -- conditional (Note1)
        defaultSR                                           DefaultSR
        OPTIONAL,      -- conditional (Note1)
        ownerMNO                    MNOID                                OPTIONAL
        -- conditional (Note1)
}
LocalEventResult ::= SEQUENCE {
        resultCode                  ResultCode,
        localEventType              LocalEventType,         --           enableProfile,
disableProfile, or deleteProfile
        eID                                                 EID,
        profileID                                           ProfileID,
        timeStamp                   UTCTime,                             --
timeStamp that was contained in the localEvent
        sign_Result                 SIGN_ECDSA
}
ProtectedEID ::= SEQUENCE {
        eID                                                 EID,
        timeStamp                   UTCTime,
        sign_EID                    SIGN_ECDSA
}
```

If the localEventType is "getProfileRegistry": the eUICC may deliver the ProfileRegistry to the LPA through the ES10_eUICCManagementResponse message.

When a specific profile is indicated by the event.profileID, the ProfileRegistry in the eventResult may include the ProfileRecord of the profile. The event.profileID is NULL, the ProfileRegistry may include the ProfileRecords of all profiles, and the authorizedSR of the profile may include the SRID of the requesting SM-SR+.

LocalEventResult, defaultSR, and ownerMNO TLVs exist in the LocalManagementResponse message when the localEventType has a value of one of {enableProfile, disableProfile, and deleteProfile} and the PPRLocalMgmtNotification.notiEventList includes the corresponding EventToBeNotified.

Here, "sign_Result" may be calculated using the SK_eUICC_ECDSA for all value data in the LocalEventResult, excluding itself (the sign_result). For example, when eventType is "disableProfile", the sign_Result may be calculated for the resultCode|localEventType|eID|profileID|timestamp.

The signature verification certificate CERT_ECDSA used in the present disclosure may have the following format as shown in Table 89 below.

TABLE 89

| Tag | Length | Value Description | MOC |
|---|---|---|---|
| '7F21' | Var | Certificate | M |
| | Tag | Length | Value Description | MOC |
| | '93' | 1-16 | certificate serial number | M |
| | '42' | 1-16 | CA Identifier | M |

TABLE 89-continued

| | | | |
|---|---|---|---|
| '5F20' | 1-16 | Subject Identifier | M |
| '95' | 1 | Key Usage: '82': Signature Verification (Signature Verification) (ECDSA) | M |
| '5F25' | 4 | Valid Date (YYYYMMDD, BCD format) | O |
| '5F24' | 4 | Expiration Date (YYYYMMDD, BCD format) | M |
| '73' | 3-127 | Discretionary Data (Discretionary Data) | M |
| 'TBD' | Var | List of PLMNIDs (PLMNID list) | C[NOTE] |
| '7F49' | Var | Public Key (Public Key) | M |
| '5F37' | Var | Signature (Signature) | M |

Private keys used for calculation of signature "5F37" in the certificate CERT_ECDSA are as follows.

SK.CI.ECDSA for use in CERT_CI_ECDSA, CERT_DP_ECDSA, CERT_SR_ECDSA, or CERT_EUM_ECDSA SK.EUM.ECDSA for use in CERT_EUICC_ECDSA Data to be signed correspond to tags "93", "42", "5F20", "95", "5F25", "5F24", "73", "TBD" (if any), and "7F49".

Tag "TBD" (i.e., list of PLMNIDs) exists when the value of tag "C8" in tag "73" (i.e., discretionary data) indicates "01 SM-DP+ Certificate".

"Discretionary Data", a data object that can be included in the format of the certificate, may have the following format as shown in Table 90 below.

TABLE 90

| Tag | Length | Value Description | | MOC |
|---|---|---|---|---|
| '73' | 3-127 | Discretionary Data Object | | M |
| | Value | Description | | MOC |
| | 'C8' | Type of certificates | | M |
| | '01' | Length of the 'C8' tag's value (1 byte) | | M |
| | 'XX' | '01': SM-DP+ certificate '02': SM-SR+ certificate '03': eUICC certificate '04': EUM certificate '05': CI certificate | | M |
| | 'D1' | Certificate identifier | | M |
| | 'XX' | Length of the 'D1' tag's value (1 byte) | | M |
| | 'XX XX ...' | DPID if the TLV with 'C8' tag indicates SM-DP+ certificate; or SRID if the TLV with 'C8' tag indicates SM-SR+ certificate; or EID if the TLV with 'C8' tag indicates eUICC certificate; or EUMID if the TLV with 'C8' tag indicates EUM certificate; or CIID if the TLV with 'C8' tag indicates CI certificate | | M |
| | 'D2' | Issuer identifier | | M |
| | 'XX' | Length of the 'D2' tag's value (1 byte) | | M |
| | 'XX XX . . .' | EUMID if the TLV with 'C8' tag indicates eUICC certificate; or CIID if the TLV with 'C8' tag indicates SM-DP+, SM-SR+, EUM, or CI certificate | | M |

It should be noted that the "Discretionary Data" includes an identifier for identifying whether the certificate is an EUM certificate (e.g., "04" or "03") or a CI certificate (e.g., "05"). Using the "Discretionary Data", the eUICC or the SM-SR+ can transmit the EUM certificate along with the eUICC certificate. Using the transmitted BUM certificate, the SM-DP+ can authenticate the eUICC through the CI certificate without acquiring the EUM certificate, which increases interoperability.

"List of PLMNIDs", a data object that can be included in the format of the certificate, may have the following format as shown in Table 91 below.

TABLE 91

| Tag | Length | Value Description | MOC |
|---|---|---|---|
| 'TBD' | Var | List of PLMNIDs | C |

The "List of PLMNIDs" TLV exists when the value of tag "C8" in the data object "Discretionary Data" indicates "01 SM-DP+ Certificate". The value of the "List of PLMNIDs" TLV is a series of PLMNIDs that are delimited by delimiters "%". For example, the "List of PLMNIDs" TLV represents two PLMN IDs "45008" and "310280", the value may be "45008%310280". The format of the "List of PLMNIDs" TLV according to the ASN.1 notation is "VisibleString". PLMN IDs included in the "List of PLMNIDs" TLV represent the PLMN IDs of profiles allowed for provisioning by the SM-DP+, and the SM-DP+ may be identified by the "D1" tag in the data object "Discretionary Data".

"Public Key", a data object that can be included in the format of the certificate, may have the following format as shown in Table 92 below.

TABLE 92

| Tag | Length | Value Description | MOC |
|---|---|---|---|
| '7F49' | Var | Public Key Data Object | M |

TABLE 92-continued

| Tag | Length | Value Description | MOC |
|-----|--------|-------------------|-----|
| 'B0' | Var | Public Key | M |
| 'F0' | 1 | Key Parameter Reference [GPCS Amd E] '00': NIST P-256 [FIPS 186] '01': NIST P-384 [FIPS 186] | M |

The key agreement certificate (CERT_ECKA) used in the present disclosure may have the following format as shown in Table 93 below.

TABLE 93

| Tag | Length | Value Description | MOC |
|-----|--------|-------------------|-----|
| '7F21' | Var | Certificate | M |

| Tag | Length | Value Description | MOC |
|-----|--------|-------------------|-----|
| '93' | 1-16 | certificate serial number | M |
| '42' | 1-16 | CA | M |
| '5F20' | 1-16 | Subject Identifier | M |
| '95' | 2 | Key Usage: '0080': Key Agreement (Key Agreement) (ECKA) | M |
| '5F25' | 4 | Valid Date (YYYYMMDD, BCD format) | O |
| '5F24' | 4 | Expiration Date (YYYYMMDD, BCD format) | M |
| '73' | 3-127 | Discretionary Data (Discretionary Data) | M |
| '7F49' | Var | Public Key (Public Key) | M |
| '5F37' | Var | Signature (Signature) | M |

Private keys used for calculation of signature "5F37" in the certificate CERT_ECKA are as follows.
SK.CI.ECDSA for use in CERT_DP_ECKA
SK.EUM.ECDSA for use in CERT_EUICC_ECKA
Data to be signed correspond to tags "93", "42", "5F20", "95", "5F25", "5F24", "73", and "7F49".

The certificate CERT_TLS used for mutual authentication of TLS connection in the present disclosure may follow the specifications of the RFC 5280. With regard to this, if the TLS certificate is issued for the SM-DP+, the common name (CN) of the TLS certificate is "DPID". If the TLS certificate is issued for the SM-SR+, the common name (CN) of the TLS certificate is "SRID". If the TLS certificate is issued for the SM-DS, the common name (CN) of the TLS certificate is "DSID".

In the following, the TLV structure used in the present disclosure is defined according to the ASN.1 notation.

The TLV structure may be encoded using distinguished encoding rule (DER) encoding.

The TLV for the ES10 interface (interface between eUICC and LPA) may have a data structure as shown in Table 94 below.

TABLE 94

```
ES10_GetAuthDataRequest ::= SEQUENCE {
        eventID                 EventID,
        eventType               EventType,
        srToken1                SRToken1,
        dpToken1                DPToken1                OPTIONAL,
        -- conditional if eventType = downloadProfile (0)
        terminalType            TerminalType            OPTIONAL,       -- conditional if
eventType = downloadProfile (0)
        provisioningType ProvisioningType   OPTIONAL    -- conditional if eventType =
downloadProfile (0)
}
ES10_GetAuthDataResponse ::= SEQUENCE {
        resultCode              ResultCode,
        eUICCToken              EUICCToken,
        eventID                 EventID                 OPTIONAL
}
ES10_EstablishSecureChannelRequest ::= SEQUENCE {
        eventID                 EventID,
        profileRecordPart1      ProfileRecordPart1,
        dpToken2                DPToken2,
        srToken2                SRToken2
}
ES10_EstablishSecureChannelResponse ::= SEQUENCE {
        resultCode              ResultCode
}
ES10_ReleaseSecureChannelRequest ::= SEQUENCE {
}
ES10_ReleaseSecureChannelResponse ::= SEQUENCE {
        resultCode              ResultCode
}
ES10_InstallProfileRecordRequest ::= SEQUENCE {
        securedProfileRecordPart2       SCP03tCommandTLV
}
ES10_InstallProfileRecordResponse ::= SEQUENCE {
        resultCode              ResultCode,
        scp03tResponseTLV       SCP03tResponseTLV       OPTIONAL        -- conditional if
resultCode indicates a failure
}
ES10_UpdateSessionKeyRequest ::= SEQUENCE {
        profileProtectionKey            SCP03tCommandTLV
```

TABLE 94-continued

```
}
ES10_UpdateSessionKeyResponse ::= SEQUENCE {
    resultCode              ResultCode,
    scp03tResponseTLV       SCP03tResponseTLV
}
ES10_InstallProfilePackageBlockRequest ::= SEQUENCE {
    securedProfilePackageBlock    SCP03tCommandTLV,
    lastPBIndicator                              LastPBIndicator
}
ES10_InstallProfilePackageBlockResponse ::= SEQUENCE {
    resultCode              ResultCode,
    eventResult             EventResult OPTIONAL,         --
conditional if the SecuredProfilePackageBlock was last
    scp03tResponseTLV       SCP03tResponseTLV    OPTIONAL,    -- conditional if
resultCode indicates a failure
}
ES10_eUICCManagementRequest ::= SEQUENCE {
    event                   Event,
    srToken2                SRToken2
}
ES10_eUICCManagementResponse ::= SEQUENCE {
    eventResult         EventResult
}
ES10_TerminalAuthRequest ::= SEQUENCE {
    eventID                 EventID,
    terminalRequestType     TerminalRequestType (deviceSwap | localDeleteAuthorization),
    srToken1                SRToken1
}
ES10_TerminalAuthResponse ::= SEQUENCE {
    resultCode              ResultCode,
    eUICCToken              EUICCToken
}
ES10_LocalManagementRequest ::= SEQUENCE {
    localEvent              LocalEvent
}
ES10_LocalManagementResponse ::= SEQUENCE {
    resultCode              ResultCode,
    profileRegistry         ProfileRegistry         OPTIONAL,    -- conditional if
localEventType = getProfileRegistry (3)
    protectedEID            ProtectedEID                         OPTIONAL,
    -- conditional if localEventType = getEID (5)
    dsInfoStatic            DSInfoStatic                         OPTIONAL,
    -- conditional if localEventType = getDSInfoStatic (6)
    certs_eUICC             CERTS_eUICC             OPTIONAL,    --
conditional if localEventType = getCert (8)
    euiccInfo               EUICCInfo                            OPTIONAL,
    -- conditional if localEventType = getEUICCInfo (9)
    localEventResult        LocalEventResult        OPTIONAL,    -- conditional
    defaultSR               DefaultSR                            OPTIONAL,
    -- conditional
    ownerMNO                MNOID                                OPTIONAL
    -- conditional
}
```

The TLV for the ES11c interface (interface between push client and RMF) may have a data structure as shown in Table 95 below.

TABLE 95

```
ES11c_RegistrationRequest ::= SEQUENCE {
    rmfID           RMFID,
    terminalInfo    TerminalInfo
}
ES11c_RegistrationResponse ::= SEQUENCE {
    resultCode      ResultCode,
```

TABLE 95-continued

```
    pushToken       PushToken           OPTIONAL
    -- conditional if resultCode = success
}
ES11c_PushNotification ::= SEQUENCE {
    eIDToken        EIDToken
}
```

The TLV for the profile, profile policy, and profile managements may have a data structure as shown in Table 96 below.

TABLE 96

```
ProfileRegistry ::= SET OF ProfileRecord
ProfileRecord ::= SEQUENCE {
    profileRecordPart1      ProfileRecordPart1,
    profileRecordPart2      ProfileRecordPart2
}
ProfileRecordPart1 ::= SEQUENCE {
```

TABLE 96-continued

```
    profileID               ProfileID,
    plmnID                  PLMNID,
                            -- MCC+MNC value of the IMSI
    profileDescription      ProfileDescription
                            -- Text describing the Profile (MSISDN is recommended)
}
ProfileRecordPart2 ::= SEQUENCE {
    profileType             ProfileType,
    profileRequestType      ProfileRequestType          OPTIONAL,
    -- conditional if ProfileRecordPart1.profileID = NULL
    profileState            ProfileState,
    ownerMNO                MNOID
        OPTIONAL,           /* MNO to receive a request or notification message
from the SM-SR+ */
    defaultSR               DefaultSR,
                                    /* SM-SR+ to receive a
request/notification message from the LPA */
    authorizedSR            SET OF SRID,
                            -- SM-SR+s that can manage this Profile and
ProfileRecord
    profilePolicyRule       SET OF ProfilePolicyRule    OPTIONAL     --
Policy rules for this Profile set by MNO
}
ProfileID ::= VisibleString ( SIZE(20) )
                            -- ICCID represented as alphanumeric characters
ProfileRequestType ::= INTEGER
                            /* When the MNO sends the ProfileDownloadRequest including
this TLV instead of ProfileID, the SM-DP+ selects a proper Profile to download corresponding to this
information. The value of this TLV is proprietary between each MNO and SM-DP+. */
ProfileType ::= ENUMERATED { provisioning (0), operational (1) }
ProfileDescription ::= UTF8String ( SIZE(0..256) )                       /*
Texts describing the profile/subscription information to the user (e.g. +82-10-2618-5031) */
ProfileState ::= ENUMERATED { disabled (0), enabled (1) }
ProfilePolicyRule ::= CHOICE {
    pprLocalDelete                              PPRLocalDelete,
    pprLocalMgmtNotification        PPRLocalMgmtNotification
}
PPRID ::= ENUMERATED {
    localDelete (0),
    localMgmtNotification (1)
}
PPRLocalDelete ::= SEQUENCE {
    pprID                           PPRID ( localDelete ),
    deleteAuthorization     DeleteAuthorization
}
DeleteAuthorization ::= ENUMERATED {
    authorizationNotRequired (0),
    authorizationRequired (1)
}
PPRLocalMgmtNotification ::= SEQUENCE {
    pprID                   PPRID ( localMgmtNotification ),
    notiEventList           SET OF EventTobeNotified
    OPTIONAL
}
EventTobeNotified ::= ENUMERATED {
    enableProfile (0),
    disableProfile (1),
    deleteProfile (2)
}
```

The TLV for the eUICC policy and managements may have a data structure as shown in Table 97 below.

TABLE 97

```
EUICCPolicyRule ::= CHOICE {
    eprServerAccessControl  EPRServerAccessControl,
    eprSubsidyLock                  EPRSubsidyLock,
    eprUserConfirmation     EPRUserConfirmation
}
EPRID ::= ENUMERATED {
    serverAccessControl (0),
    subsidyLock (1),
    userConfirmation(2)
}
EPRServerAccessControl ::= SEQUENCE {
    eprID                           EPRID ( serverAccessControl ),
```

TABLE 97-continued

```
        authorizedSR         SET OF SRID,
                                 -- SM-SR+s that can update this EPR, set by
customer needs
        srAccessControl      AccessControl    DEFAULT blacklist,
        srList               SET OF SRID
        OPTIONAL,            -- check this for all remote events (default:
NULL)
        dpAccessControl   AccessControl    DEFAULT blacklist,
        dpList               SET OF SRID
        OPTIONAL             -- check this when profile download (default:
NULL)
}
AccessControl ::= ENUMERATED { blacklist(0), whitelist(1) }
EPRSubsidyLock ::= SEQUENCE {
        eprID                EPRID ( subsidyLock ),
        authorizedSR         SET OF SRID,
                                 -- SM-SR+s that can update this EPR, set by
customer request
        lockType             LockType
        DEFAULT unlocked,
        mnoList              SET OF PLMNID   OPTIONAL,
                             -- PLMNID ::= MCC+MNC (default: NULL)
        countryList          SET OF MCC
        OPTIONAL             -- default: NULL
}
LockType ::= ENUMERATED { unlocked (0), mnoLocked (1), countryLocked (2) }
ProtectedEID ::= SEQUENCE {
        eID                  EID,
        timeStamp            UTCTime,
        sign_EID             SIGN_ECDSA
}
EPRUserConfirmation ::= SEQUENCE {
        eprID                    EPRID (userConfirmation),
        authorizedSR         SET OF SRID,       -- SM-SR+s that
can update this EPR, set by customer request
        mnoList              SET OF PLMNID    -- PLMNID ::=
MCC|MNC (default: NULL)
}
```

The TLV for the entity and ID may have a data structure as shown in Table 98 below.

TABLE 98

```
SRID ::= VisibleString
                    -- FQDN of the server hosting the SM-SR+ function (e.g., smsr.gsma.com)
DefaultSR ::= SEQUENCE {
        primarySR            SRID,
        secondarySR     SRID    OPTIONAL
                /* to be used by the LPA when the primary SM-SR+ is not reachable (e.g. due to
the primary SM-SR+ server failure) */
}
MCC ::= NumericString ( SIZE(3) )                                                        --
Mobile Country Code
PLMNID ::= NumericString ( SIZE(5..6) )                              /* The format of
PLMNID is 'MCC|MNC' where '|' means concatenation of the strings (e.g., 45008 or 310280) */
MNOID ::= VisibleString
                -- FQDN of the server hosting the MNO function
DSID ::= VisibleString
                -- FQDN of the server hosting the SM-DS function (e.g., smds.gsma.com)
DSInfoStatic ::= SEQUENCE {
        primaryDS               DSID,
                                -- Primary SM-DS configured in the eUICC
        secondaryDS             DSID              OPTIONAL,
                -- Secondary SM-DS configured in the eUICC
        authorizedSR         SET OF SRID
                -- SM-SR+s that are allowed to update the DSInfoStatic
}
EID ::= OCTET STRING ( SIZE(16..32) )
RMFID ::= VisibleString
                -- unique identification of the RMF
TerminalInfo ::= SEQUENCE {
        majorSpecVersion        UInt8,
        -- major version of eUICC specification supported by LPA
        minorSpecVersion        UInt8,
        -- minor version of eUICC specification supported by LPA
        imei                                      IMEI
```

TABLE 98-continued

```
        OPTIONAL
}
IMEI ::= OCTET STRING ( SIZE(14..16) )
EUICCInfo ::= SEQUENCE {
        majorSpecVersion        UInt8,
        -- major version of the specification supported by eUICC
        minorSpecVersion        UInt8,
        -- minor version of the specification supported by eUICC
        maxBlockSize                            UInt8,
                /* max bytes of the SCP03t data block size supported by the eUICC (programed
static value) */
        maxProfileSize UInt8,
                /* max bytes of the Profile Package that can be installed in the eUICC
(dynamic value according to current available memory) */
        firmwareVersion     NumericString ( SIZE(5) ),        /* 5 digit number denotes
the version of the platform and OS as defined in [GSMA SGP.02 v3.0] */
        eccParameter                    ECCParameter
        -- ECC parameters of the eUICC ECDSA/ECKA Certificates
}
```

The TLV for the event may have a data structure as shown in Table 99 below.

TABLE 99

```
EventID ::= VisibleString
                /* The format of EventID is 'SRID| ":" |TransactionID' where '|' means concatenation
of the strings (e.g., dev.sm-sr.com:0249583719289206) */
EventType ::= ENUMERATED {
        downloadProfile (0),
        enableProfile (1),
        disableProfile (2),
        deleteProfile (3),
        getProfileRegistry (4),
        updateProfileRegistry (5),
        getEPR (6),
        updateEPR (7),
        getDSInfo (8),
        updateDSInfo (9),
        getCIInfo(10),
        updateCIInfo(11),
        getFirmwareInfo(12),
        updateFirmwareInfo(13)
}
Event ::= SEQUENCE {
        eventType                       EventType,
        eventID                         EventID,
                        /* NULL in the ES4_eUICCManagementRequest or the
ES2_DownloadProfileRequest or the ES3_eUICCManagementRequest */
        eID                             EID,
        profileID               ProfileID                       OPTIONAL,
        /* conditional if eventType = { enableProfile (1), disableProfile (2), deleteProfile (3),
getProfileRegistry (4) } */
        profileRecord           ProfileRecord           OPTIONAL,       /* conditional if
eventType = { downloadProfile (0), updateProfileRegistry (5) } */
        userConfirmation UserConfirmation OPTIONAL,     -- conditional if eventType =
downloadProfile (0)
        eprID                           EPRID
        OPTIONAL,       -- conditional if eventType = getEPR (6)
        epr                             EUICCPolicyRule         OPTIONAL,
        -- conditional if eventType = updateEPR (7)
        dsInfoStatic            DSInfoStatic            OPTIONAL,
        -- conditional if eventType = updateDSInfo (9)
        ciInfo                          CIInfo
        OPTIONAL,       -- conditional if eventType = updateCIInfo (11)
        firmwareInfo            FirmwareInfo            OPTIONAL        --
conditional if eventType = updateFirmwareInfo (13)
}
EventResult ::= SEQUENCE {
        resultCode              ResultCode,
        eID                             EID,
        eventID                         EventID,
        profileID               ProfileID                       OPTIONAL,
        -- conditional if eventType = downloadProfile (0)
        profileRegistry         ProfileRegistry         OPTIONAL,       -- conditional if
eventType = getProfileRegistry (4)
        epr                             EUICCPolicyRule         OPTIONAL,
```

TABLE 99-continued

```
        -- conditional if eventType = getEPR (6)
        dsInfoStatic              DSInfoStatic            OPTIONAL,
        -- conditional if eventType = getDSInfo (8)
        ciInfo                    CIInfo
OPTIONAL,        -- conditional if eventType = getCIInfo (10)
        firmwareInfo              FirmwareInfo            OPTIONAL,       --
conditional if eventType = getFirmwareInfo (12)
        sign_Result               SIGN_ECDSA
}
```

The TLV for the token may have a data structure as shown in Table 100 below

TABLE 100

```
PushToken ::= VisibleString
EIDToken ::= VisibleString
EUICCToken ::=SEQUENCE {
        eventID                   EventID,
        sign_eUICC                SIGN_ECDSA,
        nonce_eUICC               NONCE_eUICC OPTIONAL,   /* conditional if
eventType is not downloadProfile (0) or if EUCCToken is included in ES10_TerminalAuthResponse TLV*/
        ePK_eUICC_ECKA            EPK_ECKA                OPTIONAL,       --
conditional if eventType = downloadProfile (0)
        euiccInfo                 EUICCInfo,
        cert_EUM_ECDSA            CERT_EUM_ECDSA          OPTIONAL
}
SRToken1 ::=SEQUENCE {
        cert_SR_ECDSA             CERT_ECDSA,
        nonce_SR                  NONCE_SR,
        sign_SR1                  SIGN_ECDSA
}
SRToken2 ::=SEQUENCE {
        sign_SR2                  SIGN_ECDSA
}
DPToken1 ::=SEQUENCE {
        profileRecordPart1        ProfileRecordPart1,
        ePK_DP_ECKA               EPK_ECKA,
        sign_DP1                  SIGN_ECDSA,
        cert_DP_ECDSA             CERT_ECDSA,
        cert_DP_ECKA              CERT_ECKA,
        confirmType               ConfirmType,
        confirmMessage            ConfirmMessage          OPTIONAL,
        confirmCodeHash1          OCTET STRING ( SIZE(32) )  OPTIONAL      --
conditional if the dpToken1.confirmType is codeInput(1)
}
DPToken2 ::= SEQUENCE {
        sign_DP2                  SIGN_ECDSA
}
```

The TLV for the local managements may have a data structure as shown in Table 101 below.

TABLE 101

```
LocalEvent ::= SEQUENCE {
        localEventType            LocalEventType,
        timeStamp                 UTCTime,
                                  -- the time when the LPA generated this localEvent
        profileID                 ProfileID
OPTIONAL,        /* conditional if localEventType = { enableProfile (0),
disableProfile (1), deleteProfile (2), updateProfileRegistry (4) } */
        profileDescription        ProfileDescription OPTIONAL,       -- conditional if
localEventType = updateProfileRegistry (4)
        primaryDS                 DSID
OPTIONAL,        -- conditional if local EventType = updateDSInfoStatic (7)
        secondaryDS               DSID
OPTIONAL,        -- if local EventType = updateDSInfoStatic (7)
        srToken2                  SRToken2
OPTIONAL         -- conditional for after authorization of the SM-SR+
}
Local EventType ::= ENUMERATED {
        enableProfile (0),
        disableProfile (1),
        deleteProfile (2),
```

TABLE 101-continued

```
        getProfileRegistry (3),
        updateProfileRegistry (4),
        getEID (5),
        getDSInfoStatic (6),
        updateDSInfoStatic (7),
        getCert (8),
        getEUICCInfo (9),
    resetEUICC (10)
}
LocalEventResult ::= SEQUENCE {
        resultCode              ResultCode,
        localEventType          LocalEventType,             -- enableProfile
(0), disableProfile (1), or deleteProfile (2)
        eID                     EID,
        profileID               ProfileID,
        timeStamp               UTCTime,
                -- timeStamp that was contained in the localEvent
        sign_Result             SIGN_ECDSA
}
```

The TLV for the security may have a data structure as shown in Table 102 below.

TABLE 102

```
SCP03tCommandTLV ::= OCTET STRING
SCP03tResponseTLV ::= OCTET STRING
ECCParameter ::= SEQUENCE {
        keyParameterReference_ECDSA        OCTET STRING ( SIZE(1) ),  -- one byte
integer (0 to 255)
        keyParameterReference_ECKA         OCTET STRING ( SIZE(1) )   -- one byte
integer (0 to 255)
}
CERTS_eUICC ::= SEQUENCE {
        cert_eUICC_ECDSA       CERT_ECDSA
        cert_EUM_ECDSA         CERT_ECDSA,
        cert_eUICC_ECKA        CERT_ECKA          OPTIONAL         --
conditional if eventType = downloadProfile
}
CERT_ECDSA ::= OCTET STRING
CERT_ECKA ::= OCTET STRING
EPK_ECKA ::= OCTET STRING
NONCE_SR ::= OCTET STRING
NONCE_eUICC ::= OCTET STRING
SIGN_ECDSA ::= OCTET STRING
```

Other TLVs may have a data structure as shown in Table 103 below.

TABLE 103

```
ResultCode ::= INTEGER (1000..9999)
UInt8 ::= INTEGER (0..255)
UserConfirmation ::= SEQUENCE {
        confirmType             ConfirmType,
        confirmCode             ConfirmCode         OPTIONAL,   --
conditional if confirmType = codeInput (1)
        confirmMessage    ConfirmMessage    OPTIONAL
}
LastPBIndicator ::= ENUMERATED { morePB (0), lastPB (1) }
ConfirmType ::= ENUMERATED { yesOrNo (0), codeInput (1) }
ConfirmCode ::= VisibleString ( SIZE(4..10) )
ConfirmMessage ::= UTF8String
TerminalRequestType ::= ENUMERATED {
        downloadProfile (0),
        deviceSwap (1),
        localDeleteAuthorization (2)
}
CIInfo ::= SEQUENCE {
        ciList                          CIList,
        authorizedSR            SET OF SRID
            -- SM-SR+s that are allowed to update the CIInfo
}
CIList ::= SET OF CERT_ECDSA
FirmwareInfo ::= SEQUENCE {
```

TABLE 103-continued

```
        firmwareVersion    NumericString ( SIZE(5) )         OPTIONAL,    -- conditional if
eventType = getFirmwareInfo (12)
        firmwareData              OCTET STRING
        OPTIONAL,         -- conditional if eventType = updateFirmwareInfo (13)
        sign_EUM                  SIGN_ECDSA
        OPTIONAL,         -- conditional if eventType = updateFirmwareInfo (13)
        authorizedSR              SET OF SRID
                                        -- SM-SR+s that are allowed to update the
FirmwareInfo
}
TerminalType ::= ENUMERATED {
        without_UI (0),
        with_UI (1)}
ProvisioningType ::= ENUMERATED {
        without_SM-DS (0),
        with_SM-DS (1)}
```

Figure 8:
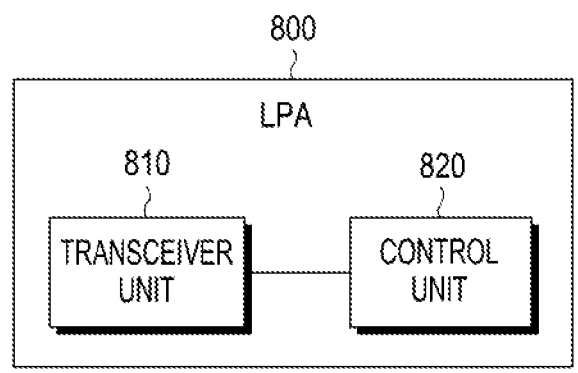
FIG. 8 is a diagram illustrating a configuration of a terminal apparatus according to the present disclosure.

FIG. 8 is a diagram illustrating a configuration of a terminal apparatus according to the present disclosure.

The terminal 800 according to the present disclosure may include a transceiver unit (or communication unit) 810 for receiving profile information from a profile information delivery server and receiving a profile from a profile providing server by using the profile information, and a control unit 820 for receiving the profile so as to make a connection to a communication service. The terminal 800 may further include a detachable or fixed eUICC. For example, the APs 412, 442, 472 in FIG. 4 may be implemented by the control unit 820, and the CPs 414, 444, 474 in FIG. 4 may be implemented by the transceiver unit 810. For the convenience of the description, the transceiver unit 810 and the control unit 820 are illustrated as if they were separate elements, but it will be apparent that they may also be implemented as a single element. The terminal may be interchangeably referred to as an electronic device.

Figure 9:
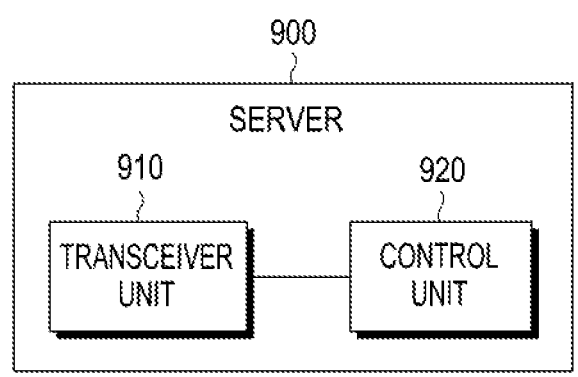
FIG. 9 is a diagram illustrating a configuration of a server apparatus according to the present disclosure.

FIG. 9 is a diagram illustrating a configuration of a server apparatus according to the present disclosure.

Various servers according to the present disclosure, that is, the SM-DP+, the SM-SR+, the SM-DS, and the like, may be implemented as in the server 900 of FIG. 9.

When the server 900 is the SM-DP+, the SM-DP+ 900 may include a control unit 920 for generating and encrypting a profile, and a transceiver unit 910 for delivering profile information to the SM-DS and transmitting the encrypted profile to the terminal that uses the eUICC. The control unit 920 may perform control so as to receive a profile download request from an electronic device and transmit a profile installable in the universal integrated circuit card (UICC) of the electronic device. The profile information may be used by the electronic device to make the profile download request.

When the server 900 is the SM-DS, the SM-DS 900 may include a transceiver unit 910 for receiving profile information from the SM-DP+ and delivering the profile information to the terminal and a control unit 920 for controlling the transceiver unit 910. The SM-DS 900 may further include a storage unit capable of storing the profile information (capable of temporarily storing the profile information). The control unit 920 may perform control so as to register the profile information received from the SM-DP+ and deliver the profile information to the electronic device corresponding to the profile information. The profile information may be used by the electronic device to download a profile installable in the UICC of the electronic device from the SM-DP+.

When the server 900 is the SM-SR+, the SM-SR+ 900 may include a transceiver unit 910 for delivering profile information and transmitting an encrypted profile to the terminal that uses the eUICC, and a control unit 920 for controlling the transceiver unit 910. The control unit 920 may perform control so as to receive a profile download request from an electronic device and transmit a profile installable in the universal integrated circuit card (UICC) of the electronic device. The profile information may be used by the electronic device to make the profile download request.

It should be noted that the system configuration diagrams, the method illustration diagrams, and the apparatus configuration diagrams shown in FIGS. 1 to 9 are not intended to limit the scope of protection of the present disclosure. That is, it should not be construed that all the constituent units or operation steps shown in FIGS. 1 and 9 are essential elements for implementing the present disclosure, and it should be understood that the present disclosure can be implements by only some elements without departing from the basic scope of the present disclosure.

The above described operations may be implemented by having a memory device, which stores a corresponding program code, in any constituent unit within an entity, a function, a base station, or a terminal apparatus of the communication system. That is, the controller of the entity, the function, the base station, or the terminal apparatus carries out the above described operations by reading and executing the program code stored in the memory device by means of a processor or a CPU.

The various constituent units and modules of the entity, the function, the base station, or the terminal apparatus may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out using electrical circuits such as transistors, logic gates, and application specific integrated circuits (ASICs).

Although the specific embodiments of the present disclosure have been described in the detailed description of the present disclosure, various modifications can be made without departing from the scope of the present disclosure. Therefore, the scope of the present disclosure should not be limited to the embodiments described above, but should be defined by the appended claims and the equivalents thereto.

What is claimed:

1. A method of a terminal having a local profile assistant (LPA) and an embedded universal integrated circuit card (eUICC) in a mobile communication system, the method comprising:

transmitting, by the LPA, a first message including first information of the eUICC and an eUICC challenge to a server;
receiving, by the LPA, a first response message including at least one certificate of the server from the server;
transmitting, by the LPA, the at least one certificate of the server to the eUICC;
receiving, by the LPA, second information of the eUICC including a signature value of the eUICC;
transmitting, by the LPA, a second message including the second information of the eUICC to the server;
receiving, by the LPA, a second response message including a profile package from the server; and
transmitting, by the LPA, the profile package to the eUICC to install the profile package.

2. The method of claim 1, further comprising:
transmitting, by the LPA, a request for the first information of the eUICC to the eUICC; and
receiving, by the LPA, the first information of the eUICC from the eUICC in response to the request for the first information.

3. The method of claim 1, further comprising:
transmitting, by the LPA, a request for the eUICC challenge to the eUICC; and
receiving, by the LPA, the eUICC challenge from the eUICC in response to the request for the eUICC challenge.

4. The method of claim 1, further comprising:
establishing, by the LPA, a hyper text transfer protocol over secure socket layer, HTTPs, connection with the server.

5. The method of claim 1, wherein the second information further includes an eUICC manufacturer (EUM) certificate and an eUICC certificate.

6. The method of claim 1, wherein the first response message further includes a transaction ID for identifying a profile download session.

7. The method of claim 6, wherein the transaction ID is delivered to the eUICC, along with the at least one certificate of the server.

8. A terminal in a mobile communication system, the terminal comprising:
an embedded universal integrated circuit card, eUICC;
a transceiver; and
a processor coupled with the transceiver and configured to:
control the transceiver to transmit a first message including first information of the eUICC and an eUICC challenge to a server;
receive, via the transceiver, a first response message including at least one certificate of the server from the server;
control the transceiver to transmit the at least one certificate of the server;
receive, via the transceiver, second information of the eUICC including a signature value of the eUICC;
control the transceiver to transmit a second message including the second information of the eUICC to the server;
receive, via the transceiver, a second response message including a profile package in response to the second message from the server; and
transmit the profile package to the eUICC to install the profile package.

9. The terminal of claim 8, the processor is further configured to:
transmit a request for the first information of the eUICC to the eUICC; and
receive the first information of the eUICC from the eUICC in response to the request for the first information.

10. The terminal of claim 8, the processor is further configured to:
transmit a request for the eUICC challenge to the eUICC; and
receive the eUICC challenge from the eUICC in response to the request for the eUICC challenge.

11. The terminal of claim 8, wherein the second information further includes an eUICC manufacturer (EUM) certificate and an eUICC certificate.

12. The terminal of claim 8,
wherein the first response message further includes a transaction ID for identifying a profile download session, and
wherein the transaction ID is delivered to the eUICC, along with the at least one certificate of the server.

13. A method of a server in a mobile communication system, the method comprising:
receiving, from a terminal, a first message including an embedded universal integrated circuit card (eUICC) challenge of an eUICC included in the terminal and first information of the eUICC;
transmitting, to the terminal, a first response message including at least one certificate of the server;
receiving, from the terminal, a second message including a signature value of the eUICC;
transmitting, to the terminal, a second response message including a profile package; and
checking whether an eUICC manufacturer (EUM) certificate and an eUICC certificate included in the second message is valid.

14. The method of claim 13, further comprising:
determining whether an address of the server included in the first message is valid; and
determining whether an encryption key information included in the first message is supportable by the server.

15. The method of claim 13, wherein the eUICC certificate is used to verify the signature value of the eUICC included in the second message.

16. A server in a mobile communication system, the server comprising:
a transceiver; and
a processor coupled with the transceiver and configured to:
receive, from a terminal, a first message including an embedded universal integrated circuit card (eUICC) challenge of an eUICC included in the terminal and first information of the eUICC;
control the transceiver to transmit, to the terminal, a first response message including at least one certificate of the server;
receive, from the terminal via the transceiver, a second message including a signature value of the eUICC;
control the transceiver to transmit, to the terminal, a second response message including a profile package; and
determine whether an eUICC manufacturer (EUM) certificate and an eUICC certificate included in the second message is valid.

17. The server of claim 16, wherein the processor is further configured to:

determine whether an address of the server included in the first message is valid; and determine whether an encryption key information included in the first message is supportable by the server.

18. The server of claim 16, wherein the eUICC certificate is used to verify the signature value of the eUICC included in the second message.

\* \* \* \* \*